United States Patent
Cui et al.

(10) Patent No.: US 11,015,097 B2
(45) Date of Patent: May 25, 2021

(54) CHEMICALLY RESISTANT SEALANT COMPOSITIONS AND USES THEREOF

(71) Applicant: PRC-DeSoto International, Inc., Sylmar, CA (US)

(72) Inventors: Weibin Cui, Rancho Palos Verdes, CA (US); Juexiao Cai, Stevenson Ranch, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 134 days.

(21) Appl. No.: 16/293,831

(22) Filed: Mar. 6, 2019

(65) Prior Publication Data

US 2020/0283663 A1    Sep. 10, 2020

(51) Int. Cl.
| | |
|---|---|
| C08K 3/10 | (2018.01) |
| C09K 3/10 | (2006.01) |
| B64G 1/22 | (2006.01) |
| C08G 81/00 | (2006.01) |
| C08L 87/00 | (2006.01) |

(52) U.S. Cl.
CPC ............ *C09K 3/1012* (2013.01); *B64G 1/226* (2013.01); *C08G 81/00* (2013.01); *C08L 87/005* (2013.01); *C08G 2190/00* (2013.01); *C08L 2205/14* (2013.01); *C09K 2200/0682* (2013.01)

(58) Field of Classification Search
None
See application file for complete search history.

(56) References Cited

U.S. PATENT DOCUMENTS

| | | | |
|---|---|---|---|
| 3,517,082 A | 6/1970 | Cockerham | |
| 4,366,307 A | 12/1982 | Singh et al. | |
| 4,609,762 A | 9/1986 | Morris et al. | |
| 4,623,711 A | 11/1986 | Morris et al. | |
| 5,225,472 A | 7/1993 | Cameron et al. | |
| 6,172,179 B1 | 1/2001 | Zook et al. | |
| 7,009,032 B2 | 3/2006 | Bojkova et al. | |
| 7,858,703 B2 | 12/2010 | Zook et al. | |
| 7,875,666 B2 | 1/2011 | Gilmore et al. | |
| 8,138,273 B2 | 3/2012 | Rao et al. | |
| 8,466,220 B2 | 6/2013 | Rao et al. | |
| 8,513,339 B1 | 8/2013 | Keledjian et al. | |
| 8,541,513 B2 | 9/2013 | Hobbs et al. | |
| 8,729,216 B2 | 5/2014 | Hobbs et al. | |
| 8,816,023 B2 | 8/2014 | Anderson et al. | |
| 8,952,124 B2 | 2/2015 | Rao et al. | |
| 8,993,691 B2 | 3/2015 | Anderson et al. | |
| 9,056,949 B2 | 6/2015 | Cai et al. | |
| 9,079,833 B2 | 7/2015 | Klobes et al. | |
| 9,382,642 B2 | 7/2016 | Yarlagadda et al. | |
| 9,422,451 B2 | 8/2016 | Rao et al. | |
| 9,540,540 B2 | 1/2017 | Rao et al. | |
| 9,663,619 B2 | 5/2017 | Echigoya et al. | |
| 2004/0152866 A1 | 8/2004 | Cosman | |
| 2007/0299217 A1* | 12/2007 | Sawant | C08L 63/00 525/523 |
| 2010/0010133 A1 | 1/2010 | Zook et al. | |
| 2013/0345371 A1 | 12/2013 | Anderson et al. | |
| 2014/0051789 A1 | 2/2014 | Rao et al. | |
| 2014/0275461 A1 | 9/2014 | Rao et al. | |
| 2016/0083619 A1 | 3/2016 | Anderson et al. | |
| 2016/0152775 A1 | 6/2016 | Tobis et al. | |
| 2017/0114208 A1 | 4/2017 | Rao et al. | |
| 2017/0114259 A1 | 4/2017 | Virnelson et al. | |
| 2017/0369432 A1* | 12/2017 | Cui | C09K 3/1012 |
| 2019/0010370 A1 | 1/2019 | Lin et al. | |

FOREIGN PATENT DOCUMENTS

| | | |
|---|---|---|
| JP | 62-53354 A | 5/2015 |
| WO | 2018/031532 A1 | 2/2018 |
| WO | 2018/085650 A1 | 5/2018 |
| WO | 2013192480 | 12/2019 |

OTHER PUBLICATIONS

Mather, B.D. et al., "Michael addition reactions in macromolecular design for emerging technologies," Prog. Polym. Sci., 2006, vol. 31, p. 487-531.

* cited by examiner

*Primary Examiner* — Robert T Butcher
(74) *Attorney, Agent, or Firm* — William R. Lambert

(57) ABSTRACT

Chemically resistant sealant compositions include high equivalent weight sulfur-containing prepolymers. Upon exposure to chemicals the properties of sealants prepared using the prepolymers exhibit excellent fuel and phosphate ester resistance.

22 Claims, No Drawings

CHEMICALLY RESISTANT SEALANT COMPOSITIONS AND USES THEREOF

FIELD

The disclosure relates to chemically resistant sealant compositions. The sealants include high equivalent weight sulfur-containing prepolymers. Upon exposure to chemicals the properties of sealants prepared using the prepolymers exhibit excellent fuel and phosphate ester resistance.

BACKGROUND

Coatings and sealants based on sulfur-containing prepolymers can meet the performance requirements of applications requiring high chemical resistance. However, as existing requirements continue to change, and enhanced performance is desired there is a continuing need to develop new coatings and sealants. Chemical resistance is a standard requirement for many coatings and sealants such as those used in aerospace applications. It is important that the properties of such materials be maintained above a certain threshold when initially cured and that the properties not substantially degrade following exposure to fluids that the materials can come into contact during use such as chemicals, hydraulic fluid, and aviation fuel. Accelerated chemical resistance tests are used to evaluate the performance of a cured coating or sealant. One test used to evaluate fuel resistance is described, for example, in AMS 3277. In this test a material sample is immersed in Jet Reference Fluid Type I (JRF Type I), which is a mixture of organic chemicals, at a temperature of 60° C. for one week. Materials that maintain properties such as tensile strength, elongation, hardness, and adhesion above an acceptable threshold following JRF Type I immersion can be considered to be fuel resistant. Another requirement that is used to qualify aerospace sealants for certain applications is resistant to phosphate ester hydraulic fluid. Resistance to phosphate ester hydraulic fluid is more difficult to achieve. For example, a sealant that passes JRF Type I fuel resistance testing can dissolve when exposed to phosphate ester hydraulic fluids at 70° C. for an extended period of time. Other chemical resistance tests are used to evaluate and qualify coatings and sealants used in other applications and industries where chemical resistance is important.

Filler are often incorporated into coatings and sealants to serve a variety of purposes such as to enhance the tensile strength and/or % elongation of the cured polymer and/or to decrease the density of the cured polymer. Additives such as adhesion promoters can be included in a polymeric composition to enhance the adhesion of the cured polymer to incorporated filler.

Additional approaches to enhance the chemical resistance of coatings and sealants and in particular coatings and sealants containing filler are desired.

SUMMARY

According to the present invention, composition comprises (a) a chain-extended sulfur-containing prepolymer, wherein the chain-extended sulfur-containing prepolymer has a number average molecular weight from 2,000 Da to 15,000 Da; and the chain-extended sulfur-containing prepolymer comprises the reaction product of reactants comprising a sulfur-containing prepolymer and a chain-extender; (b) a curing agent; and (c) a filler.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —$CONH_2$ is attached through the carbon atom.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be $C_{1-6}$ alkyl, $C_{1-4}$ alkyl, and $C_{1-3}$ alkyl.

"Alkanediyl" refers to a diradical of a saturated or unsaturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_2$ 3 alkanediyl. Examples of alkanediyl groups include methanediyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, and dodecane-1,12-diyl.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkenyl" group refers to the structure $-CR=C(R)_2$ where the alkenyl group is a terminal group and is bonded to a larger molecule. In such embodiments, each R may independently comprise, for example, hydrogen and $C_{1-3}$ alkyl. Each R can be hydrogen and an alkenyl group can have the structure $-CH=CH_2$.

"Alkoxy" refers to a $-OR$ group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkyl" refers to $C_{2-20}$ alkyl group in which one or more of the carbon atoms and associated hydrogen atoms are replaced with a heteroatom, such as N, O, S, or P, or a heteroatom and associated hydrogen atom such as —NH—. In a heteroalkyl, the one or more heteroatoms can comprise N or O. Heteroalkyl includes alkoxy. A $C_{2-4}$ heteroalkyl can have one to three carbon atoms and from one to four heteroatoms such as, for example, $-CH_2-SH$, $-S-SH$, $-CH_2-O-CH_3$, $-S-CH_2-CH_2-OH$ and others. A $C_2$ heteroalkyl can be, for example, $-CH_2-OH$ and $-S-CH_3$. A heteroalkyl group can be, for example, $C_{2-20}$ heteroalkyl, $C_{2-16}$, $C_{2-12}$, $C_{2-10}$, $C_{2-8}$, $C_{2-6}$, or $C_{2-4}$ heteroalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

"Heteroarenediyl" refers to an arenediyl group in which one or more of the carbon atoms are replaced with a heteroatom, such as N, O, S, or P. In a heteroarenediyl, the one or more heteroatoms can comprise N or O.

"-n-yl" such as in $C_{1-6}$ alkane-n-yl or cycloalkane-n-yl and other chemical groups refers to the number of bonding sites in the chemical group. For example, n can be an integer from 1 to 6. For example, $C_2$ alkane-2-yl refers to a $C_2$-alkane-diyl having two bonding sites such as in $-CH_2-CH_2-$, or $-CH_2(-CH_3)-$. Similarly, $C_2$-alkane-3-yl refers to a $C_2$-alkane-triyl having 3 bonding sites such as $-CH_2-CH(-)_2$ or $CH_3-C(-)_3$.

A "Michael acceptor" refers to an activated alkene, such as an alkenyl group proximate to an electron-withdrawing group such as, for example, a ketone, halo, carbonyl (—CO), nitro (—NO$_2$), nitrile (—CN), alkoxycarbonyl (—COOR), phosphonate (—PO(OR)$_2$), trifluoromethyl (—CF$_3$), sulfonyl (—SO$_2$—), trifluoromethanesulfonyl (—SO$_2$CF$_3$), or p-toluenesulfonyl (—SO$_2$—C$_6$H$_4$—CH$_3$). In certain embodiments, a Michael acceptor group is selected from a vinyl ketone, a vinyl sulfone, a quinone, an enamine, a ketimine, an aldimine, an oxazolidine, and an acrylate. In certain embodiments, a Michael acceptor or Michael acceptor group does not encompass acrylates. A "Michael acceptor compound" refers to a compound comprising at least one Michael acceptor group. In certain embodiments, a Michael acceptor compound is divinyl sulfone, and a Michael acceptor group is vinylsulfonyl, e.g., —S(O)$_2$—CH$_2$=CH$_2$. Other examples of Michael acceptors are disclosed in Mather et al., *Prog. Polym. Sci.,* 2006, 31, 487-531, and include acrylate esters, acrylonitrile, acrylamides, maleimides, alkyl methacrylates, and cyanoacrylates. Types of compounds that function as Michael acceptors include vinyl ketones, quinones, nitroalkenes, acrylonitriles, acrylates, methacrylates, cyanoacrylates, acrylamides, maleimides, dialkyl vinylphosphonate, and vinylsulfones. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor compound is divinyl sulfone, and a Michael acceptor group is vinylsulfonyl, i.e., —S(O)$_2$—CH=CH$_2$. A Michael acceptor compound can be a bis(vinylsulfonyl)alkanol, and a Michael acceptor group is 1-(ethylenesulfonyl)-n-(vinylsulfonyl)alkanol, i.e., —CH$_2$—CH$_2$—S(O)$_2$—R$^{10}$—CH(—OH)—R—S(O)$_2$—CH=CH$_2$, and in certain embodiments, 1-(ethylenesulfonyl)-3-(vinylsulfonyl)propan-2-ol (—CH$_2$—CH$_2$—S(O)$_2$—CH$_2$—CH(—OH)—CH$_2$—S(O)$_2$—CH=CH$_2$).

"Substituted" refers to a group in which one or more hydrogen atoms are each independently replaced with the same or different substituent(s). A substituent can comprise halogen, —S(O)$_2$OH, —S(O)$_2$, —SH, —SR where R is C$_{1-6}$ alkyl, —COOH, —NO$_2$, —NR$_2$ where each R independently comprises hydrogen and C$_{1-3}$ alkyl, —CN, =O, C$_{1-6}$ alkyl, —CF$_3$, —OH, phenyl, C$_{2-6}$ heteroalkyl, C$_{5-6}$ heteroaryl, C$_{1-6}$ alkoxy, or —COR where R is C$_{1-6}$ alkyl. A substituent can be —OH, —NH$_2$, or C$_{1-3}$ alkyl.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means chemical reaction product(s) of the recited reactants and can include partial reaction products as well as fully reacted products and other reaction products that are present in lesser amounts.

The term "equivalent" refers to the number of functional reactive groups of the substance.

"Equivalent weight" is effectively equal to the molecular weight of a substance, divided by the valence or number of functional reactive groups of the substance.

A "backbone" of a prepolymer refers to the segment between the reactive terminal groups. A prepolymer backbone typically includes repeating subunits. For example, the backbone of a polythiol HS—[R]$_n$—SH is —[R]$_n$—.

A "core" of a polyfunctionalizing agent B(—R$^{10}$)$_z$ refers to the moiety B. B can include the polyfunctionalizing agent with the terminal functional group R$^{10}$.

A "core" of a molecule can refer to the portion of a molecule without reactive functional groups. A core of a molecule can be a small molecule or a prepolymer.

"Derived from" as in "a moiety derived from a compound" refers to a moiety that is generated upon reaction of a parent compound with a reactant. For example, a bis(alkenyl) compound CH$_2$=CH—R—CH=CH$_2$ can react with another compound such as two compounds having thiol groups to produce the moiety —(CH$_2$)$_2$—R—(CH$_2$)$_2$— derived from the reaction of the alkenyl groups with the thiol groups. Furthermore, the moieties —(CH$_2$)$_2$— are derived from the reaction of an alkenyl group with a thiol group. For example, for a parent diisocyanate having the structure O=C=N—R—N=C=O, a moiety derived from the diisocyanate has the structure —C(O)—NH—R—NH—C(O)—. As another example, for a parent non-linear short chain diol having the structure HO—R—OH, a moiety derived from the non-linear short-chain diol has the structure —O—R—O— and the group —O— is derived from the reaction of the hydroxyl group with an isocyanate group. For example, an alkenyl-terminated parent moiety having the structure —CH=CH$_2$, upon reaction with a moiety having a terminal thiol group —SH, will produce the moiety —CH$_2$—CH$_2$—S— and the moiety —CH$_2$—CH$_2$—, and the moiety —S—, are said to be derived from reaction of the moiety —CH=CH$_2$ with the moiety having a terminal thiol group —SH.

"Derived from the reaction" such as in the expression "derived from the reaction of —R$^{10}$ with a thiol" refers to a moiety —R$^{10a}$— that results from the reaction of a thiol group with a moiety comprising a terminal group reactive with a thiol group. For example, a group V— can comprise CH$_2$=CH—CH$_2$—O—, where the terminal alkenyl group CH$_2$=CH— is reactive with a thiol group —SH. Upon reaction with a thiol group, the moiety —R$^{10a}$— is —CH$_2$—CH$_2$—CH$_2$—O—. For example, a bis(alkenyl) compound CH$_2$=CH—R—CH=CH$_2$ can react with another compound such as two compounds having thiol groups to produce the moiety —(CH$_2$)$_2$—R—(CH$_2$)$_2$— derived from the reaction.

A "core" of a compound or a prepolymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded. A core of a prepolymer such as a polythiol can be multifunctional such that the polythiol has the structure HS—R(—SH)$_w$—SH where w can be, for example, an integer from 1 to 20.

"Average molecular weight" refers to number average molecular weight. Number average molecular weight can be determined by gel permeation chromatography using a polystyrene standard, or for thiol-terminated prepolymers, can be determined using iodine titration.

Specific gravity and density of compositions and sealants is determined according to ISO 2781.

Glass transition temperature T$_g$ is determined by Dynamic Mass Analysis (DMA) using a TA Instruments Q800 apparatus with a frequency of 1 Hz, an amplitude of 20 microns, and a temperature ramp of −80° C. to 25° C., with the T$_g$ identified as the peak of the tan δ curve.

Particle size refers to the d50 particle size determined by a method appropriate for a particular particle size. For example, particle size of powders can be determined using ASTM E2651-13.

"Sulfur-containing prepolymer" refers to a prepolymer in which the repeating unit of the prepolymer backbone comprises sulfur atom such as —S— or —S$_n$— groups. Thiol-terminated prepolymers have reactive thiol groups at the ends of the prepolymer backbone. Prepolymers can have pendent reactive thiol groups extending from the prepolymer backbone. Prepolymers having only thiol-terminal and/or only pendent thiol groups are not encompassed by a sulfur-containing prepolymer.

Skydrol® is a fire-resistant hydraulic fluid based on phosphate ester chemistry. Skydrol® fluids include Skydrol® 500B-4, Skydrol® LD-4, Skydrol® 5, and Skydrol® PE-5 are commercially available from Eastman Chemical Company. For example, Skydrol® LD-4 containing about 58.2% tributyl phosphate, from 20% to 30% dibutyl phenyl phosphate, from 5% to 10% butyl diphenyl phosphate, less than 10% 2-ethylhexyl 7-oxabicyclo[4.1.0] heptane-3-carboxylate, and from 1% to 5% 2,6-di-tert-butyl-p-cresol.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{57}$ alkanediyl, and other sub-ranges, a $C_2$ alkanediyl, a $C_6$ alkanediyl, and alkanediyls having other specific number(s) of carbon atoms from 2 to 10.

"Diisocyanate" refers to an organic component having two isocyanate groups —N=C=O. A diisocyanate can include aliphatic diisocyanates, alicyclic diisocyanates, and aromatic diisocyanates. A diisocyanate can have a molecular weight, for example less than 1,500 Da, less than 1,250 Da, less than 1,000 Da, less than 750 Da, or less than 500 Da. Diisocyanates are capable of forming a covalent bond with a reactive group such as hydroxyl, thiol, or amine functional group. Diisocyanates useful in the present invention can be branched or unbranched. Use of branched diisocyanates may be desirable to increase the free volume within the cured polymer matrix to provide space for the molecules to move.

"Polyfunctionalizing agent" refers to a compound having reactive functionality of three or more, such as from 3 to 6. A polyfunctionalizing agent can have three reactive functional groups and can be referred to as a trifunctionalizing agent. Polyfunctionalizing agents can be used as precursors for synthesizing the sulfur-containing prepolymers provided by the present disclosure and/or can be used as a reactant in the polymer curing composition to increase the crosslinking density of the cured polymer network. A polyfunctionalizing agent can have reactive terminal thiol groups, reactive terminal alkenyl groups, or a combination thereof. A polyfunctionalizing agent can have a calculated molecular weight, for example, less than 1,400 Da, less than 1,200 Da, less than 1,000 Da, less than 800 Da, less than 700 Da, less than 600 Da, less than 500 Da, less than 400 Da, less than 300 Da, or less than 200 Da. For example, a polyfunctionalizing agent can have a calculated molecular weight from 100 Da to 2,000 Da, from 200 Da to 2,000 Da, from 200 Da to 1,800 Da, from 300 Da to 1,500 Da, or from 300 Da to 1,000 Da. A polyfunctionalizing agent can have the structure of Formula (1):

$$B(-R^{10})_z \quad (1)$$

where B is the core of the polyfunctionalizing agent, each $R^{10}$ is a moiety terminated in a reactive functional group such as a thiol group, an alkenyl group, an alkynyl group, an epoxy group, an isocyanate group, or a Michael acceptor group, and z is an integer from 3 to 6, such as 3, 4, 5, or 6. In polyfunctionalizing agents of Formula (1), each $—R^{10}$ can have the structure, for example, $—R—SH$ or $—R—CH=CH_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl.

When the moiety $R^{10}$ is reacted with another compound the moiety $—R^{10a}—$ results and is said to be derived from the reaction with the other compound. For example, when $R^{10}$ is $—R—CH=CH_2$ and is reacted, for example, with a thiol group, the moiety $R^{10a}$ is $—R—CH_2—CH_2—$ is derived from the reaction.

In polyfunctionalizing agents of Formula (1), B can be, for example $C_{2-8}$ alkane-triyl, $C_{2-8}$ heteroalkane-triyl, $C_{5-8}$ cycloalkane-triyl, $C_{5-8}$ heterocycloalkane-triyl, substituted $C_{5-8}$ cycloalkene-triyl, $C_{5-8}$ heterocycloalkane-triyl, $C_6$ arene-triyl, $C_{4-5}$ heteroarene-triyl, substituted $C_6$ arene-triyl, or substituted $C_{4-5}$ heteroarene-triyl.

In polyfunctionalizing agents of Formula (1), B can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylates polythiol polyfunctionalizing agents include tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy)diethanethiol, 1,8-dimercapto-3,6-dioxaoctane), and combinations of any of the foregoing.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate:

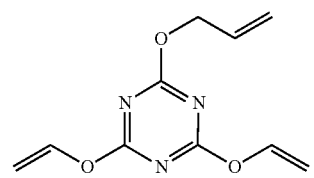 [SMILES: C=CCOc1nc(OC=C)nc(OC=C)n1]

can have the structure:

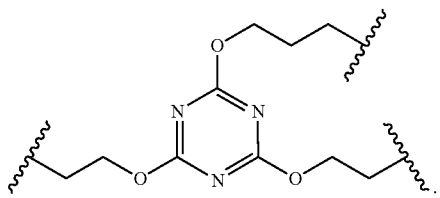 [SMILES: *CCCOc1nc(OCC*)nc(OCC*)n1]

where the segments are bonded to the other reactants.

"Polythiol polyfunctionalizing agent" refers to a polythiol having, for example, from 3 to 6 terminal thiol groups. A polythiol polyfunctionalizing agent can have a molecular weight, for example, less than 1,400 Da, less than 1,200 Da, less than 1,000 Da, less than 800 Da, less than 700 Da, less than 600 Da, less than 500 Da, less than 400 Da, less than 300 Da, less than 200 Da, or less than 100 Da. Polythiol polyfunctionalizing agents can be represented by the formula $B(—R^{10})_z$, where B represents a core of a z-valent polyfunctionalizing agent $B(—R^{10})_z$, z is an integer from 3 to 6; and each $—R^{10}$ is a moiety comprising a terminal thiol (—SH) group.

"Composition" is intended to encompass a product comprising the specified components in the specified amounts, as well as any product which results, directly or indirectly, from the combination of the specified ingredients in the specified amounts.

As used herein, the term "cure" or "cured" as used in connection with a composition, e.g., "composition when cured" or a "cured composition", means that any curable or crosslinkable components of the composition are at least partially reacted or crosslinked.

A "curable composition" refers to a composition that comprises at least two reactants capable of reacting to form a cured composition. For example, a curable composition can comprise a isocyanate-terminated chain-extended polythioether prepolymer and a polyamine capable of reacting to form a cured polymer. A curable composition may include a catalyst for the curing reaction and other components such as, for example, filler, pigments, and adhesion promoters. A curable composition may be curable at room temperature (23° C.) or may require exposure to elevated temperature such as a temperature above room temperature (23° C.) or other condition(s) to initiate and/or to accelerate the curing reaction. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed, and the viscosity of the curable composition can increase and at some point, will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least Shore 30A for a Class B sealant or a Class C sealant. After a sealant has cured to a hardness of Shore 30A it can take from several days to several weeks for a curable composition fully cure. A composition is considered fully cured when the hardness no longer increases. Depending on the formulation, a fully cured sealant can exhibit, for example, a hardness from Shore 40A to Shore 70A, determined according to ISO 868. For coating applications, a curable composition can have a viscosity, for example, from 200 cps to 800 cps 0.2 Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"Molecular weight" refers to a theoretical molecular weight estimated from the chemical structure of a compound such as a monomeric compound, or a number average molecular weight as appropriate for a prepolymer determined, for example, using gel permeation chromatography using polystyrene standards.

"Prepolymer" refers to oligomers, homopolymers, and copolymers. A prepolymer includes repeating units in the prepolymer backbone. A homopolymer refers to a prepolymer in which the repeat units are the same. A copolymer refers to a prepolymer includes alternating copolymers, random copolymers, and block copolymers. A prepolymer can have a number average molecular weight, for example, greater than 1,000 Da, greater than 2,000 Da, or greater 3,000 Da. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (23° C.) and pressure (760 torr; 101 kPa). Prepolymers are reacted with another compound to provide a cured polymer network.

A prepolymer includes multiple repeating subunits bonded to each other than can be the same or different. The multiple repeating subunits make up the backbone of the prepolymer.

"A thiol-terminated prepolymer" refers to a prepolymer having two or more reactive terminal thiol groups. The reactive terminal thiol groups can react with complimentary reactive groups of a curing agent.

A "terminal-modified prepolymer" or "terminal-modified chain-extended prepolymer" refers to a prepolymer having two or more reactive terminal groups other than thiol groups such as, for example, terminal alkenyl groups, epoxy groups, hydroxyl groups, amine groups, Michael acceptor groups, Michael donor groups, or isocyanate groups. A terminal-modified prepolymer can be prepared, for example, be reacting a thiol-terminated prepolymer with a compound having a reactive terminal group and a group reactive with a thiol group.

A small molecule refers to polythiol generally having a molecular weight such as less than 2,000 Da, less than 1,000 Da, less than 800 Da, less than 600 Da, or less than 500 Da, i.e. in general less than that of a typical polythiol prepolymer. Suitable thiol-terminated monomers can be characterized, for example, by a weight average molecular weight from 200 Da to 2,000 Da, from 200 Da to 1,500 Da, from 200 Da to 1,000 Da, from 500 Da to 2,000 Da, or from 500 Da to 1,500 Da. A small molecule polythiol may or may not have repeating units. Specific gravity is determined according to ASTM D1475.

Shore A hardness is measured using a Type A durometer in accordance with ASTM D2240.

Tensile strength and elongation are measured according to ASTM D412.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Chemical resistant sealants provided by the present disclosure include chain-extended sulfur-containing prepolymers. The chain-extended sulfur-containing prepolymers can have a higher molecular weight than sulfur-containing prepolymers typically used in aerospace sealants.

Chain-extended sulfur-containing prepolymers provided by the present disclosure can be prepared from lower molecular weight non-chain-extended sulfur-containing prepolymers. The sulfur-containing prepolymers can be chain-extended by incorporating small molecules into the prepolymer backbone to provide the chain-extended sulfur-containing prepolymers. The chain-extended sulfur-containing prepolymers have a higher equivalent weight than the parent sulfur-containing prepolymers and can include polyfunctional compounds incorporated into the prepolymer backbone. Chain-extended sulfur-containing prepolymers can be prepared by incorporating small molecules into the prepolymer backbone of the sulfur-containing prepolymers where the small molecules can have an average functionality of two (2) or more.

Cured coatings and sealants prepared using the chain-extended sulfur-containing prepolymers can have a greater degree of intra-chain interaction, a greater degree of inter- and intra-chain entanglement, or a combination thereof, compared to coatings and sealants prepared using comparable non-chain-extended sulfur-containing prepolymers. The cured coatings and sealants prepared using the chain-extended sulfur-containing prepolymers also exhibit improved chemical resistance. The chain-extended sulfur-containing prepolymers can be thiol-terminated or can be modified to include other terminal functional groups. The physical properties of a sealant can degrade upon exposure to aerospace hydraulic fluids such as phosphate ester hydraulic fluids. An example of a phosphate ester hydraulic fluid is Skydrol® LD-4. It can be expected that although the initial properties of a sealant such as tensile strength, elongation, hardness and adhesion decrease following exposure to an aerospace fluid, it is desirable that these properties stabilize and not continue to decrease during continued exposure.

Chain-extended sulfur-containing prepolymers can comprise a chain-extended polythioether prepolymer, a chain-extended polysulfide prepolymer, a chain-extended sulfur-containing polyformal prepolymer, a chain-extended monosulfide prepolymer, or a combination of any of the foregoing.

Chain-extended sulfur-containing prepolymers can have a number average molecular weight, for examples from 2,000 Da to 20,000 Da, from 3,000 Da to 16,000 Da, from 4,000 Da to 14,000 Da, or from 6,000 Da to 12,000 Da.

A chain extended sulfur-containing prepolymer can have an average reactive functionality, for example, from 2 to 20, from 2 to 16, from 2 to 12, from 2 to 8, or from 2 to 6. A chain-extended sulfur-containing prepolymer can have an average reactive functionality greater than 2, greater than 4, greater than 6, greater than 8, greater than 10, or greater than 12. A chain-extended sulfur-containing prepolymer can have an average reactive functionality less than 20, less than 16, less than 12, less than 8, less than 6, or less than 4.

A chain-extended sulfur-containing prepolymer can be terminated in any suitable reactive functional group as appropriate for a particular curing chemistry. For example, a chain-extended sulfur-containing prepolymer can comprise two or more terminal functional groups, wherein each of the two or more functional groups independently comprises a thiol group, an epoxy group, an alkenyl group, an alkynyl group, a Michael acceptor group, a Michael donor group, a hydroxyl group, an amine group, an isocyanate group, or combinations of any of the foregoing. A chain-extended sulfur-containing prepolymer can be thiol-terminated. In a chain-extended sulfur-containing prepolymer each reactive functional group can be the same.

A chain-extended sulfur-containing prepolymer can comprise the reaction product of reactants comprising a chain extender and a sulfur-containing prepolymer. The backbone of the chain-extended sulfur-containing prepolymer can have alternating segments derived from the chain extender and from the sulfur containing prepolymer. For example, the backbone of the chain-extended sulfur-containing prepolymer can have, for example, from 1 to 4 segments derived from the chain extender, from 1 to 3, or from 1 to 2, segments derived from the sulfur-containing prepolymer. For example, the backbone of the chain-extended sulfur-containing prepolymer can have more than 1 segment derived from the chain extender, more than 2, or more than 3, segments derived from the sulfur-containing prepolymer. For example, the backbone of the chain-extended sulfur-containing prepolymer can have 1, 2, 3, or 4 segments derived from the chain-extender. The ratio of segments derived from a sulfur-containing prepolymer to segments derived from a chain extender can be, for example, greater than 2:1, greater than 3:1, greater than 4:1, greater than 5:1, greater than 6:1, greater than 7:1, greater than 8:1, greater than 9:1, or greater than 10:1. The ratio of segments derived from a sulfur-containing prepolymer to segments derived from a chain extender can be, for example, from 2:1 to 10:1, from 3:1 to 9:1, from 3:1 to 8:1, from 3:1 to 7:1, or from 4:1 to 6:1.

A chain-extended sulfur-containing prepolymer provided by the present disclosure can include a polyfunctional chain extender terminated with a sulfur-containing prepolymer.

For example, a polyfunctional chain extender can have a functionality from 3 to 6, or an average functionality from 3 to 6, and each functional group can be terminated with a sulfur-containing prepolymer having a functionality from 2 to 6, or an average functionality from 2 to 6, such as from 2 to 5, from 2 to 4, or from 2 to 3. It should be appreciated, however, in practice a chain-extended sulfur-containing prepolymer can be a complex mixture of the reaction products of a chain extender and a sulfur-containing prepolymer where the distribution the chain-extended sulfur-containing prepolymers in the reaction products is determined by the stoichiometry of the reactants. For example, the stoichiometry of the reactants can be selected that the reactive functional groups of the chain-extended prepolymer are those derived from the sulfur-containing prepolymer.

A chain-extended sulfur-containing prepolymer can comprise the reaction product of reactants comprising a chain-extender and a non-chain-extended sulfur-containing prepolymer.

A non-chain-extended sulfur-containing prepolymer, or simply a sulfur-containing prepolymer, can comprise a polythioether prepolymer, a polysulfide prepolymer, a sulfur-containing polyformal prepolymer, a monosulfide prepolymer, or a combination of any of the foregoing.

A sulfur-containing prepolymer can have a number average molecular weight, for example, from 1,000 Da, to 10,000 Da, from 1,000 Da to 8,000 Da, from 1,000 Da, to 6,000 Da, from 1,000 Da to 5,000 Da, from 1,000 Da to 4,000 Da, or from 1,000 Da to 3,000 Da. A sulfur-containing prepolymer can have a number average molecular weight, for example, less than 10,000 Da, less than 8,000 Da, less than 6,000 Da, less than 4,000 Da, or less than 3,000 Da.

A sulfur-containing prepolymer can have a reactive functionality, for example, from 2 to 6, from 2 to 5, from 2 to 4, from 2 to 8, from 2 to 3, or can have a reactive functionality of 2.

A sulfur-containing prepolymer or a combination of sulfur-containing prepolymers can have an average reactive functionality, for example, from 2 to 6, from 2 to 5, from 2 to 4, from 2 to 3, from 2.1 to 2.9, or from 2 to 2.5.

A sulfur-containing prepolymer can be terminated in any suitable reactive functional group as appropriate for a particular chemistry. For example, a sulfur-containing prepolymer can comprise two or more terminal functional groups, wherein each of the two or more functional groups independently comprises a thiol group, an epoxy group, an alkenyl group, an alkynyl group, a Michael acceptor group, a Michael donor group, a hydroxyl group, an amine group, an isocyanate group, or combinations of any of the foregoing. A sulfur-containing prepolymer can be thiol-terminated. In a sulfur-containing prepolymer each reactive functional group can be the same.

A sulfur-containing prepolymer can comprise a thiol-terminated sulfur-containing prepolymer such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

A thiol-terminated sulfur-containing prepolymer can have the structure of Formula (2):

$$E(\text{-SH})_w \quad (2)$$

where w is an integer from 2 to 20, and E is the core of the thiol-terminated sulfur-containing prepolymer. For example, a thiol-terminated prepolymer of Formula (2) can have the structure:

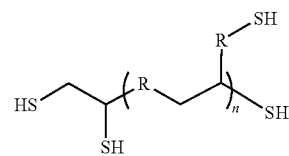

where w is 4, n is an integer, each R is independently an organic moiety containing at least one sulfur atom, and E has the structure:

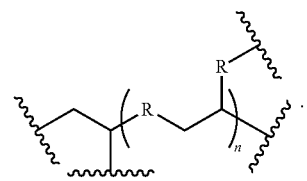

A chain-extended sulfur-containing prepolymer can comprise a chain-extended sulfur-containing prepolymer comprising a moiety having the structure of Formula (3) or can comprise a thiol-terminated chain-extended sulfur-containing prepolymer having a moiety of Formula (3a):

$$D[-R^{4a}-S-E(-S-)_{w-1}]_t \quad (3)$$

$$D[-R^{4a}-S-E(-SH)_{w-1}]_t \quad (3a)$$

wherein, each t is independently an integer from 2 to 6;

each w is independently an integer from 2 to 6;

each $R^{4a}$ is derived from the reaction of a thiol-reactive group $R^4$ with a thiol group;

each E is a core of a thiol-terminated sulfur-containing prepolymer $E(\text{-SH})_w$; and each $D(-R^{4a})_t$ is independently derived a chain extender, wherein the chain extender has the structure of Formula (4):

$$D(-R^4)_t \quad (4).$$

For example, a thiol-terminated chain-extended sulfur-containing prepolymer of Formula (3a) can have the structure:

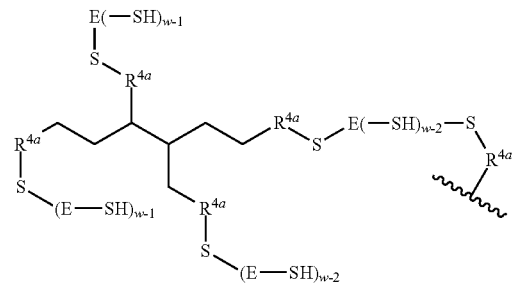

wherein E, w, $R^{4a}$ can be defined as in Formula (2) and D has the structure:

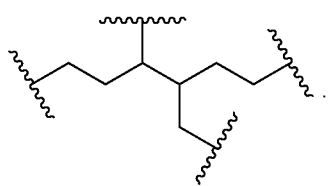 [SMILES: *CCC(*)C(C*)CC*]

As another example, thiol-terminated sulfur-containing prepolymer of the formula $E(-SH)_w$ can be reacted with a polyepoxide of the formula

to provide a thiol-terminated chain-extended sulfur-containing prepolymer having the structure $D[-CH(-OH)-CH_2-S-E(-SH)_{w-1}]_t$.

As another example, a dithiol sulfur-containing prepolymer $E(-SH)_2$ can be reacted with a diepoxide chain extender having the formula

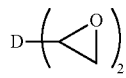

to provide a thiol-terminated chain-extended sulfur-containing prepolymer having the structure $D[-CH(-OH)-CH_2-S-E-SH]_2$.

In a thiol-terminated chain-extended sulfur-containing prepolymer of Formula (3), each —S— can be independently bonded to a hydrogen or can be bonded to a moiety $D(-R^{4a}-)_t$; and each —$R^{4a}$— can be independently bonded to a moiety of Formula (2a):

$$-S-E(-S-)_{w-1} \quad (2a)$$

For example, a thiol-terminated chain-extended sulfur-containing prepolymer of Formula (3a) can have the structure:

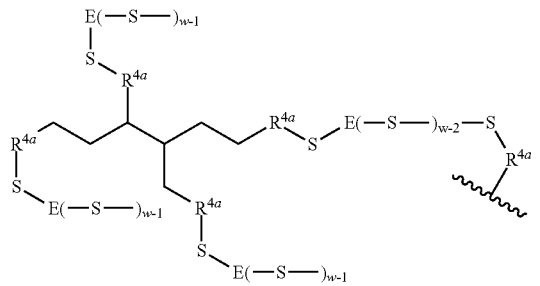

wherein at least one —$S-E(-S-)_{w-1}$ moiety is bonded to a second chain extender, and the other —$S-E-(-S-)_{w-1}$ moieties are bonded to hydrogen atoms; and at least one —$S-E(-S-)_{w-2}$ moiety is bonded to a second chain extender, and the other —$S-E-(-S-)_{w-1}$ moieties are bonded to hydrogen atoms.

In a thiol-terminated chain-extended prepolymer, each thiol-reactive group of the chain-extender can be terminated in a moiety of Formula (2a) derived from the reaction of the thiol-reactive group of the chain extender with a thiol group of the thiol-terminated sulfur-containing prepolymer of Formula (2).

In a chain-extended sulfur-containing prepolymer of Formula (3), each —S— can be independently bonded to a moiety comprising a terminal functional group such as an alkenyl group, an alkynyl group, an epoxy group, an isocyanate group, and amine group, a hydroxyl group, a Michael acceptor or a Michael donor; and each —$R^{4a}$— can be independently bonded to the moiety comprising a terminal functional group through a moiety of Formula (2b):

$$-S-E(-S-)_{w-1} \quad (2b).$$

For example, a chain-extended sulfur-containing prepolymer of Formula (3) can encompass a prepolymer having the structure $D[-R^{4a}-S-E(-S-R^{11})_{w-1}]_t$ where $R^{11}$ is a moiety comprising a terminal functional group. For example, $R^{11}$ can be a moiety having a terminal hydroxyl group and can be derived from the reaction of a thiol-terminated prepolymer of Formula (3a) with a hydroxy vinyl ether. When the hydroxy vinyl ether is hydroxybutyl vinyl ether, the hydroxy-terminated chain-extended sulfur-containing prepolymer can have the structure $D[-R^{4a}-S-E(-S-(CH_2)_2-O-(CH_2)_4-OH)_{w-1}]_t$.

A thiol-terminated chain-extended sulfur-containing prepolymer of Formula (3a) and a chain-extended sulfur-containing prepolymer of Formula (3) can be derived from a thiol-terminated polythioether prepolymer or combination of thiol-terminated polythioether prepolymers, where E comprises the backbone of the thiol-terminated polythioether prepolymer.

In a thiol-terminated polythioether prepolymer of Formula (2):

$$E(-SH)_w \quad (2)$$

wherein w can be from 2 to 6, and E can comprise a moiety having the structure of Formula (5):

$$-S-R^1-[S-A-S-R^1-]_nS- \quad (5)$$

wherein, n can be an integer from 1 to 60;

each $R^1$ can be independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, where, p can be an integer from 2 to 6;

q can be an integer from 1 to 5;

r can be an integer from 2 to 10;

each $R^3$ can be independently selected from hydrogen and methyl; and each X can be independently selected from O, S, S—S, and NR, wherein R is selected from hydrogen and methyl; and each A can be independently a moiety derived from a polyvinyl ether of Formula (6) and a polyalkenyl polyfunctionalizing agent of Formula (7):

$$CH_2=CH-O-(R^2-O)_m-CH=CH_2 \quad (6)$$

$$B(-R^8-CH=CH_2)_z \quad (7)$$

wherein, m can be an integer from 0 to 50;

each $R^2$ can be independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;

B represents a core of a z-valent, polyalkenyl polyfunctionalizing agent $B(-R^8-CH=CH_2)_z$ wherein, z can be an integer from 3 to 6; and
each $R^8$ can be independently selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (5), $R^1$ can be $C_{2-10}$ alkanediyl.

In moieties of Formula (5), $R^1$ can be $-[(CHR^3)_p-X-]_q(CHR^3)_r-$.

In moieties of Formula (5), X can be selected from O and S, and thus $-[(CHR^3)_p-X-]_q(CHR^3)_r-$ in Formula (5) can be $-[(CHR^3)_p-O-]_q(CHR^3)_r-$ or $-[(CHR^3)_p-S-]_q(CHR^3)_r-$. P and r can be equal, such as where p and r can both be two.

In moieties of Formula (5), $R^1$ can be selected from $C_{2-6}$ alkanediyl and $-[(CHR^3)_p-X-]_q(CHR^3)_r-$.

In moieties of Formula (5), $R^1$ can be $-[(CHR^3)_p-X-]_q(CHR^3)_r-$, and X can be O, or X can be S.

In moieties of Formula (5) where $R^1$ can be $-[(CHR^3)_p-X-]_q(CHR^3)_r-$, p can be 2, r can be 2, q can be 1, and X can be S; or p can be 2, q can be 2, r can be 2, and X can be O; or p can be 2, r can be 2, q can be 1, and X can be O.

In moieties of Formula (5) where $R^1$ can be $-[(CHR^3)_p-X-]_q(CHR^3)_r-$, each $R^3$ can be hydrogen, or at least one $R^3$ can be methyl.

In moieties of Formula (5), $R^1$ can be $-[(CH_2)_p-X-]_q(CH_2)_r-$ wherein each X can independently be selected from O and S. In moieties of Formula (5), $R^1$ can be $-[(CH_2)_p-X-]_q(CH_2)_r-$ each X can be O or each X can be S.

In moieties of Formula (5), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In moieties of Formula (5), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis (ethan-1-thiol)), and combinations thereof.

In moieties of Formula (5), each p can independently be selected from 2, 3, 4, 5, and 6. Each p can be the same and can be 2, 3, 4, 5, or 6.

In moieties of Formula (5) each q can independently be 1, 2, 3, 4, or 5. Each q can be the same and can be 1, 2, 3, 4, or 5.

In moieties of Formula (5), each r can independently be 2, 3, 4, 5, 6, 7, 8, 9, or 10. Each r can be the same and can be 2, 3, 4, 5, 6, 7, 8, 9, or 10.

In moieties of Formula (5), each r can independently be an integer from 2 to 4, from 2 to 6, or from 2 to 8.

In moieties of Formula (5), each A can be derived from a polyvinyl ether such as a divinyl ether. A divinyl ether can comprise a divinyl ether having the structure of Formula (6).

In divinyl ethers of Formula (6), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (6), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (6), each $R^2$ can independently be a $C_{2-10}$ n-alkanediyl group, such as methanediyl, ethanediyl, n-propanediyl, or n-butanediyl.

In divinyl ethers of Formula (6), each $R^2$ can independently comprise a $-[(CH_2)_p-X-]_q(CH_2)_r$ group, where each X can be O or S.

In divinyl ethers of Formula (6), each $R^2$ can independently comprise a $-[(CH_2)_p-X-]_q(CH_2)_r-$ group.

In divinyl ethers of Formula (6), each m can be independently an integer from 1 to 3. Each m can be the same and is can be 1, 2, or 3.

In divinyl ethers of Formula (6), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (6), each $R^2$ can independently be a $C_{2-10}$ n-alkanediyl group.

In divinyl ethers of Formula (6), each $R^2$ can independently be a $-[(CH_2)_p-X-]_q(CH_2)_r-$ group, where each X can be O or S.

In divinyl ethers of Formula (6), each $R^2$ can independently be a $-[(CH_2)_p-X-]_q(CH_2)_r-$ group, where each X can be O or S, and each p can independently be 2, 3, 4, 5, and 6.

In divinyl ethers of Formula (6), each p can be the same and can be 2, 3, 4, 5, or 6.

In divinyl ethers of Formula (6), each $R^2$ can independently be a $-[(CH_2)_p-X-]_q(CH_2)_r-$ group, where each X can be O or S, and each q can independently be 1, 2, 3, 4, or 5.

In divinyl ethers of Formula (6), each q can be the same and can be 1, 2, 3, 4, or 5.

In divinyl ethers of Formula (6), each $R^2$ can independently be a $-[(CH_2)_p-X-]_q(CH_2)_r-$ group, where each X can be O or S, and each r can independently be 2, 3, 4, 5, 6, 7, 8, 9, or 10.

In divinyl ethers of Formula (6), each r can be the same and can be 2, 3, 4, 5, 6, 7, 8, 9, or 10. In divinyl ethers of Formula (6), each r can independently be an integer from 2 to 4, from 2 to 6, or from 2 to 8.

Examples of suitable divinyl ethers include ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, polytetrahydrofuryl divinyl ether, and combinations of any of the foregoing.

A divinyl ether can comprise a sulfur-containing divinyl ether. Examples of suitable sulfur-containing divinyl ethers are disclosed, for example, in PCT Publication No. WO 2018/085650.

In moieties of Formula (5) each A can independently be derived from a polyalkenyl polyfunctionalizing agent. A polyalkenyl polyfunctionalizing agent can have the structure of Formula (7), where z can be 3, 4, 5, or 6.

In polyalkenyl polyfunctionalizing agents of Formula (7), each $R^8$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, —OH, =O, $C_{1-4}$ alkyl, and $C_{1-4}$ alkoxy. The one or more heteroatoms can be selected from, for example, 0, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione, 1,3-bis (2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris (prop-2-enyl)-1,3,5-triazinane-2,4-dione, 1,3,5-tris(2-methylallyl)-1,3,5-triazinane-2,4,6-trione, 1,2,4-trivinylcyclohexane, and combinations of any of the foregoing.

In moieties of Formula (5) the molar ratio of moieties derived from a divinyl ether to moieties derived from a polyalkenyl polyfunctionalizing agent can be, for example, from 0.9 mol % to 0.999 mol %, from 0.95 mol % to 0.99 mol %, or from 0.96 mol % to 0.99 mol %.

In moieties of Formula (5), each $R^1$ can be —$(CH_2)_2$—O—$(CH_2)_2$—O—$(CH_2)_2$—; each $R^2$ can be —$(CH_2)_2$—; and n can be an integer from 1 to 4.

In moieties of Formula (5), $R^2$ can be derived from a divinyl ether such a diethylene glycol divinyl ether, a polyalkenyl polyfunctionalizing agent such as triallyl cyanurate, or a combination thereof.

In moieties of Formula (5), each A can independently be selected from a moiety of Formula (6a) and a moiety of Formula (7a):

$$—(CH_2)_2—O—(R^2—O)_m—(CH_2)_2— \quad (6a)$$

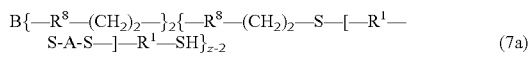
$$B\{—R^8—(CH_2)_2—\}_2\{—R^8—(CH_2)_2—S—[—R^1—S-A-S—]—R^1—SH\}_{z-2} \quad (7a)$$

where m, $R^1$, $R^2$, $R^8$, A, and z are defined as in Formula (6) and Formula (7).

In moieties of Formula (5),
each $R^1$ can be —$(CH_2)_2$—O—$(CH_2)_2$—O—$(CH_2)_2$—;
each $R^2$ can be —$(CH_2)_2$—;
m can be an integer from 1 to 4; and
the polyfunctionalizing agent $B(—R^8—CH=CH_2)_z$ can be triallyl cyanurate where z is 3 and each $R^8$ is —O—$CH_2$—$CH=CH_2$.

A thiol-terminated polythioether prepolymer can have the structure of Formula (5a):

$$HS—R^1—[S-A-S—R^1—]_n—SH \quad (5a)$$

wherein,
n can be an integer from 1 to 60;
each $R^1$ can be independently selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR^3)_p—X—]_q(CHR^3)_r$—, wherein,
p is an integer from 2 to 6;
q is an integer from 1 to 5;
r is an integer from 2 to 10;
each $R^3$ can be independently selected from hydrogen and methyl; and
each X can be independently selected from O, S, S—S, and NR, wherein R can be selected from hydrogen and methyl; and
each A can be independently selected from a moiety derived from a divinyl ether of Formula (6) and a moiety derived from a polyalkenyl polyfunctionalizing agent of Formula (7):

$$CH_2=CH—O—(R^2—O)_m—CH=CH_2 \quad (6)$$

$$B(—R^8—CH=CH_2)_z \quad (7)$$

wherein,
each $R^2$ can be independently selected from $C_{1-10}$ alkanediyl, $C_{6-8}$ cycloalkanediyl, $C_{6-14}$ alkanecycloalkanediyl, and —$[(CHR^3)_p—X—]_q(CHR^3)_r$—, wherein p, q, r, $R^3$, and X are as defined as for $R^1$;
m can be an integer from 0 to 50;
B represents a core of a z-valent, polyalkenyl polyfunctionalizing agent $B(—R^8—CH=CH_2)_z$ wherein,
z is an integer from 3 to 6; and
each $R^8$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In thiol-terminated polythioether prepolymers of Formula (5a), $R^1$ can be $C_{2-10}$ alkanediyl.

In thiol-terminated polythioether prepolymers of Formula (5a), $R^1$ can be —$[(CHR^3)_p—X—]_q(CHR^3)_r$—.

In thiol-terminated polythioether prepolymers of Formula (5a), X can be selected from O and S, and thus —$[(CHR^3)_p—X—]_q(CHR^3)_r$— in Formula (5a) can be —$[(CHR^3)_p—O—]_q(CHR^3)_r$— or —$[(CHR^3)_p—S—]_q(CHR^3)_r$—. P and r can be equal, such as where p and r can be both two.

In thiol-terminated polythioether prepolymers of Formula (5a), $R^1$ can be selected from $C_{2-6}$ alkanediyl and —$[(CHR^3)_p—X—]_q(CHR^3)_r$—.

In thiol-terminated polythioether prepolymers of Formula (5a), $R^1$ can be —$[(CHR^3)_p—X—]_q(CHR^3)_r$—, and X can be O, or X can be S.

In thiol-terminated polythioether prepolymers of Formula (5a), where $R^1$ can be —$[(CHR^3)_p—X—]_q(CHR^3)_r$—, p can be 2, r can be 2, q can be 1, and X can be S; or p can be 2, q can be 2, r can be 2, and X can be O; or p can be 2, r can be 2, q can be 1, and X can be O.

In thiol-terminated polythioether prepolymers of Formula (5a), where $R^1$ can be —$[(CHR^3)_p—X—]_q(CHR^3)_r$—, each $R^3$ can be hydrogen, or at least one $R^3$ can be methyl.

In thiol-terminated polythioether prepolymers of Formula (5a), $R^1$ can be —$[(CH_2)_p—X—]_q(CH_2)_r$— wherein each X can independently be selected from O and S. In thiol-terminated polythioethers of Formula (5a), $R^1$ can be —$[(CH_2)_p—X—]_q(CH_2)_r$— each X can be O or each X can be S.

In thiol-terminated polythioether prepolymers of Formula (5a), $R^1$ can be —$[(CH_2)_p—X—]_q(CH_2)_r$—, where p can be 2, X can be O, q can be 2, r can be 2, $R^2$ can be ethanediyl, m can be 2, and n can be 9.

In thiol-terminated polythioether prepolymers of Formula (5a), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In thiol-terminated polythioether prepolymers of Formula (5a), each p can independently be selected from 2, 3, 4, 5, and 6. Each p can be the same and can be 2, 3, 4, 5, or 6.

In thiol-terminated polythioether prepolymers of Formula (5a), each q can independently be 1, 2, 3, 4, or 5. Each q can be the same and can be 1, 2, 3, 4, or 5.

In thiol-terminated polythioether prepolymers of Formula (5a), each r can independently be 2, 3, 4, 5, 6, 7, 8, 9, or 10. Each r can be the same and can be 2, 3, 4, 5, 6, 7, 8, 9, or 10.

In thiol-terminated polythioether prepolymers of Formula (5a), each r can independently be an integer from 2 to 4, from 2 to 6, or from 2 to 8.

In thiol-terminated polythioether prepolymers of Formula (5a), each A can independently be selected from a moiety of Formula (6a) and a moiety of Formula (7a):

$$—(CH_2)_2—O—(R^2—O)_m—(CH_2)_2— \quad (6a)$$

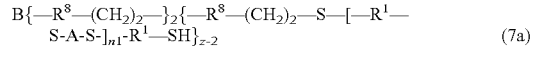
$$B\{—R^8—(CH_2)_2—\}_2\{—R^8—(CH_2)_2—S—[—R^1—S-A-S—]_{n1}-R^1—SH\}_{z-2} \quad (7a)$$

where m, $R^1$, $R^2$, $R^8$, A, n1, and z are defined as in Formula (6) and Formula (7).

In thiol-terminated polythioether prepolymers of Formula (5a) the molar ratio of moieties derived from a divinyl ether to moieties derived from a polyalkenyl polyfunctionalizing agent can be, for example, of 200:1, 150:1, 100:1, 50:1, or 25:1.

A thiol-terminated polythioether prepolymer can comprise a thiol-terminated polythioether prepolymer of Formula (5b), a thiol-terminated polythioether prepolymer of Formula (5c), or a combination thereof:

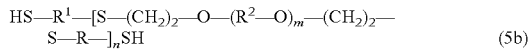  (5b)

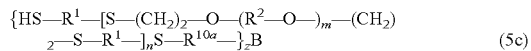  (5c)

wherein,
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein,
p is an integer from 2 to 6;
q is an integer from 1 to 5;
r is an integer from 2 to 10;
each $R^3$ independently be selected from hydrogen or methyl; and
each X can independently be selected from O, S, S—S, and NR, wherein R comprises hydrogen or methyl;
each $R^2$ can independently be selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
m is an integer from 0 to 50;
n is an integer from 1 to 60;
B represents a core of a z-valent, polyfunctionalizing agent $B(-R^{10})_z$ wherein,
z is an integer from 3 to 6; and
each $R^{10}$ is a moiety comprising a terminal group reactive with a thiol; and
each $-R^{10a}-$ is derived from the reaction of $-R^{10}$ with a thiol.

Various methods can be used to prepare thiol-terminated polythioether prepolymers of Formula (5a)-(5c) and moieties of Formula (5). Examples of suitable thiol-terminated polythioether prepolymers, and methods for their production, are described, for example, in Example 1 of U.S. Pat. No. 6,172,179. Such thiol-terminated polythioether prepolymers may be difunctional, that is, linear polythioethers having two terminal thiol groups, or can be polyfunctional, that is, branched polythioether prepolymers having three or more terminal thiol groups.

A thiol-terminated polythioether prepolymer may comprise a mixture of different thiol-terminated polythioether prepolymers in which the thiol-terminated polythioether prepolymers may have the same or different thiol functionality.

A thiol-terminated polythioether or combination of thiol-terminated polythioether prepolymers can have an average thiol functionality, for example, from 2 to 6, from 2 to 4, from 2 to 3, from 2.05 to 2.8, or from 2.05 to 2.5. For example, a thiol-terminated polythioether prepolymer can comprise a difunctional thiol-terminated polythioether prepolymer, a trifunctional thiol-terminated polythioether prepolymer, or a combination thereof.

Thiol-terminated polythioether prepolymers can be prepared by reacting a dithiol and a diene such as a divinyl ether, and the respective amounts of the reactants used to prepare the polythioethers can be chosen to yield terminal thiol groups. Thus, in some cases, (n or >n, such as n+1) moles of a dithiol or a mixture of at least two different dithiols and 0.05 moles to 1 moles, such as from 0.1 moles to 0.8 moles, of an alkenyl-terminated polyfunctionalizing agent may be reacted with (n) moles of a diene, such as a divinyl ether, or a combination of at least two different dienes, such as a combination of two different divinyl ethers.

An alkenyl-terminated polyfunctionalizing agent can be present in the reaction mixture in an amount sufficient to provide a thiol-terminated polythioether prepolymer having an average thiol functionality, for example, from 2.05 to 3, such as from 2.1 to 2.8, or from 2.1 to 2.6.

A reaction used to prepare a thiol-terminated polythioether prepolymer may be catalyzed by a free radical catalyst. Suitable free radical catalysts include azo compounds, for example, azobisnitrile compounds such as azo(bis)isobutyronitrile (AIBN); organic peroxides, such as benzoyl peroxide and tert-butyl peroxide; and inorganic peroxides, such as hydrogen peroxide. The reaction can also be initiated by irradiation with ultraviolet light either with or without a radical initiator/photosensitizer. Ionic catalysis methods, using either inorganic or organic bases such as triethylamine, may also be used.

Suitable thiol-terminated polythioether prepolymers may be produced by reacting a divinyl ether or combination of divinyl ethers and an alkenyl-terminated polyfunctionalizing agent or combination of alkenyl-terminated polyfunctionalizing agents with an excess of dithiol.

Thiol-terminated polythioether prepolymers can comprise the reaction product of reactants comprising:
(a) a dithiol of Formula (8):

  (8)

where,
$R^1$ can be selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CHR^3)_p-X-]_q(CHR^3)_r-$;
each $R^3$ can be independently selected from hydrogen and methyl;
each X can be independently selected from O, S, S—S, and NR wherein R is selected from hydrogen and methyl;
p can be an integer from 2 to 6;
q can be an integer from 1 to 5; and
r can be an integer from 2 to 10; and
(b) a divinyl ether of Formula (6):

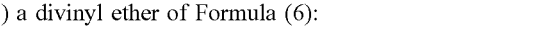  (6)

where,
each $R^2$ can be independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined above; and
m can be an integer from 0 to 50.

The reactants can further comprise (c) an alkenyl-terminated polyfunctionalizing agent such as a polyfunctional compound $B(-R^{10})_z$, where B, $-R^{10}$, and z are as defined as in Formula (1).

In dithiols of Formula (8), $R^1$ can be $C_{2-10}$ alkanediyl.
In dithiols of Formula (8), $R^1$ can be $-[(CHR^3)_p-X-]_q(CHR^3)_r-$.
In dithiols of Formula (8), X can be selected from O and S, and thus $-[(CHR^3)_p-X-]_q(CHR^3)_r-$ in Formula (8) can be $-[(CHR^3)_p-O-]_q(CHR^3)_r-$ or $-[(CHR^3)_p-S-]_q(CHR^3)_r-$. P and r can be equal, such as where p and r can be both two.
In dithiols of Formula (8), $R^1$ can be selected from $C_{2-6}$ alkanediyl and $-[(CHR^3)_p-X-]_q(CHR^3)_r-$.
In dithiols of Formula (8), $R^1$ can be $-[(CHR^3)_p-X-]_q(CHR^3)_r-$, and X can be O, or X can be S.
In dithiols of Formula (8) where $R^1$ can be $-[(CHR^3)_p-X-]_q(CHR^3)_r-$, p can be 2, r can be 2, q can be 1, and X can be S; or p can be 2, q can be 2, r can be 2, and X can be O; or p can be 2, r can be 2, q can be 1, and X can be O.

In dithiols of Formula (8) where $R^1$ can be $—[(CHR^3)_p—X—]_q(CHR^3)_r—$, each $R^3$ can be hydrogen, or at least one $R^3$ can be methyl.

In dithiols of Formula (8), $R^1$ can be $—[(CH_2)_p—X—]_q(CH_2)_r—$ wherein each X can independently be selected from O and S. In dithiols of Formula (8), $R^1$ can be $—[(CH_2)_p—X—]_q(CH_2)_r—$ each X can be O or each X can be S.

In dithiols of Formula (8), $R^1$ can be $—[(CH_2)_p—X—]_q(CH_2)_r—$, where p can be 2, X can be O, q can be 2, r can be 2, $R^2$ can be ethanediyl, m can be 2, and n can be 9.

In dithiols of Formula (8), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis (ethan-1-thiol)), and combinations thereof.

In dithiols of Formula (8), each p can independently be selected from 2, 3, 4, 5, and 6. Each p can be the same and can be 2, 3, 4, 5, or 6.

In dithiols of Formula (8) each q can independently be 1, 2, 3, 4, or 5. Each q can be the same and can be 1, 2, 3, 4, or 5.

In dithiols of Formula (8), each r can independently be 2, 3, 4, 5, 6, 7, 8, 9, or 10. Each r can be the same and can be 2, 3, 4, 5, 6, 7, 8, 9, or 10.

In dithiols of Formula (8), each r can independently be an integer from 2 to 4, from 2 to 6, or from 2 to 8.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a $C_{1-6}$ alkyl, a $C_{1-6}$ alkoxy, or a hydroxyl group. Suitable alkyl pendent groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (8), $R^1$ is $—[(CH_2)_p—X—]_q(CH_2)_r—$, wherein p is 2, r is 2, q is 1, and X is S); dimercaptodioxaoctane (DMDO) (in Formula (8), $R^1$ is $—[(CH_2)_p—X—]_q(CH_2)_r—$, wherein p is 2, q is 2, r is 2, and X is O); and 1,5-dimercapto-3-oxapentane (in Formula (8), $R^1$ is $—[(CH_2)_p—X—]_q(CH_2)_r—$, wherein p is 2, r is 2, q is 1, and X is O). It is also possible to use dithiols that include both heteroatoms in the carbon backbone and pendent alkyl groups, such as methyl groups. Such dithiols include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CH(CH$_3$)CH$_2$—SH and HS—CH(CH$_3$)CH$_2$—S—CH$_2$CH(CH$_3$)—SH.

Examples of dithiols having a sulfide group S—S include 2-(sulfanylmethyldisulfanyl)ethanediol, bis(mercaptomethyl) persulfide, and 2-(2-sulfanylethyldisulfanyl)ethanethiol.

In divinyl ethers of Formula (6), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (6), each $R^2$ can independently be a $C_{1-10}$ n-alkanediyl group, such as methanediyl, ethanediyl, n-propanediyl, or n-butanediyl.

In divinyl ethers of Formula (6), each $R^2$ can independently comprise a $—[(CH_2)_p—X—]_q(CH_2)_r—$ group, where each X can be O or S.

In divinyl ethers of Formula (6), each $R^2$ can independently comprise a $—[(CH_2)_p—X—]_q(CH_2)_r—$ group.

In divinyl ethers of Formula (6), each m can be independently an integer from 1 to 3. Each m can be the same and is can be 1, 2, or 3.

In divinyl ethers of Formula (6), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (6), each $R^2$ can independently be a $C_{1-10}$ n-alkanediyl group.

In divinyl ethers of Formula (6), each $R^2$ can independently be a $—[(CH_2)_p—X—]_q(CH_2)_r—$ group, where each X can be O or S.

In divinyl ethers of Formula (6), each $R^2$ can independently be a $—[(CH_2)_p—X—]_q(CH_2)_r—$ group, where each X can be O or S, and each p can independently be 2, 3, 4, 5, and 6.

In divinyl ethers of Formula (6), each p can be the same and can be 2, 3, 4, 5, or 6.

In divinyl ethers of Formula (6), each $R^2$ can independently be a $—[(CH_2)_p—X—]_q(CH_2)_r—$ group, where each X can be O or S, and each q can independently be 1, 2, 3, 4, or 5.

In divinyl ethers of Formula (6), each q can be the same and can be 1, 2, 3, 4, or 5.

In divinyl ethers of Formula (6), each $R^2$ can independently be a $—[(CH_2)_p—X—]_q(CH_2)_r—$ group, where each X can be O or S, and each r can independently be 2, 3, 4, 5, 6, 7, 8, 9, or 10. In divinyl ethers of Formula (6), each r can be the same and can be 2, 3, 4, 5, 6, 7, 8, 9, or 10. In divinyl ethers of Formula (6), each r can independently be an integer from 2 to 4, from 2 to 6, or from 2 to 8.

Examples of suitable divinyl ethers include ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, polytetrahydrofuryl divinyl ether; and combinations of any of the foregoing.

Suitable divinyl ethers include, for example, compounds having at least one oxyalkanediyl group, $—R^2—O—$, such as from 1 to 4 oxyalkanediyl groups, i.e., compounds in which m in Formula (6) is an integer from 1 to 4. The variable m in Formula (6) can be an integer ranging from 2 to 4. It is also possible to employ commercially available divinyl ether mixtures that are characterized by a non-integral average value for the number of oxyalkanediyl units per molecule. Thus, m in Formula (6) can also take on rational number values from 0 to 10.0, such as from 1.0 to 10.0, from 1.0 to 4.0, or from 2.0 to 4.0.

Examples of suitable vinyl ethers include ethylene glycol divinyl ether (EG-DVE) ($R^2$ in Formula (6) is ethanediyl and m is 1), butanediol divinyl ether (BD-DVE) ($R^2$ in Formula (6) is butanediyl and m is 1), hexanediol divinyl ether (HD-DVE) ($R^2$ in Formula (6) is hexanediyl and m is 1), diethylene glycol divinyl ether (DEG-DVE) ($R^2$ in Formula (6) is ethanediyl and m is 2), triethylene glycol divinyl ether ($R^2$ in Formula (6) is ethanediyl and m is 3), tetraethylene glycol divinyl ether ($R^2$ in Formula (6) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups which can comprise alkyl groups, hydroxyl groups, alkoxy groups, or amine groups.

Divinyl ethers in which $R^2$ in Formula (6) is $C_{3-6}$ branched alkanediyl may be prepared by reacting a polyhydroxyl compound with acetylene. Examples of divinyl ethers of this type include compounds in which $R^2$ in Formula (6) is an alkyl-substituted methanediyl group such as —CH(—CH$_3$)—, or an alkyl-substituted ethanediyl.

Two or more types of divinyl ethers of Formula (6) may be used. Thus, two dithiols of Formula (8) and one divinyl ethers of Formula (6), one dithiol of Formula (8) and two divinyl ethers of Formula (6), two dithiols of Formula (8) and two divinyl ethers of Formula (6), and more than two compounds of one or both Formula (8) and Formula (6), may be used to produce a variety of thiol-terminated polythioethers.

The divinyl ether(s) can comprise, for example, from 20 mole percent to less than 50 mole percent of the reactants used to prepare a thiol-terminated polythioether prepolymer, or from 30 mole percent to less than 50 mole percent.

Relative amounts of dithiols and divinyl ethers can be selected to provide polythioether prepolymers having terminal thiol groups. Thus, a dithiol of Formula (8) or a mixture of at least two different dithiols of Formula (8), can be reacted with of a divinyl ether of Formula (6) or a mixture of at least two different divinyl ethers of Formula (6) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst, an ionic catalyst, or ultraviolet radiation. Suitable free radical catalysts include, for example, azo compounds, such as azobisnitriles including azo(bis)isobutyronitrile (AIBN); organic peroxides such as benzoyl peroxide and tert-butyl peroxide; and inorganic peroxides such as hydrogen peroxide. In certain reactions, the catalyst does not comprise acidic or basic compounds, and does not produce acidic or basic compounds upon decomposition. Examples of suitable free-radical catalysts include azo-type catalysts, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other suitable free-radical catalysts include alkyl peroxides, such as tert-butyl peroxide. The reaction may also be initiated by irradiation with ultraviolet light either with or without a cationic photo-initiating moiety.

Thiol-terminated polythioethers may be prepared by combining at least one dithiol of Formula (8) and at least one divinyl ether of Formula (6) followed by addition of an appropriate catalyst, and carrying out the reaction at a temperature, for example, within a range from 30° C. to 120° C., such as from 70° C. to 90° C., for a duration, for example, from 2 hours to 24 hours, such as from 2 hours to 6 hours.

Thiol-terminated polythioether prepolymers may comprise a polyfunctional polythioether prepolymer having an average thiol functionality greater than 2.0. In polythioether prepolymers having a thiol-functionality of two, each A can be derived from a divinyl ether. In polythioether prepolymers having a thiol-functionality greater than 2, at least some of the A moieties comprise a moiety having an alkenyl functionality greater than 2 such as an alkenyl functionality from 3 to 6. In polythioether prepolymers having a thiol-functionality greater than 2, at least some of the A moieties can be derived from a moiety of Formula (1b):

$$B(-R^8-CH_2-CH_2-)_z \quad (1b)$$

where,
B represents a core of a z-valent, polyalkenyl polyfunctionalizing agent $B(-R^8-CH=CH_2)_z$;
z can be an integer from 3 to 6; and
each $R^8$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

Thiol-terminated polythioether prepolymers can have an average thiol functionality greater than 2.0, such as an average value within a range from 2 and 3, an average thiol functionality within a range from 3 to 6, from 2 to 4, from 2.1 to 2.8, from 2.1 to 2.6, or from 2.1 to 2.4.

In thiol-terminated polythioether prepolymers of Formula (5a)-(5c) and moieties of Formula (5),
each $R^1$ can be —(CH$_2$)$_2$—O—(CH$_2$)$_2$—O—(CH$_2$)$_2$—;
each $R^2$ can be —(CH$_2$)$_2$—;
m can be an integer from 1 to 4; and
the polyfunctionalizing agent $B(-R^8-CH=CH_2)_z$ comprises triallyl cyanurate where z is 3 and each $R^8$ is —O—CH$_2$—.

Polyfunctionalizing agents suitable for use in preparing polyfunctional thiol-terminated prepolymers include tri-functionalizing agents, that is, compounds where z is 3. Suitable tri-functionalizing agents include, for example, triallyl cyanurate (TAC), 1,2,3-propanetrithiol, isocyanurate-containing trithiols, and combinations thereof, as disclosed in U.S. Application Publication No. 2010/0010133; and isocyanurates as disclosed, for example, in U.S. Pat. No. 7,858,703. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents may also be used. As a result, polythioether prepolymers provided by the present disclosure may have a wide range of average functionality. For example, trifunctionalizing agents may afford average functionalities of groups capable of reacting with thiol groups from 2.05 to 2.9, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

The backbone of a thiol-terminated polythioether prepolymer provided by the present disclosure can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing).

A thiol-terminated polythioether prepolymer can have a number average molecular weight, for example, from 500 Da to 4,000 Da, from 500 Da to 3,000 Da, from 500 Da to 2,000 Da, from 1,000 Da to 3,000 Da, from 1,250 Da to 2,750 Da, from 1,500 Da to 2,500 Da, or from 1,750 Da to 2,250 Da. The molecular weight of a thiol-terminated prepolymer can be determined by iodine titration.

Thiol-terminated polythioether prepolymers can exhibit a polydispersity (Mw/Mn; weight average molecular weight/number average molecular weight), for example, from 1 to 20, or from 1 to 5.

Examples of suitable thiol-terminated polythioether prepolymers are disclosed, for example, in U.S. Pat. No. 6,172,179. A thiol-terminated polythioether prepolymer can comprise Permapol® P3.1E, Permapol® L1633, Permapol® L56086, or a combination thereof, each of which is available from PPG Aerospace, Sylmar, Calif. Permapol® P3.1E, Permapol® L1633, and Permapol® L56086 are encompassed by the thiol-terminated polythioether prepolymers of Formula (5a) and thiol-terminated polythioether prepolymers comprising a moiety of Formula (5a).

Thiol-terminated polythioether prepolymers provided by the present disclosure are liquid at room temperature (23° C.) and can have a glass transition temperature $T_g$, for example, less than –20° C., less than –30° C., or less than –40° C., where the glass transition temperature $T_g$ is determined by Dynamic Mass Analysis (DMA) using a TA Instruments Q800 apparatus with a frequency of 1 Hz, an amplitude of 20 microns, and a temperature ramp of –80° C. to 25° C., with the $T_g$ identified as the peak of the tan δ curve.

Thiol-terminated polythioether prepolymers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise 4 Pa-sec to 12 Pa-sec), measured using a Brookfield CAP 2000 viscometer, with a No. 6 spindle, at speed of 300 rpm, and a temperature of 23° C.

A thiol-terminated sulfur-containing prepolymer of Formula (8) can comprise a thiol-terminated polysulfide prepolymer.

A polysulfide prepolymer refers to a prepolymer that contains one or more polysulfide linkages, i.e., —$S_x$— linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711 and 7,009,032.

Examples of suitable thiol-terminated polysulfide prepolymers liquid polysulfide prepolymers that are blends of di- and tri-functional molecules where the difunctional polysulfide prepolymers comprise the structure of Formula (9a) and E(-SH)$_w$ in a thiol-terminated prepolymer of Formula (2) can be a moiety of Formula (9):

  (9)

  (9a)

and the trifunctional polysulfide polymers can have the structure of Formula (10a) and E(-SH)$_w$ in the thiol-terminated prepolymer of Formula (2) can be a moiety of Formula (10):

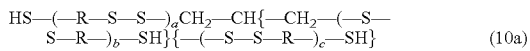  (10a)

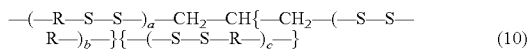  (10)

where each R is —(CH$_2$)$_2$—O—CH$_2$—O—(CH$_2$)$_2$—, and n=a+b+c, where the value for n may be from 7 to 38 depending on the amount of the trifunctional cross-linking agent (1,2,3-trichloropropane; TCP) used during synthesis of the polysulfide prepolymer. Such thiol-terminated polysulfide prepolymers include Thioplast™ G polysulfides/resins such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G polysulfides can have a number average molecular weight from 1,000 Da to 6,500 Da, an SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Da to 7,500 Da, an —SH content from 0.8% to 7.7%, and a cross-linking density from 0% to 2%. Thiokol™ LP polysulfide prepolymers have the general structure of Formula (11a) and E(-SH)$_w$ in a thiol-terminated prepolymer of Formula (2) can be a moiety of Formula (11):

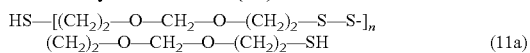  (11a)

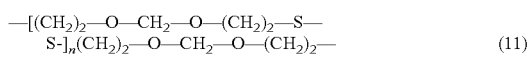  (11)

where n can be such that the number average molecular weight from 1,000 Da to 7,500 Da, such as, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (12a) and E(-SH)$_w$ in a thiol-terminated prepolymer of Formula (2) can be a moiety of Formula (12):

  (12a)

  (12)

where,
t can be an integer from 1 to 60;
q can be an integer from 1 to 8;
p can be an integer from 1 to 10;
r can be an integer from 1 to 10;
y can have an average value within a range from 1.0 to 1.5; and
each R can independently be selected from branched alkanediyl, branched arenediyl, and a moiety having the structure —(CH$_2$)$_p$—O—(CH$_2$)$_q$—O—(CH$_2$)$_r$—.

In thiol-terminated polysulfide prepolymers of Formula (12a) and moieties of Formula (12), t can be, for example, an integer from 2 to 60, from 1 to 40, or from 1 to 20.

In thiol-terminated polysulfide prepolymers of Formula (12a) and moieties of Formula (12), q can be, for example, an integer from 1 to 6, or an integer from 1 to 4. For example, q can be 1, 2, 3, 4, 5 or 6.

In thiol-terminated polysulfide prepolymers of Formula (12a) and moieties of Formula (12), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (12a) and moieties of Formula (12), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (12a) and moieties of Formula (12), y can have a value of 1.

In thiol-terminated polysulfide prepolymers of Formula (12a) and moieties of Formula (12), y can have an average value, for example, of 1, such as from 1.05 to 2, or from 1.1 to 1.8.

In thiol-terminated polysulfide prepolymers of Formula (12a) and moieties of Formula (12), R can be —$(CH_2)_p$—O—$(CH_2)_q$—O—$(CH_2)_r$—.

In thiol-terminated polysulfide prepolymers of Formula (12a) and moieties of Formula (12), R can be —$(CH_2)_p$—O—$(CH_2)_q$—O—$(CH_2)_r$—, each q can be 1, 2, 3, or 4, and each p and r can be 1 or 2.

In thiol-terminated polysulfide prepolymers of Formula (12a) and moieties of Formula (12), 0% to 20% of the R groups can comprise branched alkanediyl or branched arenediyl, and 80% to 100% of the R groups can be —$(CH_2)_p$—O—$(CH_2)_q$—O—$(CH_2)_r$—.

In thiol-terminated polysulfide prepolymers of Formula (12a) and moieties of Formula (12), a branched alkanediyl or a branched arenediyl can be —$R^1(-A)_n$- where $R^1$ is a hydrocarbon group, n is 1 or 2, and A is a branching point. A branched alkanediyl can have the structure —$CH_2$(—CH(—$CH_2$—)—.

Thiol-terminated polysulfide prepolymers of Formula (12a) and moieties of Formula (12) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (12a) and moieties of Formula (12) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (13a) and E(-SH)$_w$ in a thiol-terminated prepolymer of Formula (2) can be a moiety of Formula (13):

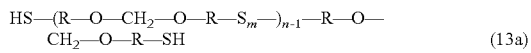

HS—(R—O—$CH_2$—O—R—$S_m$—)$_{n-1}$—R—O—$CH_2$—O—R—SH (13a)

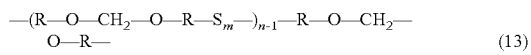

—(R—O—$CH_2$—O—R—$S_m$—)$_{n-1}$—R—O—$CH_2$—O—R— (13)

where R can be $C_{2-4}$ alkanediyl, m can be an integer from 2 to 8, and n can be an integer from 2 to 370.

In thiol-terminated polysulfide prepolymers of Formula (13a) and moieties of Formula (13), m can have an average value, for example, greater than 1, such as from 1.05 to 2, or from 1.1 to 1.8.

In thiol-terminated polysulfide prepolymers of Formula (13a) and moieties of Formula (13), m can be, for example, an integer from 2 to 6, and integer from 2 to 4, or the integer 2, 3, 4, 5, 6, 7, or 8.

In thiol-terminated polysulfide prepolymers of Formula (13a) and moieties of Formula (13), n can be, for example, an integer from 2 to 200 or an integer from 2 to 100.

In thiol-terminated polysulfide prepolymers of Formula (13a) and moieties of Formula (13), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-terminated polysulfide prepolymers of Formula (13a) and moieties of Formula (13) are disclosed, for example, in JP 62-53354.

Thiol-terminated polysulfide prepolymers can be liquid at room temperature (23° C.). Thiol-terminated monosulfide prepolymers can have a viscosity, at 100% solids, of no more than 1,500 poise (150 Pa-sec), such as 40 poise to 500 poise (4 Pa-sec to 50 Pa-sec), at a temperature of about 25° C. and a pressure of about 760 mm Hg (101 kPa) determined according to ASTM D-2849 § 79-90 using a Brookfield CAP 2000 viscometer with a No. 6 spindle, at speed of 300 rpm, and a temperature of 23° C.

Thiol-terminated polysulfide prepolymers can have a number average molecular weight within a range from 500 Da to 10,000 Da, such as within a range 1,000 Da to 8,000 Da, the molecular weight being determined by gel-permeation chromatography using a polystyrene standard. Thiol-terminated polysulfide prepolymers can have a glass transition temperature $T_g$ less than –40° C., less than –55° C., or less than –60° C. The glass transition temperature $T_g$ is determined by Dynamic Mass Analysis (DMA) using a TA Instruments Q800 apparatus with a frequency of 1 Hz, an amplitude of 20 microns, and a temperature ramp of –80° C. to 25° C., with the $T_g$ identified as the peak of the tan δ curve.

A thiol-terminated sulfur-containing prepolymer can comprise a thiol-terminated sulfur-containing polyformal prepolymer.

Sulfur-containing polyformal prepolymers useful in aerospace sealant applications are disclosed, for example, in U.S. Pat. No. 8,729,216 and in U.S. Pat. No. 8,541,513.

A thiol-terminated sulfur-containing prepolymer can comprise a thiol-terminated sulfur-containing polyformal of Formula (14a) and E(-SH)$_w$ in the thiol-terminated prepolymer of Formula (2) can comprise a moiety of Formula (14):

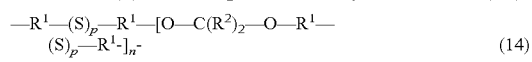

—$R^1$—(S)$_p$—$R^1$—[O—C($R^2$)$_2$—O—$R^1$—(S)$_p$—$R^1$-]$_n$- (14)

where n can be an integer from 1 to 50; each p can be independently selected from 1 and 2; each $R^1$ can be $C_{2-6}$ alkanediyl; and each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

A thiol-terminated sulfur-containing polyformal prepolymer can have the structure of Formula (14a):

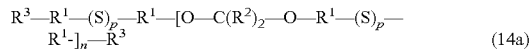

$R^3$—$R^1$—(S)$_p$—$R^1$—[O—C($R^2$)$_2$—O—$R^1$—(S)$_p$—$R^1$-]$_n$—$R^3$ (14a)

where n is an integer from 1 to 50; each p is independently selected from 1 and 2; each $R^1$ is $C_{2-6}$ alkanediyl; each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

In sulfur-containing polyformal moieties of Formula (14) and prepolymers of Formula (14a), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal moieties of Formula (14) and prepolymers of Formula (14a), each $R^1$ can be ethane-1,2-diyl.

In sulfur-containing polyformal moieties of Formula (14) and prepolymers of Formula (14a), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal moieties of Formula (14) and prepolymers of Formula (13a), each $R^2$ can be selected from hydrogen, methyl, and ethyl.

In sulfur-containing polyformal moieties of Formula (14) and prepolymers of Formula (14a), each $R^1$ can be the same and can be selected from $C_{2-3}$ alkanediyl such as ethane-1,2-diyl and propane-1,3-diyl; and each $R^2$ is the same and can be selected from hydrogen and $C_{1-3}$ alkyl such as methyl, ethyl, or propyl. In sulfur-containing polyformal moieties of Formula (14) and prepolymers of Formula (14a), each $R^1$ can be ethane-1,2-diyl. In sulfur-containing polyformal moieties of Formula (14) and prepolymers of Formula (14a), each $R^2$ can be hydrogen. In sulfur-containing polyformal moieties of Formula (14) and prepolymers of Formula (14a), each $R^1$ can be ethane-1,2-diyl and each $R^2$ can be hydrogen.

In sulfur-containing polyformal moieties of Formula (14) and prepolymers of Formula (14a), n can be an integer selected from 1 to 50, an integer from 2 to 40, an integer from 4 to 30, or n can be an integer from 7 to 30.

In sulfur-containing polyformal moieties of Formula (14) and prepolymers of Formula (14a), each p is the same and can be 1, and each p is the same and can be 2.

In sulfur-containing polyformal moieties of Formula (14) and prepolymers of Formula (14a) can have a number average molecular weight from 200 Da to 6,000 Da, from 500 Da to 5,000 Da, from 1,000 Da to 5,000 Da, from 1,500 Da to 4000 Da, or from 2,000 Da to 3,600 Da.

In sulfur-containing polyformal prepolymers of Formula (14a), each $R^3$ can be a thiol-terminated group and can be a group of Formula (a), Formula (b), Formula (c), Formula (d), Formula (e), or Formula (f):

$$HS-R^{21}-R^{20}-O- \quad (a)$$

$$HS-R^{21}-O- \quad (b)$$

$$HS-R^{21}-NH-C(=O)-O- \quad (c)$$

$$HS-R^{21}-C(=O)-O-R^{22}-NH-C(=O)-O- \quad (d)$$

$$HS-R^{21}-C(=O)-NH-R^{22}-NH-C(=O)-O- \quad (e)$$

$$HS-R^{21}-C(=O)-O- \quad (f)$$

where each $R^{20}$ comprises a moiety derived from a diisocyanate or a moiety derived from an ethylenically unsaturated monoisocyanate; each $R^{21}$ can be selected from $C_{2-14}$ alkanediyl and $C_{2-14}$ heteroalkanediyl; and each $R^{22}$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

Sulfur-containing polyformal prepolymers can have the structure of Formula (14b):

$$\{R^3-R^1-(S)_p-R^1-[O-C(R^2)_2-O-R^1-(S)_p-R^1-]_nO-C(R^2)_2-O-\}_mZ \quad (14b)$$

where each n can be an integer selected from 1 to 50; m can be an integer selected from 3 to 6; p is independently selected from 1 and 2; each $R^1$ can independently be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^3$ comprises a thiol-terminated group; and Z is derived from the core of an m-valent parent polyol $Z(OH)_m$.

In sulfur-containing polyformal prepolymers of Formula (14b), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (14b), each $R^1$ can be ethane-1,2-diyl.

In sulfur-containing polyformal prepolymers of Formula (14b), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (14b), each $R^2$ can be selected from hydrogen, methyl, and ethyl.

In sulfur-containing polyformal prepolymers of Formula (14b), each $R^1$ can be the same and can be selected from $C_{2-3}$ alkanediyl such as ethane-1,2-diyl or propane-1,3-diyl; and each $R^2$ is the same and can be selected from hydrogen and $C_{1-3}$ alkyl such as methyl, ethyl, or propyl. In sulfur-containing polyformal prepolymers of Formula (14b), each $R^1$ can be ethane-1,2-diyl. In sulfur-containing polyformal prepolymers of Formula (14b), each $R^2$ can be hydrogen. In sulfur-containing polyformal prepolymers of Formula (14b), each $R^1$ can be ethane-1,2-diyl and each $R^2$ can be hydrogen.

In sulfur-containing polyformal prepolymers of Formula (14b), m can be 3, m can be 4, m can be 5, or m can be 6.

In sulfur-containing polyformal prepolymers of Formula (14b) where m is 3, the parent polyol $Z(OH)_m$ is a triol of Formula (15):

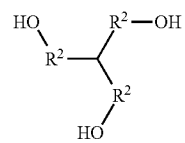

(15)

where each $R^2$ is independently $C_{1-6}$ alkanediyl, or a triol of Formula (16):

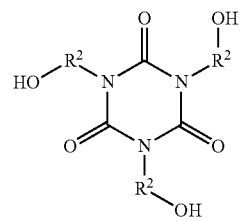

(16)

where each $R^2$ is independently $C_{1-6}$ alkanediyl. Accordingly, in these embodiments Z can have the structure of Formula (17a) or Formula (17b):

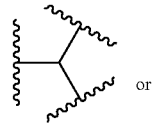

(17a)

or

-continued

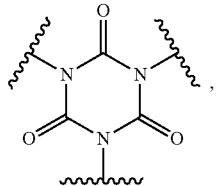

(17b)

respectively, where each $R^2$ is independently $C_{1-6}$ alkanediyl.

In sulfur-containing polyformal prepolymers of Formula (14b), each n is an integer from 1 to 50, an integer from 2 to 40, an integer from 4 to 30, or an integer from 7 to 30.

In sulfur-containing polyformal prepolymers of Formula (14b), each p is the same and is 1, and each p is the same and is 2.

In sulfur-containing polyformal prepolymers of Formula (14b) can have a number average molecular weight from 200 Da to 6,000 Da, from 500 Da to 5,000 Da, from 1,000 Da to 5,000 Da, from 1,500 Da to 4000 Da, or from 2,000 Da to 3,600 Da.

In sulfur-containing polyformal prepolymers of Formula (14b), $R^3$ can be bonded to a polyfunctionalizing agent $B(-R^{10})_z$ through a moiety of Formula (14).

In sulfur-containing polyformal prepolymers of Formula (14b), each $R^3$ can be the same.

In sulfur-containing polyformal prepolymers of Formula (14b), each $R^3$ can comprise a thiol-terminated group of Formula (a), Formula (b), Formula (c), Formula (d), Formula (e), or Formula (f):

HS—$R^{21}$—$R^{20}$—O— (a)

HS—$R^{21}$—O— (b)

HS—$R^{21}$—NH—C(=O)—O— (c)

HS—$R^{21}$—C(=O)—O—$R^9$—NH—C(=O)—O— (d)

HS—$R^{21}$—C(=O)—NH—$R^{22}$—NH—C(=O)—O— (e)

HS—$R^{21}$—C(=O)—O— (f)

where each $R^{20}$ comprises a moiety derived from a diisocyanate or a moiety derived from an ethylenically unsaturated monoisocyanate; each $R^{21}$ can be selected from $C_{2-14}$ alkanediyl and $C_{2-14}$ heteroalkanediyl; and each $R^{22}$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

A thiol-terminated sulfur-containing prepolymer can comprise a thiol-terminated monosulfide prepolymer.

A thiol-terminated monosulfide prepolymer can comprise a thiol-terminated monosulfide prepolymer of Formula (18a) and E(-SH)$_w$ in the thiol-terminated prepolymer of Formula (2) can be a moiety of Formula (18):

HS—$R^2$—[S—(R—X)$_p$—($R^1$—X)$_q$—$R^2$—]$_n$SH (18a)

—$R^2$—[S—(R—X)$_p$—($R^1$—X)$_q$—$R^2$-]$_n$ (18)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{1-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{10}$ alkylarenediyl;

each X can independently be selected from O or S;

p can be an integer from 1 to 5;

q can be an integer from 0 to 5; and n can be an integer from 1 to 60, such as from 2 to 60, from 3 to 60, or from 25 to 35.

In thiol-terminated monosulfide prepolymers of Formula (18a) and moieties of Formula (18), each X can independently be selected from S, O, —S—S—, and NR$^3$, where $R^3$ comprises $C_{1-4}$ alkyl; p is an integer from 1 to 5; q is an integer from 0 to 5; n is an integer from 1 to 60; each R can independently be selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl; and each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl.

A thiol-terminated monosulfide prepolymer can comprise a thiol-terminated monosulfide prepolymer of Formula (18a), a thiol-terminated monosulfide prepolymer of Formula (18b), a thiol-terminated monosulfide prepolymer of Formula (18c), or a combination of any of the foregoing:

HS—$R^2$—[S—(R—X)$_p$—($R^1$—X)$_q$—$R^2$—]$_n$SH (18a)

{H—$R^2$[S—(R—X)$_p$($R^1$—X)$_q$—$R^2$—]$_n$S—$R^{10a}$-}$_z$B (18b)

{$R^4$—S—$R^2$—[S—(R—X)$_p$—($R^1$—X)$_q$—$R^2$—]$_n$S—$R^{10a}$-}$_z$B (18c)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;
each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;
each X can independently be selected from O and S;
p can be an integer from 1 to 5;
q can be an integer from 0 to 5; and
n can be an integer from 1 to 60, such as from 2 to 60, from 3 to 60, or from 25 to 35 and
B represents a core of a z-valent polyfunctionalizing agent $B(-R^{10})_z$ wherein:
z can be an integer from 3 to 6; and
each $R^{10}$ is a moiety comprising a terminal group reactive with a thiol group;
each $-R^{10a}$ is derived from the reaction of $-R^{10}$ with a thiol; and
each $R^4$ can be independently selected from hydrogen and a bond to a polyfunctionalizing agent $B(-R^{10})_z$ through a moiety of Formula (18).

In thiol-terminated monosulfide prepolymers of Formula (18a)-(18c) and moieties of Formula (18):
each X can independently be selected from S, O, S—S, and $NR^3$, where $R^3$ be selected from $C_{1-4}$ alkyl;
p can be an integer from 1 to 5;
q can be an integer from 0 to 5;
n can be an integer from 1 to 60;
each R can independently be selected from $C_{2-10}$ alkanediyl, $C_{6-8}$ cycloalkanediyl, $C_{1-4}$ alkylcycloalkanediyl, and $C_{8-10}$ alkylarenediyl;
each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl;
each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl;
B represents a core of a z-valent polyfunctionalizing agent $B(-R^{10})_z$ wherein:
z is an integer from 3 to 6; and
each $R^{10}$ is a moiety comprising a terminal group reactive with a thiol group;
each $-R^{10a}$ can be derived from the reaction of $-R^{10}$ with a thiol; and
each $R^4$ can independently be selected from hydrogen and a bond to a polyfunctionalizing agent $B(-R^{10})_z$ through a moiety of Formula (18).

In thiol-terminated monosulfide prepolymers of Formula (18a)-(18c) and moieties of Formula (18), each X can independently be S or O, each X can be S, or each X can be O.

In thiol-terminated monosulfide prepolymers of Formula (18a)-(18c) and moieties of Formula (18), p can be an integer from 2 to 6, or p can be 1, 2, 3, 4, 5, or 6.

In thiol-terminated monosulfide prepolymers of Formula (18a)-(18c) and moieties of Formula (18), q can be an integer from 1 to 5, q can be an integer from 2 to 5, or q can be 0, 1, 2, 3, 4, or 5.

In thiol-terminated monosulfide prepolymers of Formula (18a)-(18c) and moieties of Formula (18), n can be an integer from 2 to 60, from 3 to 60, or from 25 to 35.

In thiol-terminated monosulfide prepolymers of Formula (18a)-(18c) and moieties of Formula (18), each R can independently be selected from $C_{2-10}$ alkanediyl and $C_{6-8}$ cycloalkanediyl, each R can be $C_{2-10}$ alkanediyl, or each R can be $C_{6-8}$ cycloalkanediyl.

In thiol-terminated monosulfide prepolymers of Formula (18a)-(18c) and moieties of Formula (18), each R can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (18a)-(18c) and moieties of Formula (18), each R can be selected from ethanediyl, 1,3-propanediyl, 1,2-propanediyl, 1,4-butanediyl, and 1,3-butanediyl.

In thiol-terminated monosulfide prepolymers of Formula (18a)-(18c) and moieties of Formula (18), each $R^1$ can independently be selected from $C_{1-10}$ alkanediyl and $C_{6-8}$ cycloalkanediyl, each R can be $C_{1-10}$ alkanediyl, or each $R^1$ can be $C_{6-8}$ cycloalkanediyl.

In thiol-terminated monosulfide prepolymers of Formula (18a)-(18c) and moieties of Formula (18), each $R^1$ can be selected from $C_{1-6}$ alkanediyl, $C_{1-4}$ alkanediyl, $C_{2-10}$ alkanediyl, and $C_{2-6}$ alkanediyl.

In thiol-terminated monosulfide prepolymers of Formula (18a)-(18c) and moieties of Formula (18), each $R^1$ can be selected from methanediyl, ethanediyl, 1,3-propanediyl, 1,2-propanediyl, 1,4-butanediyl, and 1,3-butanediyl.

In thiol-terminated monosulfide prepolymers of Formula (18a)-(18c) and moieties of Formula (18), each $R^2$ can independently be selected from $C_{2-10}$ alkanediyl and $C_{6-8}$ cycloalkanediyl, each $R^2$ can be $C_{2-10}$ alkanediyl, or each $R^2$ can be $C_{6-8}$ cycloalkanediyl.

In thiol-terminated monosulfide prepolymers of Formula (18a)-(18c) and moieties of Formula (18), each $R^2$ can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (18a)-(18c) and moieties of Formula (18), each $R^2$ can be selected from ethanediyl, 1,3-propanediyl, 1,2-propanediyl, 1,4-butanediyl, and 1,3-butanediyl.

In thiol-terminated monosulfides of Formula (18a)-(18c) and moieties of Formula (18), p can be 1 or 2, q can be 1 or 2, n can be an integer from 1 to 60 or an integer from 25 to 35, each X can be O or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfide prepolymers of Formula (18a)-(18c) and moieties of Formula (18), p can be 1 or 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfide prepolymers of Formula (18a)-(18c) and moieties of Formula (18), p can be 1 or 2, q can be 1 or 2, n can be an integer from 1 to 60 or an integer from 25 to 35, each X can be O, each R can be $C_2$ alkanediyl, each $R^1$ can be $C_1$ alkanediyl, and each $R^2$ can be $C_2$ alkanediyl.

In thiol-terminated monosulfide prepolymers of Formula (18b)-(18c), $B(-R^{10})_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

In thiol-terminated monosulfide prepolymers of Formula (18c) each $R^4$ can independently selected from hydrogen and a bond to a polyfunctionalizing agent $B(-R^{10})_z$ through a moiety of Formula (18). In thiol-terminated monosulfide prepolymer can have an average thiol functionality, for example, from 2.05 to 2.9, such as from 2.1 to 2.8, or from 2.2 to 2.6.

Thiol-terminated monosulfide prepolymers of Formula (18a)-(18c) and moieties of Formula (18) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfide prepolymers of Formula (18a)-(18c) and moieties of Formula (18) are disclosed, for example, in U.S. Pat. No. 7,875,666.

A thiol-terminated monosulfide prepolymer can comprise a thiol-terminated monosulfide prepolymer of Formula (19a) and E in the thiol-terminated prepolymer of Formula (2) can be a moiety of Formula (19):

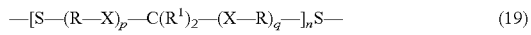

—[S—(R—X)$_p$—C(R$^1$)$_2$—(X—R)$_q$—]$_n$S— (19)

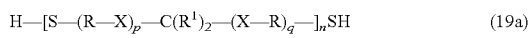

H—[S—(R—X)$_p$—C(R$^1$)$_2$—(X—R)$_q$—]$_n$SH (19a)

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkanediyl, such as a $C_{6-10}$ alkylcycloalkanediyl; and a $C_{8-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;

p can be an integer from 1 to 5;

q can be an integer from 1 to 5; and n can be an integer from 1 to 60, such as from 2 to 60, from 3 to 60, or from 25 to 35.

A thiol-terminated monosulfide prepolymer can comprise a thiol-terminated monosulfide prepolymer of Formula (19a), a thiol-terminated monosulfide prepolymer of Formula (19b), a thiol-terminated monosulfide prepolymer of Formula (19c), or a combination of any of the foregoing:

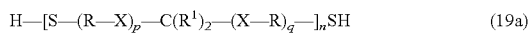

H—[S—(R—X)$_p$—C(R$^1$)$_2$—(X—R)$_q$—]$_n$SH (19a)

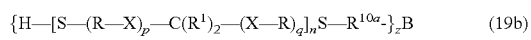

{H—[S—(R—X)$_p$—C(R$^1$)$_2$—(X—R)$_q$—]$_n$S—R$^{10a}$-}$_z$B (19b)

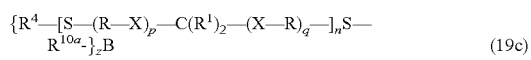

{R$^4$—[S—(R—X)$_p$—C(R$^1$)$_2$—(X—R)$_q$—]$_n$S—R$^{10a}$-}$_z$B (19c)

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkanediyl, such as a $C_{6-10}$ alkylcycloalkanediyl; and a $C_{8-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;

p can be an integer from 1 to 5;

q can be an integer from 1 to 5;

n can be an integer from 1 to 60, such as from 2 to 60, from 3 to 60, or from 25 to 35;

B represents a core of a z-valent polyfunctionalizing agent B(—R$^{10}$)$_z$ wherein:

z can be an integer from 3 to 6; and each $R^{10}$ is a moiety comprising a terminal group reactive with a thiol group;

each —R$^{10a}$— can be derived from the reaction of —R$^{10}$ with a thiol; and each $R^4$ can independently be selected from hydrogen and a bond to a polyfunctionalizing agent B(—R$^{10}$)$_z$ through a moiety of Formula (19).

In thiol-terminated monosulfide prepolymers of Formula (19a)-(19c) and moieties of Formula (19), each X can independently be selected from S and O; p is an integer from 1 to 5; q is an integer from 1 to 5; n is an integer from 1 to 60; each R can independently be $C_{2-10}$ alkanediyl; each $R^1$ can independently be selected from hydrogen and $C_{1-10}$ alkanediyl; B represents a core of a z-valent polyfunctionalizing agent B(—R$^{10}$)$_z$ wherein: z is an integer from 3 to 6; and each $R^{10}$ is a moiety comprising a terminal group reactive with a thiol group; each —R$^{10a}$— is derived from the reaction of —R$^{10}$ with a thiol; and each $R^4$ is independently hydrogen or is bonded to a polyfunctionalizing agent B(—R$^{10}$)$_z$ through a moiety of Formula (19).

In thiol-terminated monosulfide prepolymers of Formula (19a)-(19c) and moieties of Formula (19), each X can be S, or each X can be O.

In thiol-terminated monosulfide prepolymers of Formula (19a)-(19c) and moieties of Formula (19), p can be an integer from 2 to 5, or q can be 1, 2, 3, 4, or 5.

In thiol-terminated monosulfide prepolymers of Formula (19a)-(19c) and moieties of Formula (19), p can be an integer from 2 to 5, or q can be 1, 2, 3, 4, or 5.

In thiol-terminated monosulfide prepolymers of Formula (19a)-(19c) and moieties of Formula (19), n can be an integer from 2 to 60, from 3 to 60, or from 25 to 35.

In thiol-terminated monosulfide prepolymers of Formula (19a)-(19c) and moieties of Formula (19), each R can independently be selected from $C_{2-6}$ alkanediyl and $C_{2-4}$ alkanediyl.

In thiol-terminated monosulfide prepolymers of Formula (19a)-(19c) and moieties of Formula (19), each R can be selected from ethanediyl, 1,3-propanediyl, 1,2-propanediyl, 1,4-butanediyl, and 1,3-butanediyl.

In thiol-terminated monosulfide prepolymers of Formula (19a)-(19c) and moieties of Formula (19), each R can be selected from $C_{2-10}$ n-alkanediyl, $C_{2-10}$ branched alkanediyl, and a combination thereof.

In thiol-terminated monosulfide prepolymers of Formula (19a)-(19c) and moieties of Formula (19), each $R^1$ can independently be selected from hydrogen and $C_{2-6}$ alkyl.

In thiol-terminated monosulfide prepolymers of Formula (19a)-(19c) and moieties of Formula (19), each $R^1$ can independently be selected from hydrogen, ethyl, 1,3-propyl, 1,2-propyl, 1,4-butyl, and 1,3-butyl.

In thiol-terminated monosulfide prepolymers of Formula (19a)-(19c) and moieties of Formula (19), each $R^1$ can be selected from $C_{1-10}$ n-alkyl, $C_{1-10}$ branched alkyl, and a combination thereof.

In thiol-terminated monosulfide prepolymers of Formula (19a)-(19c) and moieties of Formula (19), each X is O, p is 1 or 2, q is 1 or 2, n is 1 to 60 such as 2 to 60, each R is $C_{2-4}$ alkanediyl such as ethanediyl, and each $R^1$ is hydrogen.

In thiol-terminated monosulfide prepolymers of Formula (19a)-(19c) and moieties of Formula (19), each X is O, p is 1, q is 1, n is 1 to 60 such as 2 to 60, each R is $C_{2-4}$ alkanediyl such as ethanediyl, and each $R^1$ is hydrogen.

In thiol-terminated monosulfide prepolymers of Formula (19a)-(19c) and moieties of Formula (19), each X is O, p is 2, q is 2, n is 1 to 60 such as 2 to 60, each R is $C_{2-4}$ alkanediyl such as ethanediyl, and each $R^1$ is hydrogen.

In thiol-terminated monosulfide prepolymers of Formula (19b)-(19c), $B(—R^{10})_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

Thiol-terminated monosulfide prepolymers of Formula (19a)-(19c) and moieties of Formula (19) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (19a)-(19c) and moieties of Formula (19) are disclosed, for example, in U.S. Pat. No. 8,466,220.

Thiol-terminated monosulfide prepolymers can have a number average molecular weight within a range from 300 Da to 10,000 Da, such as within a range 1,000 Da to 8,000 Da, where the molecular weight is determined by gel-permeation chromatography using a polystyrene standard. Thiol-terminated monosulfide prepolymers can have a glass transition temperature $T_g$ less than −40° C., less than −55° C., or less than −60° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A thiol-terminated chain-extended sulfur-containing prepolymer can comprise a prepolymer having the structure of Formula (3a):

D[—$R^{4a}$—S-E(-SH)$_{w-1}$]$_t$ (3a)

wherein,
each t is independently an integer from 2 to 6;
w is an integer from 2 to 20;
each $R^{4a}$ is derived from the reaction of a thiol-reactive group $R^4$ with a thiol group;
each E represents a core of a thiol-terminated sulfur-containing prepolymer E(-SH)$_w$, where each w is independently an integer from 2 to 6; and
D is the core of the chain extender having the structure of Formula (4):

D(—$R^4$)$_t$ (4)

wherein,
t is an integer from 2 to 6;
each $R^4$ is independently a group reactive with a thiol group.

In prepolymers of Formula (3a), a thiol-terminated sulfur-containing prepolymer E(-SH)$_w$ can comprise a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

In prepolymers of Formula (3a), each w can independently be an integer, for example, from 2 to 16, from 2 to 12, from 2 to 8 from 2 to 6, or from 2 to 4.

In prepolymers of Formula (3a), each w can independently be an integer from 2 to 5, from 2 to 4, from 2 to 3, or from 2.1 to 2.9.

In prepolymers of Formula (3a), each w can independently be selected from 2, 3, 4, 5, or 6.

In prepolymers of Formula (3a), each t can independently be an integer from 2 to 6, from 2 to 5, from 2 to 4, or from 2 to 3.

In prepolymers of Formula (3a), each t can independently be selected from 2, 3, 4, 5, or 6.

In prepolymers of Formula (3a), a thiol reactive group can be selected from an epoxy group, an alkenyl group, an alkynyl group, a Michael acceptor group, and an isocyanate group.

In prepolymers of Formula (3a), each $R^{4a}$ can be derived, for example, from the reaction of an epoxy group with a thiol group and can have the structure —$CH_2$—CH(—OH)—; each $R^{4a}$ can be derived from the reaction of an alkenyl group with a thiol group and can have the structure —$CH_2$—$CH_2$—; each $R^{4a}$ can be derived from the reaction of an alkynyl group with a thiol group and can have the structure —CH=CH—; each $R^{4a}$ can be derived from the reaction of a vinyl sulfone group with a thiol group and can have the structure —S(O)$_2$—$CH_2$—$CH_2$—; or each $R^{4a}$ can be derived from the reaction of an isocyanate group with a thiol group and can have the structure —C(O)—N—.

In chain-extended sulfur-containing prepolymers of Formula (3a), a chain extender of Formula (4) can have the structure of Formula (20), and the derivative of Formula (4a) can have the structure of Formula (20a):

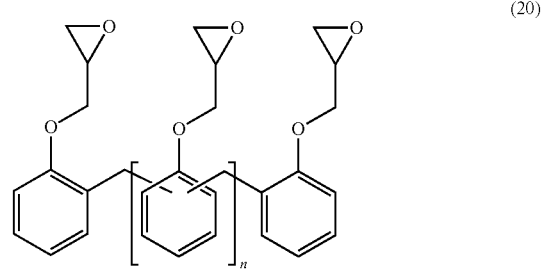

(20)

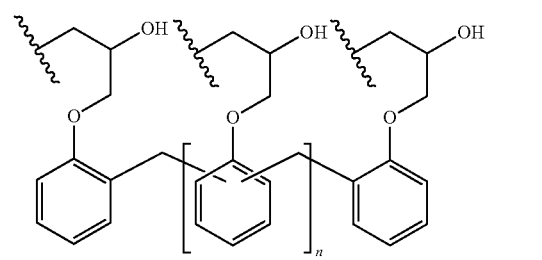

(20a)

wherein n can have an average value from 0.2 to 2.

In chain-extended sulfur-containing prepolymers of Formula (3a), each E(-S—)$_w$ can independently be a moiety derived from a thiol-terminated sulfur-containing prepolymer having the structure of Formula (2), E(-SH)$_w$. A thiol-terminated sulfur-containing prepolymer can comprise a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

In chain extenders of Formula (4), each $R^4$ can independently be selected from, for example, a thiol, an epoxy, an alkenyl, an alkynyl, an isocyanate, and a Michael acceptor group. Each $R^4$ can be the same or each $R^4$ can be a different group reactive with a thiol group. For example, each $R^4$ can be an epoxy group or each $R^4$ can be a Michael acceptor group.

Chain extenders of Formula (4) can have an equivalent weight of thiol reactive groups, for example, from 50 to 600, from 75 to 500, from 100 to 400, from 125 to 300, or from 150 to 250.

Thiol-terminated chain-extended sulfur-containing prepolymers provided by the present disclosure can comprise the reaction products of reactants comprising a thiol-terminated sulfur-containing prepolymer or combination of thiol-terminated sulfur-containing prepolymers; and a chain extender or a combination of chain extenders comprising at least two (2) groups reactive with thiol groups.

The equivalent ratio of the thiol-terminated sulfur-containing prepolymer to the multifunctional compound can be, for example, from 3:1 to 6:1, from 3.5:1 to 5.5:1, or from 4:1 to 5:1.

A sulfur-containing prepolymer can comprise, for example, sulfur-containing perfluoroether prepolymers, a perfluorosilicone prepolymers, or a combination thereof.

The chain extender can comprise a compound having from 2 to 6 functional groups reactive with a thiol group. Examples of groups reactive with thiol groups include, epoxy groups, alkenyl groups, isocyanate groups, and Michael acceptor groups.

A chain extender can have an average reactive functionality, for example, from 2 to 6, from 2 to 5, from 2 to 4, from 2 to 3, from 2.1 to 2.9, from 2.2 to 2.8, or from 2.3 to 2.6.

A chain extender can have a molecular weight, for example, from 200 Da to 1,600 Da, from 400 Da to 1,400 Da, from 600 Da to 1,200 Da, or from 800 Da to 1,000 Da.

A chain extender can have a reactive functionality equivalent weight, for example, from 100 to 800, from 150 to 600, or from 200 to 500.

To prepare a thiol-terminated chain-extended sulfur-containing prepolymer provided by the present disclosure a thiol-terminated sulfur-containing prepolymer and a chain extender can be combined and reacted in an equivalents ratio, for example, from 1.5:1 to 10:1, from 2:1 to 9:1, from 2.5:1 to 8:1, from 3:1 to 7:1, from 3.5:1 to 6:1, or from 4:1 to 5:1.

A thiol-terminated sulfur-containing prepolymer can be reacted with a chain extender in the presence of a suitable catalyst such as, for example, an amine catalyst when the thiol-reactive group is a polyepoxide or a polyalkenyl, at a suitable temperature to provide the corresponding thiol-terminated chain-extended sulfur-containing prepolymer.

A chain extender can have the structure of Formula (4):

where,
t can be an integer from 2 to 6;
D is a core of the chain extender; and
each $R^4$ is independently a group reactive with a thiol.

In chain extenders of Formula (4), t can be 2, 3, 4, 5, or 6.

In chain extenders of Formula (4), each $R^4$ can independently be selected from thiol, alkenyl, epoxy, isocyanate, or a Michael acceptor group.

In chain extenders of Formula (4), each $R^4$ can be the same and can be selected from thiol, alkenyl, alkynyl, epoxy, isocyanate, or Michael acceptor group.

In chain extenders of Formula (4), each $R^4$ independently selected from a Michael acceptor group, wherein the Michael acceptor can be selected from, for example, a vinyl sulfone, an acrylate, a maleimide, a vinyl ketone, a quinone, a nitroalkene, an acrylonitrile, an acrylate, a methacrylate, a cyanoacrylate, an acrylamide, and a dialkyl vinylphosphonate.

Chain extenders of Formula (4), can have an average thiol-reactive functionality, for example, of 2, 3, 4, 5, or 6.

Chain extenders of Formula (4) can comprise a combination of chain extenders of Formula (2) having different thiol-reactive functionality.

Combinations of chain extenders of Formula (4), can have an average thiol-reactive functionality, for example, from 2 to 6, from 2 to 4, from 2 to 3, or from 2.1 to 2.9.

Combinations of chain extenders of Formula (4), can have an average thiol-reactive functionality, for example, from 2 to 6, from 2 to 4, or from 2 to 3.

In chain extenders of Formula (4), D can comprise one or more pendent groups reactive with thiol groups.

Chain extenders of Formula (4) can have a thiol-reactive functionality of 2, a thiol-reactive functionality of 3, can be a combination of chain extenders of Formula (4) having a thiol-reactive functionality of 2 and a thiol-reactive functionality of 3.

In chain extenders of Formula (4), D can be, for example, difunctional, trifunctional, tetrafunctional, pentafunctional, or hexafunctional, where the functionality refers to the functionality of the thiol reactive groups.

For example, in chain extenders of Formula (4), D can be selected from $C_{1-6}$ alkane-n-yl, $C_{5-6}$ cycloalkane-n-yl, $C_{6-20}$ alkanecycloalkane-n-yl, $C_6$ arene-n-yl, $C_{7-20}$ alkanearene-n-yl, $C_{1-6}$ heteroalkane-n-yl, $C_{5-6}$ heterocycloalkane-n-yl, $C_{6-20}$ heteroalkanecycloalkane-n-yl, $C_6$ heteroarene-n-yl, $C_{7-20}$ heteroalkanearene-n-yl, substituted $C_{1-6}$ alkane-n-yl, substituted $C_{5-6}$ cycloalkane-n-yl, substituted $C_{6-20}$ alkanecycloalkane-n-yl, substituted $C_6$ arene-n-yl, substituted $C_{7-20}$ alkanearene-n-yl, $C_{1-6}$ heteroalkane-n-yl, substituted $C_{5-6}$ heterocycloalkane-n-yl, substituted $C_{6-20}$ heteroalkanecycloalkane-n-yl, substituted $C_6$ heteroarene-n-yl, and substituted $C_{7-20}$ heteroalkanearene-n-yl, where n can be an integer from 2 to 6.

In chain extenders of Formula (4), each substituent group can be selected from —OH, $C_{1-6}$ alkyl, $C_{4-6}$ cycloalkyl, $C_6$ aryl, $C_{5-20}$ alkanecycloalkyl, $C_{7-20}$ alkanearyl, $C_{1-6}$ heteroalkyl, $C_{4-6}$ heterocycloalkyl, $C_6$ heteroaryl, $C_{5-20}$ heteroanecycloalkyl, and $C_{7-20}$ heteroalkanearyl.

Chain extenders, including chain extenders of Formula (3), can be characterized by a number average molecular weight, for example, from 200 Da to 1,500 Da, from 200 Da to 1,200 Da, from 200 Da to 1,000 Da, from 200 Da to 800 Da, or from 300 Da to 600 Da.

Chain extenders, including chain extenders of Formula (4), can be characterized by a thiol-reactive equivalent weight (g/eq), for example, from 100 to 800, from 100 to 700, from 100 to 600, or from 300 to 500.

Chain extenders, including chain extenders of Formula (4), can comprise polythiols, polyalkenyls, polyalkynyls, polyepoxides, polyisocyanates, or multifunctional Michael acceptors.

Examples of suitable polythiols include trithiols, tetrathiols, and combinations of any of the foregoing.

Examples of suitable trithiols include 1,2,3-propanetrithiol, 1,2,3-benzenetrithiol, 1,1,1-butanetrithiol, heptane-1, 3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of trithiols may also be used.

Examples of suitable polythiols include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa (3-mercaptopropionate) (di-PETMP), tri(3-mercaptopropionate) pentaerythritol, triethylolethane tri-(3-mercaptopropionate), and combinations of any of the foregoing. Examples of suitable polythiols include tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy)diethanethiol, 1,8-dimercapto-3,6-dioxaoctane, and combinations of any of the foregoing.

Examples of suitable polyalkenyls include trialkenyls, tetraalkenyls, and combinations of any of the foregoing.

Examples of suitable triisocyanates include triisocyanate trimers such as IPDI-trimer, HDI-trimer, and HDI-biuret.

Examples of suitable multifunctional Michael acceptors include trifunctional Michael acceptors, and combinations thereof.

A chain extender of Formula (4) can have the structure of Formula (21):

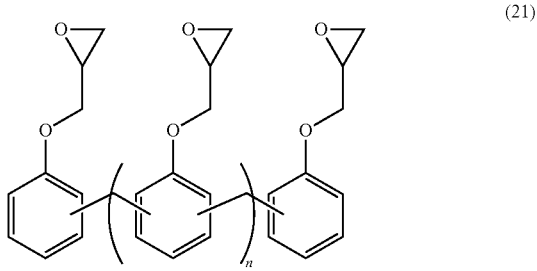

(21)

where n can have an average value for n is 0.2 to 2.

In prepolymers of Formula (3) and Formula (3a), the moiety of Formula (4a) can have the structure of Formula (21a):

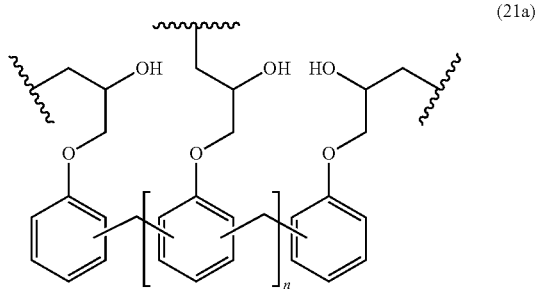

(21a)

Chain-extended sulfur-containing prepolymers provided by the present disclosure can be terminal modified. A terminal-modified chain-extended sulfur-containing prepolymer refers to a chain-extended sulfur-containing prepolymer that has been modified to have terminal functional group other than thiol groups. Terminal-modified chain-extended sulfur-containing prepolymers can be used to adapt a thiol-terminated chain-extended sulfur-containing prepolymer for use with suitable curing chemistries. For example, terminal-modified chain-extended sulfur-containing prepolymers can be used with polyisocyanate, polyurea, epoxy/amine, thiol/ene, thiol/alkynyl, and Michael acceptor/donor curing chemistries. A terminal-modified prepolymer can have, for example, terminal alkenyl, alkynyl, epoxy, isocyanate, amine, hydroxyl, Michael donor, or Michael acceptor groups.

Terminal-modified chain-extended sulfur-containing prepolymers can be prepared, for example, by reacting a thiol-terminated chain-extended sulfur-containing prepolymer provided by the present disclosure with a compound having a reactive functional group and a group reactive with a thiol group.

The compound can have a reactive functional group selected from an epoxy, alkenyl, Michael acceptor, Michael donor, isocyanate, hydroxyl, an amine; and the group reactive with a thiol can be, for example, selected from an epoxy, an alkenyl, an alkynyl, a Michael acceptor, and an isocyanate group. Examples of suitable compounds and reaction mechanisms for providing terminal-modified prepolymers based on thiol-terminated prepolymers are disclosed, for example, in U.S. Pat. No. 8,729,216.

Examples of suitable compounds include polyepoxides, polyalkenyls, polyalkynyls, polyfunctional Michael acceptors, and polyisocyanates.

A terminal-modified sulfur-containing prepolymer can have the structure of Formula (3b):

(3b)

where w, t, E, $R^{4a}$, D, and n are defined as in Formula (3a); and each $R^{11}$ independently comprises a moiety terminated in one or more reactive functional groups.

In prepolymers of Formula (3b), the one or more reactive functional groups can be selected from, for example, an alkenyl group, an epoxy group, a Michael acceptor group, a Michael donor group, a hydroxyl group, an amine group, and an isocyanate group. Prepolymers of Formula (3b) can be prepared, for example, by reacting a thiol-terminated chain-extended sulfur-containing prepolymer of Formula (3a) with a compound having at least one terminal functional group and a group reactive with a thiol group.

Compositions provided by the present disclosure can comprise a chain-extended sulfur-containing prepolymer provided by the present disclosure. A chain-extended sulfur-containing prepolymer can include a thiol-terminated chain-extended sulfur-containing prepolymer, a terminal-modified chain-extended sulfur-containing prepolymer, or a combination thereof.

Compositions provided by the present disclosure can comprise a combination of chain-extended sulfur-containing prepolymers provided by the present disclosure and a combination of a one or more other prepolymers.

The one or more other prepolymers can comprise one or more sulfur-containing prepolymers. The one or more other prepolymers can comprise prepolymers that do not contain sulfur atoms in the prepolymer backbone. The one or more other prepolymers can comprise one or more sulfur-containing prepolymers and one or more prepolymers without sulfur atoms in the backbone.

The chain-extended and non-chain-extended prepolymers can be based on the same or similar sulfur-containing prepolymer backbone. For example, both prepolymers can be based on a polythioether, a polysulfide, a sulfur-containing polyformal, or a monosulfide. For example, a composition can comprise a thiol-terminated chain-extended polythioether prepolymer and a Michael acceptor-terminated chain-extended polythioether prepolymer such as a vinyl sulfone-terminated chain-extended polythioether prepolymer.

Compositions can comprise prepolymers having the same terminal functional group. For example, each of the prepolymers can be terminated in thiol groups, alkenyl groups, epoxy groups, isocyanate groups, Michael donor, or Michael acceptor groups.

Compositions can comprise prepolymers having different terminal functional groups that are reactive with the same curing agent. For example, some prepolymers can include terminal hydroxyl groups, and other prepolymers can include terminal amine groups, both of which are reactive with a polyisocyanate curing agent.

Compositions provided by the present disclosure can comprise a combination of prepolymers characterized by at least two different molecular weight distributions. In the compositions, the chain-extended sulfur-containing prepolymers can have a higher average molecular weight distribution than other prepolymers in the composition.

For example, a composition can comprise a first prepolymer, where the first prepolymer is characterized by a first average molecular weight distribution, and a second prepolymer, where the second prepolymer is characterized by a second average molecular weight distribution, wherein the first and second average molecular weight distributions are different.

A first prepolymer, such as a chain-extended sulfur-containing prepolymer provided by the present disclosure, can be characterized by a higher number average molecular weight than the one or more other prepolymers in the composition.

A first prepolymer, such as a chain-extended sulfur-containing prepolymer provided by the present disclosure, can have an average molecular weight within a range from 5,000 Da to 10,000 Da and the one or more second prepolymers can have an average molecular weight within a range from 1,000 Da to 4,000 Da.

A composition can comprise two or more chain-extended sulfur-containing prepolymers where each of the two or more chain-extended sulfur-containing prepolymers has a different number average molecular weight. For example, a first chain-extended sulfur-containing prepolymer has a number average molecular weight from 5,000 Da to 8,000 Da, and a second chain-extended sulfur-containing prepolymer has a number average molecular weight from 10,000 Da to 15,000 Da.

A composition can comprise, for example from 20 wt % to 80 wt % of a chain-extended sulfur-containing prepolymer and from 5 wt % to 60 wt % of the one or more second prepolymers, where wt % is based on the total weight of the prepolymers in the composition.

The prepolymers in a composition can also have different average reactive functionalities. For example, the chain-extended sulfur-containing prepolymer can be characterized by a first average reactive functionality and the one or more other prepolymers in the composition can be characterized by a second average reactive functionality, where the first average reactive functionality is greater than the second average reactive functionality. For example, the chain-extended sulfur-containing prepolymer can be characterized by an average reactive functionality from 2 to 20, and the one or more other prepolymers in the composition can be characterized by an average reactive functionality from 2 to 6.

Compositions provided by the present disclosure can comprise two or more prepolymers characterized by different average molecular weights such that the average molecular weights of the prepolymers in a composition can be bi-modal, tri-modal, tetra-modal, or other distribution. The two or more prepolymers having different number average molecular weights can be chain-extended sulfur-containing prepolymers, non-chain-extended sulfur-containing prepolymers, or combinations of any of the foregoing. The number average molecular weight can refer to the weight of a specific type of prepolymer or to a combination of prepolymer. The two or more prepolymers can be reactive with the curing agent or the curing agent can comprise at least one of the prepolymers.

Compositions provided by the present disclosure can be characterized by a bi-modal molecular weight distribution in which a first number average molecular weight is from 75% to 125% greater than a second number average molecular weight.

Curable compositions provided by the present disclosure can comprise a chain-extended sulfur-containing prepolymer and a curing agent reactive with the chain-extended sulfur-containing prepolymer.

A curable composition can comprise, for example, from 20 wt % to 85 wt % of the chain-extended sulfur-containing prepolymer, and from 2 wt % to 14 wt % of a curing agent, where wt % is based on the total weight of the composition. For example, a curable composition can comprise, from 30 wt % to 75 wt % of the prepolymer and from 4 wt % to 12 wt % of the curing agent, from 40 wt % to 65 wt % of the prepolymer and from 6 wt % to 10 wt % of the curing agent, or from 45 wt % to 60 wt % of the prepolymer and from 7 wt % to 9 wt % of the curing agent, where wt % is based on the total weight of the composition.

A curing agent can comprise a small molecule curing agent, a prepolymer curing agent, or a combination thereof. A monomer such as a small molecule curing agent can have a molecular weight, for example, less than 600 Da, less than 500 Da, less than 400 Da, or less than 300 Da. A monomer can have a molecular weight, for example, from 100 Da to 600 Da, from 150 Da, to 550 Da, or from 200 Da to 500 Da. A monomer can have a molecular weight greater than 100 Da, greater than 200 Da, greater than 300 Da, greater than 400 Da, or greater than 500 Da.

A prepolymer curing agent can comprise a terminal-modified chain-extended sulfur-containing prepolymer provided by the present disclosure. A prepolymer curing agent can comprises a terminal-modified sulfur-containing prepolymer provided by the present disclosure.

A curable composition can comprise a thiol-terminated chain-extended sulfur-containing prepolymer provided by the present disclosure and a curing agent can comprise a small molecule curing agent, a prepolymer curing agent, or a combination thereof.

Curing agents can be selected as appropriate for a particular curing chemistry.

A curing agent can be polyfunctional such as difunctional, trifunctional, tetrafunctional, or a combination of any of the foregoing.

Suitable curing agents can be reactive with thiol groups. Suitable curing agents for thiol-terminated chain-extended sulfur-containing prepolymers provided by the present disclosure include polyalkenyls, polythiols, polyepoxides, polyisocyanates, and multifunctional Michael acceptors.

A curing agent can comprise a polyepoxide or a combination of polyepoxides.

Compositions provided by the present disclosure can comprise a suitable curing agent. A curing agent can be selected to react with the terminal thiol group of a thiol-terminated sulfur-containing prepolymer provided by the present disclosure.

Compositions provided by the present disclosure can comprise a polyepoxide curing agent. A polyepoxide refers to a compound having two or more reactive epoxy groups. A polyepoxide may include a combination of polyepoxides. A polyepoxide can be liquid at room temperature (23° C.).

Examples of suitable polyepoxides include polyepoxides such as hydantoin diepoxide, diglycidyl ethers of bisphenol-A, diglycidyl ether of bisphenol-F, novolac type epoxides such as DEN™ 438 (phenol novolac polyepoxide comprising the reaction product of epichlorohydrin and phenol-formaldehyde novolac) and DEN™ 431 (phenol novolac polyepoxide comprising the reaction product of epichlorohydrin and phenol-formaldehyde novolac), available from Dow Chemical Co., certain epoxidized unsaturated, and combinations of any of the foregoing.

A polyepoxide curing agent can comprise a phenol novolac polyepoxide such as DEN® 431, a bisphenol A/epichlorohydrin derived polyepoxide such as EPON® 828, or a combination thereof. A polyepoxide curing agent can comprise a combination of a phenol novolac polyepoxide and a bisphenol A/epichlorohydrin derived polyepoxide (a bisphenol A type polyepoxide).

Other examples of suitable polyepoxide curing agents include bisphenol A type polyepoxides, brominated bisphenol A type polyepoxides, bisphenol F type polyepoxides, biphenyl type polyepoxides, novolac type polyepoxides, an alicyclic polyepoxides, naphthalene type polyepoxides, ether series or polyether series polyepoxides, oxirane ring-containing polybutadienes, silicone polyepoxide copolymers, and a combination of any of the foregoing.

Additional examples of suitable bisphenol A/epichlorohydrin derived polyepoxide include a bisphenol A type polyepoxide having a weight average molecular weight of 400 or less; a branched polyfunctional bisphenol A type polyepoxide such as p-glycidyloxyphenyl dimethyltolyl bisphenol A diglycidyl ether, a bisphenol F type polyepoxide; a phenol novolac type polyepoxide having a weight average molecular weight of 570 Da or less, an alicyclic polyepoxide such as vinyl(3,4-cyclohexene)dioxide, methyl 3,4-epoxycyclohexylcarboxylate (3,4-epoxycyclohexyl), bis(3,4-epoxy-6-methylcyclohexylmethyl) adipate and 2-(3,4-epoxcy-cyclohexyl)-5,1-spiro(3,4-epoxycyclohexyl)-nm-dioxane, a biphenyl-type epoxy such as 3,3',5,5'-tetramethyl-4,4-diglycidyloxybiphenyl; a glycidyl ester type epoxy such as diglycidyl hexahydrophthalate, diglycidyl 3-methylhexahydrophthalate and diglycidyl hexahydroterephthalate; a glycidylamine type polyepoxide such as diglycidylaniline, diglycidyitoluidine, triglycidyl-p-aminophenol, tetraglycidyl-m-xylene diamine, tetraglycidylbis(aminomethyl)cyclohexane; a hydantoin type polyepoxide such as 1,3-diglycidyl-5-methyl-5-ethylhydantoin; and a naphthalene ring-containing polyepoxide. Also, a polyepoxide having silicone such as 1,3-bis(3-glycidoxy-propyl)-1,1,3,3-tetramethyldisiloxane may be used. Other examples of suitable polyepoxides include (poly)ethylene glycol diglycidyl ether, (poly) propylene glycol diglycidyl ether, butanediol diglycidyl ether and neopentyl glycol diglycidyl ether; and tri-epoxides such as trimethylolpropane triglycidyl ether and glycerin triglycidyl ether.

Examples of commercially available polyepoxides suitable for use in compositions provided by the present disclosure include polyglycidyl derivatives of phenolic compounds, such as those available under the trade names Epon® 828, Epon® 1001, Epon® 1009, and Epon® 1031, from Resolution Performance Products LLC; and DER® 331, DER® 332, DER® 334, and DER® 542 from Dow Chemical Co. Other suitable polyepoxides include polyepoxides prepared from polyols and the like and polyglycidyl derivatives of phenol-formaldehyde novolacs, the latter of which are commercially available under the trade names DEN® 431, DEN® 438, and DEN® 439 from Dow Chemical Company. Cresol analogs are also available commercially ECN® 1235, ECN® 1273, and ECN® 1299 from Ciba Specialty Chemicals, Inc. SU-8 is a bisphenol A-type polyepoxide novolac available from Resolution Performance Products LLC. Polyglycidyl adducts of amines, aminoalcohols and polycarboxylic acids are also useful polyepoxides, including Glyamine® 135, Glyamine® 125, and Glyamine® 115 from F.I.C. Corporation; Araldite® MY-720, Araldite® MY-721, Araldite® 0500, and Araldite® 0510 from Ciba Specialty Chemicals.

A polyepoxide can comprise a urethane-modified diepoxide. A urethane diepoxide can be derived from the reaction of an aromatic diisocyanate and a diepoxide. A urethane-modified diepoxide can comprise a diepoxide having the structure of Formula (22):

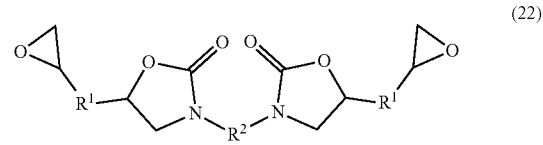

(22)

where each $R^1$ is derived from a diglycidyl ether and $R^2$ is derived from an aromatic diisocyanate.

Examples of suitable aromatic diisocyanates in which the isocyanate groups are not bonded directly to the aromatic ring include, but are not limited to, bis(isocyanatoethyl) benzene, α,α,α',α'-tetramethylxylene diisocyanate, 1,3-bis (1-isocyanato-1-methylethyl)benzene, bis(isocyanatobutyl) benzene, bis(isocyanatomethyl)naphthalene, bis (isocyanatomethyl)diphenyl ether, bis(isocyanatoethyl) phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl) ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Examples of suitable diepoxides include diglycidyl ether, 1,4-butanediol diglycidyl ether, neopentyl glycol diglycidyl ether, 1,3-butanediol diglycidyl ether, neopentyl glycol diglycidyl ether, dipropylene glycol diglycidyl ether, 1,6-hexanediol diglycidyl ether, ethylene glycol diglycidyl ether, diethylene glycol diglycidyl ether, glycerol 1,3-diglycidyl ether, etoglucid, 1,5-hexadiene diepoxide, diepoxy propyl ether, 1,5-hexadiene diepoxide, 1,2:9,10-diepoxydecane, 1,2:8,9-diepoxynonanne, and 1,2:6,7-diepoxyheptane; aromatic diepoxides such as resorcinol diglycidyl ether, bisphenol A diglycidyl ether, bisphenol F diglycidyl ether, bis[4-(glycidyloxy)phenyl]methane, 1,4-bis(glycidyloxy) benzene, tetramethylbiphenyl diglycidyl ether, and 4,4-diglyciyloxybiphenyl; and cyclic diepoxides such as 1,4-cyclohexanedimethanol diglycidyl ether, hydrogenated bisphenol A diglycidyl ether, and 1,4-bis(glycidyloxy)cyclohexane.

Diepoxides of Formula (22) are available, for example, from Kukdo Chemical Co., Ltd. (Korea).

A composition can comprise a phenol novolac polyepoxide and a bisphenol A/epichlorohydrin derived polyepoxide. A composition can comprise an equal wt % of a novolac polyepoxide and a bisphenol A/epichlorohydrin derived polyepoxide. A composition can comprise a wt % ratio of a phenol novolac polyepoxide and a bisphenol A/epichlorohydrin derived polyepoxide with a range, for example, from 0.8:1 to 1:0.8, or from 0.9:1 to 1:0.9.

A polyepoxide can comprise, for example, from 40 wt % to 60 wt % of a bisphenol A/epichlorohydrin derived polyepoxide and from 40 wt % to 60 wt % of a phenol novolac polyepoxide; from 45 wt % to 55 wt % of a bisphenol A/epichlorohydrin derived polyepoxide and from 45 wt % to 55 wt % of a phenol novolac polyepoxide; or from 47 wt % to 53 wt % of a bisphenol A/epichlorohydrin derived polyepoxide and from 47 wt % to 53 wt % of a phenol novolac polyepoxide; where wt % is based on the total weight of the polyepoxide in a composition.

A polyepoxide can comprise, for example, from 30 wt % to 80 wt % of a hydroxyl-functional polyepoxide, from 35 wt % to 75 wt %, or from 40 wt % to 70 wt % of a hydroxyl-functional polyepoxide, where wt % is based on the total weight of the polyepoxide in the composition.

A polyepoxide can comprise a hydroxyl-functional polyepoxide or combination of hydroxyl-functional polyepoxides. For example, a polyepoxide can comprise a hydroxyl-functional bisphenol A/epichlorohydrin derived polyepoxide.

A bisphenol A/epichlorohydrin derived polyepoxide can comprise pendent hydroxyl groups such as, for example, from 1 to 10 pendent hydroxyl groups, from 1 to 8 hydroxyl groups, from 1 to 6 hydroxyl groups, from 1 to 4 pendent hydroxyl groups, or from 1 to 2 pendent hydroxyl groups, such as 1, 2, 3, 4 5, or 6 pendent hydroxyl groups. A bisphenol A/epichlorohydrin derived polyepoxide having pendent hydroxyl groups can be referred to as hydroxyl-functional bisphenol A/epichlorohydrin derived polyepoxide.

Hydroxyl-functional bisphenol A/epichlorohydrin derived polyepoxide can have an epoxy equivalent weight from 400 to 1,500, from 400 to 1,000 or from 400 to 600.

A bisphenol A/epichlorohydrin derived polyepoxide can comprise a bisphenol A/epichlorohydrin derived polyepoxide without a hydroxyl-functional component, a bisphenol A/epichlorohydrin derived polyepoxide which is partly hydroxyl-functional, or all of the bisphenol A/epichlorohydrin derived polyepoxide can be hydroxyl-functional.

A bisphenol A/epichlorohydrin derived polyepoxide having hydroxyl pendent groups can have the structure of Formula (23):

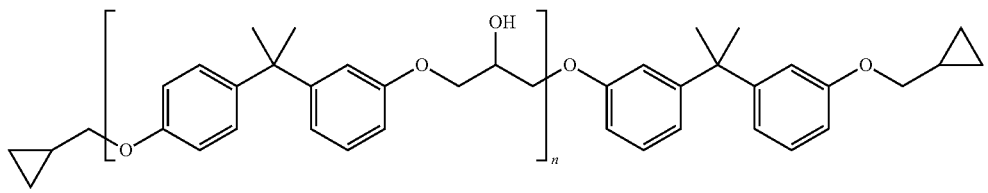

where n is an integer from 1 to 6, or n is within a range from 1 to 6. In a polyepoxide of Formula (23), n can be 2.

Examples of suitable bisphenol A/epichlorohydrin derived polyepoxide include bisphenol A/epichlorohydrin derived polyepoxide in which n is an integer from 1 to 6, or a combination of bisphenol A/epichlorohydrin derived polyepoxide in which n can be a non-integer value, for example, from 0.1 to 2.9, from 0.1 to 2.5, from 0.1 to 2.1, from 0.1 to 1.7, from 0.1 to 1.5, from 0.1 to 1.3, from 0.1 to 1.1, from 0.1 to 0.9, from 0.3 to 0.8, or from 0.5 to 0.8.

A bisphenol A/epichlorohydrin derived polyepoxide comprising hydroxyl pendent groups can comprise, for example, a 2,2-bis(p-glycidyloxyphenyl)propane condensation product with 2,2-bis(p-hydroxyphenyl)propane and similar isomers. Suitable bisphenol A/epichlorohydrin derived polyepoxide comprising hydroxyl pendent groups are available, for example, from Momentive and Hexion and include Epon® solid epoxy such as Epon® 1001F, Epon® 1002F, Epon® 1004F, Epon® 1007F, Epon® 1009F, and combinations of any of the foregoing. Such bisphenol A/epichlorohydrin derived polyepoxide may be provided, for example, as a 70 wt % to 95 wt % solids solution in a suitable solvent such as methyl ethyl ketone. Such high solids content include, for example, Epon® 1001-A-80, Epon® 1001-B-80, Epon® 1001-CX—75, Epon® 1001-DNT-75, Epon® 1001-FT-75, Epon® 1001-G-70, Epon® 1001-H-75, Epon® 1001-K-65, Epon® 1001-O-75, Epon® 1001-T-75, Epon® 1001-UY-70, Epon® 1001-X—75, Epon® 1004-O-65, Epon® 1007-CT-55, Epon® 1007-FMU-50, Epon®1007-HT-55, Epon® 1001-DU-40, Epon® 1009-MX—840, or a combination of any of the foregoing. Further examples of suitable bisphenol A-derived polyepoxide resins include Epon™ 824, Epon® 825, Epon® 826, and Epon® 828.

A bisphenol A/epichlorohydrin derived polyepoxide can have an epoxy equivalent weight (EEW, gm/eq), for example, from 150 to 450.

Phenol novolac polyepoxides are multifunctional polyepoxides obtained by reacting a phenolic novolac with epichlorohydrin and contain more than two epoxy groups per molecule Phenol novolac polyepoxides can have a EEW, for example, from 150 to 200. Phenol novolac polyepoxides can have the structure of Formula (21):

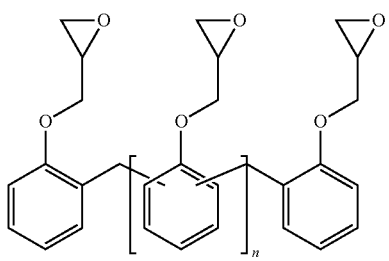

(21)

where n can have an average value, for example, from 0.2 to 1.8 (DER® 354, DEN® 431, DEN® 438, and DEN® 439, available from Dow Chemical Company).

Examples of suitable epoxy novolacs include novolac polyepoxides in which n is an integer from 1 to 6, from 1 to 4, or from 1 to 2; or in which n can be a non-integer value, for example, from 0.1 to 2.9, from 0.1 to 2.5, from 0.1 to 2.1, from 0.1 to 1.7, from 0.1 to 1.5, from 0.1 to 1.3, from 0.1 to 1.1, from 0.1 to 0.9, from 0.3 to 0.8, or from 0.5 to 0.8.

A polyepoxide can comprise, for example, a difunctional polyepoxide, a polyepoxide having an epoxy functionality greater than 2 such as from 3 to 6, or a combination thereof. A multifunctional polyepoxide can have an average epoxy functionality, for example, from 2.1 to 3.5, from 2.2 to 3.4, from 2.6 to 3.2, or from 2.7 to 3.1.

A polyepoxide can comprise, for example, a combination of a difunctional polyepoxide or combination of difunctional polyepoxides, a multifunctional polyepoxide or combination of multifunctional polyepoxides, or a combination of any of the foregoing.

Compositions provided by the present disclosure can comprise, for example, from 40 wt % to 70 wt % of a difunctional polyepoxide and from 30 wt % to 60 wt % of a multifunctional polyepoxide; from 45 wt % to 65 wt % of a difunctional polyepoxide and from 35 wt % to 55 wt % of a multifunctional polyepoxide; or from 40 wt % to 60 wt % of a difunctional polyepoxide and from 40 wt % to 60 wt % of a multifunctional polyepoxide; wherein wt % is based on the total weight of the polyepoxide in a composition, and a multifunctional polyepoxide has an average epoxy functionality of greater than two (2).

A difunctional polyepoxide can have an epoxy equivalent weight, for example, from 400 to 1,500, from 400 to 1,000, or from 400 to 600.

A multifunctional polyepoxide can have an epoxy equivalent weight, for example, from 140 to 500, from 150 to 300, or from 160 to 200.

Compositions provided by the present disclosure can comprise, for example, from 40 wt % to 70 wt % of a hydroxyl-functional difunctional polyepoxide and from 30 wt % to 60 wt % of a multifunctional polyepoxide; from 45 wt % to 65 wt % of a hydroxyl-functional difunctional polyepoxide and from 35 wt % to 55 wt % of a multifunctional polyepoxide; or from 40 wt % to 60 wt % of a hydroxyl-functional difunctional polyepoxide and from 40 wt % to 60 wt % of a multifunctional polyepoxide; where wt % is based on the total weight of the polyepoxide in a composition.

A polyepoxide suitable for use in compositions provided by the present disclosure can comprise, for example, from 30 wt % to 60 wt % of a polyepoxide having an average epoxy functionality from 2.6 to 3.2, from 35 wt % to 58 wt %, from 44 wt % to 56 wt %, from 46 wt % to 54 wt %, or from 48 wt % to 52 wt % of a polyepoxide having an average epoxy functionality from 2.6 to 3.2; and from 30 wt % to 60 wt % of a difunctional polyepoxide, from 42 wt % to 58 wt %, from 44 wt % to 56 wt %, from 46 wt % to 54 wt %, or from 44 wt % to 52 wt % of a difunctional polyepoxide, where wt % is based on the total weight of the polyepoxide in a composition.

A difunctional polyepoxide can comprise a hydroxyl-functional polyepoxide.

Suitable polyepoxides for use in compositions provided by the present disclosure can comprise, for example, from 30 wt % to 80 wt % of a hydroxyl-functional polyepoxide, from 35 wt % to 75 wt % of a hydroxyl-functional polyepoxide, or from 40 wt % to 70 wt % of a hydroxyl-functional polyepoxide, where wt % is based on the total weight of a polyepoxide.

Compositions provided by the present disclosure can comprise a combination of polyepoxides. A combination of polyepoxides can comprise polyepoxides having different polyepoxides having different functionalities or different average functionalities. For example, a combination of polyepoxides can comprise a polyepoxide having an average epoxy functionality from 2.7 to 2.9 and a polyepoxide having an epoxy functionality of 2. Polyepoxides having a higher average functionality can increase the cross-linking density of a cured polymer network, which can lead to increased tensile strength, but also can reduce the % elongation of a cured sealant. Polyepoxides having a low epoxy functionality such as around 2 can result in a cured composition that is more flexible. Because low-density compositions have can have high content of filler, which tends to increase the tensile strength of a cured sealant, it can be desirable to use polyepoxides or combinations of polyepoxides having an average epoxy functionality from 2.1 to 3, such as from 2.1 to 2.5, or from 2.1 to 2.3. A low-density composition can have a specific gravity, for example, less than 1.1, less than 1.0, less than 0.9, less than 0.8, or less than 0.7. A low-density composition can have a specific gravity, for example, from 0.7 to 1.1, from 0.75 to 1.05, or from 0.8 to 1.0.

Compositions and sealants provided by the present disclosure can comprise, for example, from 4 wt % to 20 wt %, from 4 wt % to 20 wt %, from 4 wt % to 18 wt %, from 6 wt % to 16 wt %, from 6 wt % to 14 wt % of a polyepoxide or combination of polyepoxides, where wt % is based on the total weight of the composition.

Compositions provided by the present disclosure can comprise, for example, from 35 wt % to 80 wt % of a difunctional hydroxyl-containing polyepoxide, from 20 wt % to 60 wt % of a multifunctional polyepoxide, and from 1 wt % to 7 wt % of a urethane-modified polyepoxide. Compositions provided by the present disclosure can comprise, for example, from 40 wt % to 75 wt % of a difunctional hydroxyl-containing polyepoxide, from 20 wt % to 50 wt % of a multifunctional polyepoxide, and from 2 wt % to 6 wt % of a urethane-modified polyepoxide.

A polyepoxide resin can comprise a bisphenol A epoxy resin, a bisphenol F epoxy resin, a novolac epoxy resin, an aliphatic epoxy resin, a glycidylamine epoxy resin, and combinations of any of the foregoing A polyepoxide curing agent can include an epoxy-terminated sulfur-containing prepolymer provided by the present disclosure, an epoxy-terminated chain-extended sulfur-containing prepolymer provided by the present disclosure, or a combination thereof.

Examples of suitable polyalkenyl curing agents include polyvinyl ethers, a trifunctional polyalkenyl, a polyalkenyl prepolymer, or a combination of any of the foregoing.

A polyalkenyl curing agent can comprise a polyalkenyl ether of Formula (6), a polyalkenyl ether of Formula (7), or a combination thereof.

A polyalkenyl curing agent can include an alkenyl-terminated sulfur-containing prepolymer provided by the present disclosure, an alkenyl-terminated chain-extended sulfur-containing prepolymer provided by the present disclosure, or a combination thereof.

Examples of suitable polythiol curing agents include polythiol monomers, polythiol prepolymers, and combinations thereof.

A polythiol curing agent can include a thiol-terminated sulfur-containing prepolymer provided by the present disclosure, a thiol-terminated chain-extended sulfur-containing prepolymer provided by the present disclosure, or a combination thereof.

Examples of suitable polyisocyanate curing agents include polyisocyanate monomers, polyisocyanate prepolymers, and combinations thereof.

A polyisocyanate curing agent can include an isocyanate-terminated sulfur-containing prepolymer provided by the present disclosure, an isocyanate-terminated chain-extended sulfur-containing prepolymer provided by the present disclosure, or a combination thereof.

A polyfunctional Michael donor curing agent can include a Michael donor-terminated sulfur-containing prepolymer provided by the present disclosure, a Michael donor-terminated chain-extended sulfur-containing prepolymer provided by the present disclosure, or a combination thereof.

A polyfunctional Michael acceptor curing agent can include a Michael acceptor-terminated sulfur-containing prepolymer provided by the present disclosure, a Michael acceptor-terminated chain-extended sulfur-containing prepolymer provided by the present disclosure, or a combination thereof.

Compositions provided by the present disclosure can comprise a filler. A filler can be selected from, for example, inorganic filler, organic filler, metal, low density filler, electrically conductive filler, and combinations of any of the foregoing.

Compositions and sealants provided by the present disclosure can comprise an organic filler or a combination of organic filler. Organic filler can be selected to have a low specific gravity such as organic filler having a spectic gravity less than 1, and to be resistant to aviation chemicals and/or fluids such as JRF Type I and Skydrol®, such as Skydrol® LD-4.

An organic filler can be selected to be resistant to Skydrol®. For example, an organic filler that is resistant to Skydrol®, such as Skydrol® LD-4, will exhibit a swelling of less than 1 vol % following immersion in Skydrol® at a temperature of less than 50° C. for 1,000 hours, or less than 1.2 vol % following immersion in Skydrol® at a temperature of less than 70° C. for 1,000 hours, where the percent swelling is determined according to EN ISO 10563. Suitable organic filler can also have acceptable adhesion for an intended purpose to the sulfur-containing polymer matrix. An organic filler can include solid particles, hollow particles, or a combination thereof. The particles can be substantially spherical (referred to as powders) having an aspect ratio from 1:1 to 2:1, substantially non-spherical (referred to as particulates) having an aspect ratio greater than 2:1, or a combination thereof. The particles can have a mean particle diameter less than, for example, 100 µm, 50 µm, 40 µm, 30 µm, or less than 25 µm, as determined according to ASTM E-2651-13. A powder can comprise particles having a mean particle diameter with a range from 0.25 µm to 100 µm, 0.5 µm to 50 µm, from 0.5 µm to 40 µm, from 0.5 µm to m, from 0.5 µm to 20 µm, from 1 µm to 15 µm, from 1 µm to 10 µm, from 1 µm to 9 µm, from 2 µm to 8 µm, from 3 µm to 8 µm, or from 5 µm to 8 µm. Filler particles can comprise nano-powders, comprising particles characterized by a d50 particle size, for example, from 1 nm to 100 nm.

An organic filler can have a specific gravity, for example, less than 1.6, less than 1.4, less than 1.15, less than 1.1, less than 1.05, less than 1, less than 0.95, less than 0.9, less than 0.8, or less than 0.7, where specific gravity is determined according to ISO 787 (Part 10). Organic filler can have a specific gravity, for example, within a range from 0.85 to 1.6, within a range from 0.85 to 1.4, within a range from 0.9 to 1.1, within a range from 0.9 to 1.05, or from 0.85 to 1.05, where specific gravity is determined according to ISO 787 (Part 10).

Organic filler can comprise thermoplastics, thermosets, or a combination thereof. Examples of suitable organic filler include epoxies, epoxy-amides, ethylene tetrafluoroethylene copolymers, polyethylenes, polypropylenes, polyvinylidene chlorides, polyvinylfluorides, poly(tetrafluoroethylene), polyamides including nylon 12 and nylon 6, polyimides, ethylene propylenes, perfluorohydrocarbons, fluoroethylenes, polycarbonates, polyetheretherketones, polyetherketones, polyphenylene oxides, polyphenylene sulfides, polyether sulfones, thermoplastic copolyesters, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic filler include polyamides such as polyamide 6 and polyamide 12, polyimides, polyethylene, polyphenylene sulfides, polyether sulfones, thermoplastic copolyesters, and combinations of any of the foregoing.

Examples of suitable polyamide 6 and polyamide 12 particles are available from Toray Plastics as grades SP-500, SP-10, TR-1, and TR-2. Suitable polyamides are also available from the Arkema Group under the tradename Orgasol®, and from Evonik Industries under the tradename Vestosit®. For example, Ganzpearl® polyamides such as Ganzpearl® GPA-550 and GPA-700 are available from Persperse Sakai Trading, New York, N.Y.

Examples of suitable polyimides filler are available from Evonik Industries under the tradename P84® NT.

An organic filler can include a polyethylene, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon™.

The use of organic filler such as polyphenylene sulfide in aerospace sealants is disclosed in U.S. Pat. No. 9,422,451. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a specific gravity from about 1.3 to about 1.4, where specific gravity is determined according to ISO 787 (Part 10). Polyphenylene sulfide particles having a density of 1.34 g/cm$^3$ and a mean particle diameter of 0.2 µm to 0.25 µm (in water, or from 0.4 µm to 0.5 µm in isopropanol) are available from Toray Industries, Inc.

Polyether sulfone particles are available from Toray Industries, Inc., which have a density of 1.37 g/cm³ and a mean particle diameter from 5 m to 60 m.

Thermoplastic copolyester particles can be obtained from Toray Industries, Inc.

Other suitable organic filler microspheres include silicone, acrylate crosspolymer, polymethyl methacrylate, methylmethacrylate crosspolymer, styrene/DVB copolymer, polymethylsilsequioxane, dimethicone/vinyl dimethicone crosspolymer, and polytetrafluoroethylene.

An organic filler can have any suitable shape. For example, an organic filler can comprise fractions of crushed polymer that has been filtered to a desired size range. An organic filler can comprise substantially spherical particles. Particles can be solid or can be porous. An organic filler can be, for example, in the form of spherical beads. The spherical beads can be porous or non-porous. For example, the spherical organic beads can be non-porous.

An organic filler can have a mean or d50 particle size, for example, within a range from 1 µm to 100 µm, 2 µm to 40 µm, from 2 µm to 30 µm, from 4 µm to 25 µm, from 4 µm to 20 µm, from 2 µm to 12 µm, or from 5 µm to 15 µm. An organic filler can have an average particle size, for example, less than 100 µm, less than 75 µm, less than 50 µm, less than 40 µm, less than 20 µm, less than 15 µm, less than 10 µm, or less than 5 µm.

An organic filler can comprise, for example, polyamide beads such as nylon 12, having an average diameter from 5 µm to 10 µm.

An organic filler can include a low-density filler such as n expanded thermoplastic microcapsule and/or a modified expanded thermoplastic microcapsule. Suitable modified expanded thermoplastic microcapsules can include an exterior coating of a melamine or urea/formaldehyde resin.

A thermally expandable microcapsule refers to a hollow shell comprising a volatile material that expands at a predetermined temperature. Thermally expandable thermoplastic microcapsules can have an average initial d50 particle size of 5 µm to 70 µm, in some cases 10 µm to 24 µm, or from 10 µm to 17 µm.

A thermally expandable thermoplastic microcapsule can comprise a volatile hydrocarbon or volatile halogenated hydrocarbon within a wall of a thermoplastic resin. Examples of hydrocarbons suitable for use in such microcapsules are include methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787 (Part 10). Low density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ISO 787 (Part 10).

Low density microcapsules can be characterized by a mean particle diameter from 1 µm to 100 µm and can have a substantially spherical shape. Low density microcapsules can be characterized, for example, by a mean particle diameter from 10 µm to 100 µm, from 10 µm to 60 µm, from 10 µm to 40 µm, or from 10 µm to 30 µm, as determined according to ASTM E-2651-13.

Low density filler can comprise uncoated microcapsules, coated microcapsules, or combinations thereof.

Low density filler such as low-density microcapsules can comprise expanded microcapsules having a coating of an aminoplast resin such as a melamine resin. Aminoplast resin-coated particles are described, for example, in U.S. Pat. No. 8,993,691. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low density filler such as low-density microcapsules can comprise thermally expandable thermoplastic microcapsules having an exterior coating of an aminoplast resin, such as a melamine resin. The coated low-density microcapsules can have an exterior coating of a melamine resin, where the coating can have a thickness, for example, less than 2 µm, less than 1 µm, or less than 0.5 µm. The melamine coating on the low-density microcapsules is believed to render the microcapsules reactive with the thiol-terminated polythioether prepolymer and/or the polyepoxide curing agent, which enhances the fuel resistance, and renders the microcapsules resistant to pressure.

The thin coating of an aminoplast resin can have a film thickness of less than 25 µm, less than 20 µm, less than 15 µm, or less than 5 µm. The thin coating of an aminoplast resin can have a film thickness of at least 0.1 nanometers, such as at least 10 nanometers, or at least 100 nanometers, or, in some cases, at least 500 nanometers.

Aminoplast resins can be based on the condensation products of formaldehyde, with an amino- or amido-group carrying substance. Condensation products can be obtained from the reaction of alcohols and formaldehyde with melamine, urea or benzoguanamine. Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303ULF, Cymel™ 303ULF, Cymel™ 304, Cymel™ 350, Cymel™ 3745, Cymel™ XW-3106, Cymel™ MM-100, Cymel™ 370, Cymel™ 373, Cymel™ 380, ASTRO MEL™601, ASTRO MEL™ 601ULF, ASTRO MEL™400, ASTRO MEL™ NVV-3A, Aricel PC-6A, ASTRO MEL™ CR-1, and ASTRO SET™ 90. A suitable aminoplast resin can comprise a urea-formaldehyde resin.

The low-density microcapsules can be prepared by any suitable technique, including, for example, as described U.S. Pat. Nos. 8,816,023 and 8,993,691. Coated low density microcapsules can be obtained, for example, by preparing an aqueous dispersion of microcapsules in water with a melamine resin, under stirring. A catalyst may then be added, and the dispersion heated to, for example, a temperature from 50° C. to 80° C. Low density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added, and the mixture stirred for 10 minutes. The solids can be filtered, rinsed with distilled water, and dried overnight at room temperature (23° C.). The resulting powder of aminoplast resin-coated microcapsules can then be sifted through a 250 μm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ISO 787 (Part 10). For example, Expancel™ 920 DE 40 and Expancel™ 920 DE 80 can be characterized by a specific gravity of about 0.03, wherein the specific gravity is determined according to ISO 787 (Part 10).

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ISO 787 (Part 10).

Aminoplast-coated microcapsules and method of making aminoplast-coated microcapsules are disclosed, for example in U.S. Application Publication No. 2016/0083619.

A composition can comprise, for example, from 1 vol % to 80 vol % of a low-density filler, from 15 vol % to 75 vol %, from 20 vol % to 70 vol %, from 25 vol % to 65 vol %, or from 30 vol %, to 60 vol % of a low-density filler. A composition can comprise, for example, from 0.1 wt % to 10 wt %, from 0.5 wt % to 8 wt %, from 1 wt % to 6 wt %, or from 2 wt % to 6 wt % of a low density filler.

Other suitable low-density filler include, for example, glass microspheres such as silica microspheres.

Compositions and sealants provided by the present disclosure can comprise, for example, from 10 wt % to 35 wt % of an organic filler, from 15 wt % to 35 wt %, from 10 wt % to 35 wt %, from 15 wt % to 30 wt %, from 18 wt % to 32 wt %, from 15 wt % to 25 wt %, from 17 wt % to 23 wt %, from 20 wt % to 30 wt %, or from 22 wt % to 28 wt % of an organic filler, where wt % is based on the total weight of the composition. Compositions and sealants can comprise an organic filler comprising a polyamide, an oxidized polyethylene, and aminoplast-coated microcapsules. Compositions and sealants can comprise an organic filler comprising a polyamide and aminoplast-coated microcapsules.

Compositions and sealants provided by the present disclosure can comprise an inorganic filler or combination of inorganic filler. An inorganic filler can be included to provide mechanical reinforcement and to control the rheological properties of the composition. Inorganic filler may be added to compositions to impart desirable physical properties such as, for example, to increase the impact strength, to control the viscosity, or to modify the electrical properties of a cured composition.

Inorganic filler useful in compositions provided by the present disclosure and useful for aviation and aerospace applications include carbon black, calcium carbonate, precipitated calcium carbonate, calcium hydroxide, hydrated alumina (aluminum hydroxide), fumed silica, silica, precipitated silica, silica gel, and combinations of any of the foregoing. For example, an inorganic filler can include a combination calcium carbonate and fumed silica, and the calcium carbonate and fumed silica can be treated and/or untreated. An inorganic filler can comprise calcium carbonate and fumed silica.

An inorganic filler can be coated or uncoated. For example, an inorganic filler can be coated with a hydrophobic coating, such as a coating of polydimethylsiloxane.

Suitable calcium carbonate filler includes products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Compositions provided by the present disclosure can comprise, for example, from 2 wt % to 30 wt % of an inorganic filler or combination of inorganic filler, from 5 wt % to 25 wt %, from 7 wt % to 20 wt %, or from 18 wt % to 5 wt % where wt % is based on the total weight of the composition. An inorganic filler can comprise a combination of calcium carbonate and fumed silica.

Compositions provided by the present disclosure can comprise, for example, from 5 wt % to 45 wt % of an organic filler or combination of organic filler, from 10 wt % to 40 wt %, from 15 wt % to 35 wt %, or from 20 wt % to 30 wt %, where wt % is based on the total weight of the composition. An organic filler can comprise a combination of a micronized polyolefin filler and polyamide filler.

Compositions and sealants provided by the present disclosure can comprise an adhesion promoter or combination of adhesion promoters. Adhesion promoters can be included in a composition to increase the adhesion of the polymeric matrix to organic filler, inorganic filler, and to surfaces such as titanium composite surfaces, stainless steel surfaces, compositions, aluminum, and other coated and uncoated aerospace surfaces.

An adhesion promoter can include a phenolic adhesion promoter, a combination of phenolic adhesion promoters, an organo-functional alkoxysilane, a combination of organo-functional alkoxysilanes, hydrolyzed alkoxysilanes, a combination of hydrolyzed alkoxysilanes, or a combination of any of the foregoing. An organo-functional alkoxysilane can be an amine-functional alkoxysilane.

Compositions provided by the present disclosure can comprise an organo-functional alkoxysilane, a phenolic adhesion promoter, and a hydrolyzed organo-functional alkoxysilane. Examples of suitable adhesion promoters include phenolic resins such as Methylon® phenolic resin, organo-functional alkoxysilanes, such as epoxy-, mercapto- or amine-functional alkoxysilanes, such as Silquest® organo-functional alkoxysilanes, and hydrolyzed alkoxysilanes.

Compositions and sealants provided by the present disclosure can comprise a phenolic adhesion promoter, an organo-functional alkoxysilane, or a combination thereof. A phenolic adhesion promoter can comprise a cooked phenolic resin, an un-cooked phenolic resin, or a combination thereof. Phenolic adhesion promoters can comprise the reaction product of a condensation reaction of a phenolic resin with one or more thiol-terminated polysulfides. Phenolic adhesion promoters can be thiol-terminated. A cooked phenolic adhesion promoter comprises that reaction product of reactants comprise a phenolic resin and a thiol-terminated sulfur-containing pepolymer.

Examples of suitable cooked phenolic resins include T-3920 and T-3921, available for PPG Aerospace.

Examples of suitable phenolics that can be used to provide phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin or a Thiokol® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071. Bakelite phenolic resins are available from Hexion.

Compositions provided by the present disclosure can comprise an organo-functional adhesion promoter such as an organo-functional alkoxysilane. An organo-functional alkoxysilane can comprise hydrolysable groups bonded to a silicon atom and at least one organo-functional group. An organo-functional alkoxysilane can have the structure $R^a$—$(CH_2)_n$—$Si(-OR)_{3-n}R_n$, where $R^a$ comprises an organo-functional group, n is 0, 1, or 2, and R is alkyl such as methyl or ethyl. Examples of suitable organo-functional groups include epoxy, amino, methacryloxy, or sulfide groups. An organo-functional alkoxysilane can be a dipodal organo-functional alkoxysilane having two or more alkoxysilane groups. An organo-functional alkoxysilane can be a combination of a monoalkoxysilane and a dipodal alkoxysilane.

An amine-functional alkoxysilane can comprise a primary amine-functional alkoxysilane, a secondary amine-functional alkoxysilane, or a combination thereof. A primary amine-functional alkoxysilane refers to a alkoxysilane having primary amino group. A secondary amine-functional alkoxysilane refers to a alkoxysilane having a secondary amine group.

A secondary amine-functional alkoxysilane can be a sterically hindered amine-functional alkoxysilane. In a sterically hindered amine-functional alkoxysilane the secondary amine can be proximate a large group or moiety that limits or restricts the degrees of freedom of the secondary amine compared to the degrees of freedom for a non-sterically hindered secondary amine. For example, in a sterically hindered secondary amine, the secondary amine can be proximate a phenyl group, a cyclohexyl group, or a branched alkyl group.

Amine-functional alkoxysilanes can be amine-functional alkoxysilanes having a molecular weight, for example, from 100 Da to 1000 Da, from 100 Da to 800 Da, from 100 Da to 600 Da, or from 200 Da to 500 Da.

Examples of suitable primary amine-functional alkoxysilanes include 4-aminobutyltriethoxysilane, 4-amino-3,3-dimethylbutyltrimethoxysilane, N-(2-aminoethyl)-3-aminopropyltriethoxysilane, 3-(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl) pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional alkoxysilanes include aminoethylaminomethyl)phenethyltrimethoxysilane and N-(2-aminoethyl)-3-aminopropyltrimethoxysilane.

Examples of suitable secondary amine-functional alkoxysilanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(n-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Suitable amine-functional alkoxysilanes are commercially available, for example, from Gelest Inc. and from Dow Corning Corporation.

Examples of suitable amino-functional alkoxysilanes include Silquest® A-187, Silquest® A-1100, and Silquest® A-1110, available from Momentive Performance Materials.

Suitable adhesion promoters also include sulfur-containing adhesion promoters such as those disclosed in U.S. Pat. Nos. 8,513,339; 8,952,124; and 9,056,949; and U.S. Application Publication No. 2014/0051789.

Examples of suitable phenolic adhesion promoters include T-1601, T-3920 and T-3921, available from PPG Aerospace. A phenolic adhesion promoter can comprise a cooked phenolic resin, an un-cooked phenolic resin, or a combination thereof. Phenolic adhesion promoters can comprise the reaction product of a condensation reaction of a phenolic resin with one or more thiol-terminated polysulfides.

Examples of suitable phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

Compositions and sealants provided by the present disclosure can comprise from 0.5 wt % to 4 wt %, from 0.5 wt % to 3.5 wt %, from 0.8 wt % to 3.2 wt %, from 1.0 wt % to 4.0 wt %, from 1.0 wt % to 3.0 wt %, from 1.5 wt % to 3.0 wt %, or from 1.7 wt % to 2.8 wt %, of an adhesion promoter or combination of adhesion promoters, where wt % is based on the total weight of the composition. For example, an adhesion promoter can comprise a combination of cooked phenolics, amino-functional alkoxysilanes, partially hydrolyzed alkoxysilanes, partially condensed alkoxysilanes, fully condensed alkoxysilanes, and fully hydrolyzed alkoxysilanes.

Compositions provided by the present disclosure can comprise an adhesion promoter comprising a phenolic adhesion promoter or combination of phenolic adhesion promoters, and an amine-functional alkoxysilane or combination of amine-functional alkoxysilanes.

An adhesion promoter can comprise, for example, from 70 wt % to 95 wt % of a phenolic adhesion promoter; and from 5 wt % to 25 wt % of an amine-functional alkoxysilane, where wt % is based on the total weight of the adhesion promoter in a composition. An adhesion promoter can comprise, for example, from 70 wt % to 92 wt % of a phenolic adhesion promoter; and from 8 wt % to 25 wt % of an amine-functional alkoxysilane, where wt % is based on the total weight of the adhesion promoter in a composition. An adhesion promoter can comprise, for example, from 10 wt % to 40 wt % of the amino-functional alkoxysilane; and from 60 wt % to 90 wt % of the phenolic resin, where wt % is based on the total weight of the adhesion promoter in a composition.

An adhesion promoter can comprise, for example, from 75 wt % to 92 wt % of a phenolic adhesion promoter, and from 8 wt % to 25 wt % of an organo-functional alkoxysilane, where wt % is based on the total weight of the adhesion promoter in a composition.

Compositions and sealants provided by the present disclosure can comprise one or more catalysts for a thiol-epoxy reaction. The one or more additional catalysts can include an amine catalyst or combination of amine catalysts.

A suitable amine catalyst for use in compositions of the present disclosure is capable of catalyzing the reaction between thiol groups and epoxy groups. An amine catalyst can comprise an amine catalyst such as, for example, N,N-dimethylethanolamine, triethylene diamine (TEDA), bis(2-dimethylaminoethyl)ether (BDMAE), N-ethylmorpholine, N',N'-dimethylpiperazine, N,N,N',N',N'-pentamethyl-diethylene-triamine (PMDETA), N,N-dimethylcyclohexylamine (DMCHA), N,N-dimethylbenzylamine (DMBA), N,N-dimethylethylamine, N,N,N'N',N''-pentamethyl-dipropylene-triamine (PMDPTA), triethylamine, 1-(2-hydroxypropyl)imidazole, 1,4-diazabicyclo[2.2.2]octane (DABCO) and 2,4,6-tris(dimethylaminomethyl)phenol, as contained in the accelerant composition DMP-30®, available from Sigma-Aldrich, dimethylethanolamine (DMEA), bis-(2-dimethylaminoethyl)ether, N-ethylmorpholine, triethylamine, 1,8-diazabicyclo[5.4.0]undecene-7 (DBU), benzyldimethylamine (BDMA), N,N,N'-trimethyl-N'-hydroxyethyl-bis(aminoethyl)ether, N'-(3-(dimethylamino)propyl)-N,N-dimethyl-1,3-propanediamine, or a combination of any of the foregoing.

Other catalysts suitable for a particular curing chemistry can be used.

Compositions and sealants provided by the present disclosure can comprise from 0.1 wt % to 1 wt %, from 0.2 wt % to 0.9 wt %, from 0.3 wt % to 0.7 wt %, or from 0.4 wt % to 0.6 wt % of an amine catalyst or combination of amine catalysts, where wt % is based on the total weight of the composition.

Compositions provided by the present disclosure can comprise a plasticizer or combination of plasticizers.

Examples of suitable plasticizers include Jayflex™ DINP, Jayflex™ DIDP, Jayflex™ DIUP, and Jayflex™ DTDP available from Exxon Mobil. Fairad® plasticizer is available from PPG Aerospace. A plasticizer can be an α-methyl styrene homopolymer having a room temperature (23° C.) viscosity from 120 poise to 250 poise. α-Methyl styrene plasticizers are available from PPG Aerospace. Other examples of suitable plasticizers include combinations of hydrogenated terphenyls, terphenyls, and partially hydrogenated quarterphenyls and higher polyphenyls such as HB-40 available from Eastman Chemical Co.

Compositions provided by the present disclosure can comprise from 0 wt % to 4 wt %, 0.01 wt % to 3.5 wt % of a plasticizer, from 0.05 wt % to 3 wt %, from 0.1 wt % to 2.5 wt % or from 1 wt % to 3 wt % of a plasticizer, where wt % is based on the total weight of the composition. Certain compositions do not contain any plasticizer. Such composition may contain a low viscosity, e.g., a viscosity less than 20 cP at 25° C. determined according to ASTM D445, hydroxyl-functional polyepoxide such as, for example, Epon® 1001-B-80.

Certain compositions provided by the present disclosure do not include a plasticizer.

Compositions provided by the present disclosure can comprise a sulfur-containing prepolymer in addition to a chain-extended sulfur-containing prepolymer provided by the present disclosure including prepolymer.

An additional sulfur-containing prepolymer can comprise a second polythioether prepolymer, a polysulfide prepolymer, a sulfur-containing polyformal prepolymer, a monosulfide prepolymer, or a combination of any of the foregoing.

A non-chain extended sulfur-containing prepolymer can comprise a thiol-terminated polythioether prepolymer or combinations of thiol-terminated polythioether prepolymers. Examples of suitable thiol-terminated polythioether prepolymers are disclosed, for example, in U.S. Pat. No. 6,172,179, which is incorporated by reference in its entirety. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (3)-(3c). Thiol-terminated polythioethers include prepolymers described in U.S. Pat. No. 7,390,859 and urethane-containing polythiols described in U.S. Application Publication Nos. 2017/0369757 and 2016/0090507.

A non-chain extended sulfur-containing prepolymer can comprise a polythioether prepolymer having a moiety of Formula (5):

$$—S—R^1—[S-A-S—R^1—]_n—S—$$ (5)

where, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, where, p is an integer from 2 to 6;
q is an integer from 1 to 5;
r is an integer from 2 to 10;

each $R^3$ is independently selected from hydrogen and methyl; and each X is independently selected from O, S, S—S, and NR, wherein R is selected from hydrogen and methyl; and each A is independently a moiety derived from a polyvinyl ether of Formula (6) and a polyalkenyl polyfunctionalizing agent of Formula (7):

$$CH_2=CH—O—(R^2—O)_m—CH=CH_2$$ (6)

$$B(—R^{10}—CH=CH_2)_z$$ (8)

wherein, m is an integer from 0 to 50;

each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;

B represents a core of a z-valent, polyalkenyl polyfunctionalizing agent $B(—R^{70}—CH=CH_2)_z$ wherein, z is an integer from 3 to 6; and each $R^{10}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In polythioether prepolymers of Formula (5), each A can independently be selected from a moiety of Formula (6a) and a moiety of Formula (7a):

$$—(CH_2)_2—O—(R^2—O)_m—(CH_2)_2—$$ (6a)

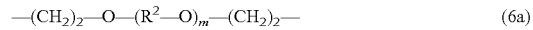
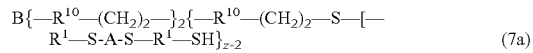

where m, $R^1$, $R^2$, $R^{10}$, A, and z are defined as in Formula (9) and Formula (10).

A sulfur-containing prepolymer can comprise a thiol-terminated sulfur-containing prepolymer.

A thiol-terminated sulfur-containing prepolymer can comprise a thiol-terminated polysulfide prepolymer or a combination of thiol-terminated polysulfide prepolymers.

A polysulfide prepolymer refers to a prepolymer that contains one or more polysulfide linkages, i.e., $—S_x—$ linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include liquid polysulfide prepolymers that are blends of di- and tri-functional molecules where the difunctional polysulfide prepolymers have the structure of Formula (9a) and/or thiol-terminated prepolymers comprising a moiety of Formula (9):

$$—(—R—S—S—)_n—R—$$ (9)

$$HS—(—R—S—S—)_n—R—SH$$ (9a)

and the trifunctional polysulfide polymers can have the structure of Formula (10a) and/or athiol-terminated prepolymer can comprise a moiety of Formula (10):

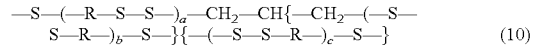

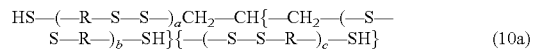

where each R is $—(CH_2)_2—O—CH_2—O—(CH_2)_2—$, and n=a+b+c, where the value for n may be from 7 to 38 depending on the amount of the trifunctional cross-linking agent (1,2,3,-trichloropropane; TCP) used during synthesis of the polysulfide prepolymer. Thioplast™ G polysulfides can have a number average molecular weight from less than 1,000 Da to 6,500 Da, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Da to 7,500 Da, a —SH content from 0.8% to 7.7%, and a cross-linking density from 0% to 2%. Thiokol™ LP polysulfide prepolymers have the general structure of Formula (11a) and/or a thiol-terminated prepolymer can comprise a moiety of Formula (11):

$$-S-[(CH_2)_2-O-CH_2-O-(CH_2)_2-S-S-]_n-(CH_2)_2-S- \quad (11)$$

$$HS-[(CH_2)_2-O-CH_2-O-(CH_2)_2-S-S-]_n-(CH_2)_2-O-CH_2-O-(CH_2)_2-SH \quad (11a)$$

where n can be such that the number average molecular weight from 1,000 Da to 7,500 Da, such as, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (12a) and/or a thiol-terminated prepolymer can comprise a moiety of Formula (12):

$$-R-(S_y-R)_t- \quad (12)$$

$$HS-R-(S_y-R)_t-SH \quad (12a)$$

where,
t can be an integer from 1 to 60;
q can be an integer from 1 to 8;
p can be an integer from 1 to 10;
r can be an integer from 1 to 10;
y has an average value within a range from 1.0 to 1.5; and
each R can independently be selected from branched alkanediyl, branched arenediyl, and a moiety having the structure $-(CH_2)_p-O-(CH_2)_q-O-(CH_2)_r-$.

Examples of thiol-terminated polysulfide prepolymers of Formula (12) and (12a) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (13a) and/or a thiol-terminated prepolymer can comprise a moiety of Formula (13):

$$-(R-O-CH_2-O-R-S_m-)_{n-1}-R-O-CH_2-O-R- \quad (13)$$

$$HS-(R-O-CH_2-O-R-S_m-)_{n-1}-R-O-CH_2-O-R-SH \quad (13a)$$

where R is $C_{2-4}$ alkanediyl, m is an integer from 1 to 8, and n is an integer from 2 to 370.

A thiol-terminated sulfur-containing prepolymer can comprise a thiol-terminated sulfur-containing polyformal prepolymer or a combination of thiol-terminated sulfur-containing polyformal prepolymers. Sulfur-containing polyformal prepolymers useful in sealant applications are disclosed, for example, in U.S. Pat. No. 8,729,216 and in U.S. Pat. No. 8,541,513, each of which is incorporated by reference in its entirety.

A thiol-terminated sulfur-containing prepolymer can comprise a thiol-terminated monosulfide prepolymer or a combination of thiol-terminated monosulfide prepolymers.

A thiol-terminated monosulfide prepolymer can comprise a thiol-terminated monosulfide prepolymer comprising a moiety of Formula (17):

$$-S-R^2-[-S-(R-X)_p-(R^1-X)_q-R^1-]_n-S- \quad (17)$$

wherein,
each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O or S;
p can be an integer from 1 to 5;
q can be an integer from 0 to 5; and
n can be an integer from 1 to 60, such as from 2 to 60, from 3 to 60, or from 25 to 35.

A thiol-terminated monosulfide prepolymer can comprise a thiol-terminated monosulfide prepolymer of Formula (17a), a thiol-terminated monosulfide prepolymer of Formula (17b), a thiol-terminated monosulfide prepolymer of Formula (17c), or a combination of any of the foregoing:

$$HS-R^2-[-S-(R-X)_p-(R-X)_q-R^2-]_n-SH \quad (17a)$$

$$\{HS-R^2-[-S-(R-X)_p-(R^1-X)_q-R^2-]_nS-V'-\}_zB \quad (17b)$$

$$\{R^4-S-R^2-[-S-(R-X)_p-(R^1-X)_q-R^2-]_n-S-V'-\}_zB \quad (17c)$$

wherein,
each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O and S;
p can be an integer from 1 to 5;
q can be an integer from 0 to 5; and
n can be an integer from 1 to 60, such as from 2 to 60, from 3 to 60, or from 25 to 35 and B represents a core of a z-valent polyfunctionalizing agent B(—V)$_z$ wherein:
z can be an integer from 3 to 6; and
each V can be a moiety comprising a terminal group reactive with a thiol group;
each —V'— can be derived from the reaction of —V with a thiol; and
each R$^4$ can independently be selected from hydrogen and a bond to a polyfunctionalizing agent B(—V)$_z$ through a moiety of Formula (17).

A thiol-terminated monosulfide prepolymer can comprise a thiol-terminated monosulfide prepolymer comprising a moiety of Formula (18a) and/or a thiol-terminated prepolymer can comprise a moiety of Formula (18):

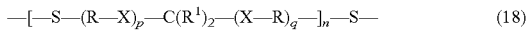

$$—[—S—(R—X)_p—C(R^1)_2—(X—R)_q—]_n—S—$$ (18)

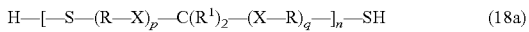

$$H—[—S—(R—X)_p—C(R^1)_2—(X—R)_q—]_n—SH$$ (18a)

wherein,
each R can independently be selected from C$_{2-10}$ alkanediyl, such as C$_{2-6}$ alkanediyl; a C$_{3-10}$ branched alkanediyl, such as a C$_{3-6}$ branched alkanediyl or a C$_{3-6}$ branched alkanediyl having one or more pendant groups which can be, for example, alkyl groups, such as methyl or ethyl groups; a C$_{6-8}$ cycloalkanediyl; a C$_{6-14}$ alkylcycloalkyanediyl, such as a C$_{6-10}$ alkylcycloalkanediyl; and a C$_{8-10}$ alkylarenediyl;
each R$^1$ can independently be selected from hydrogen, C$_{1-10}$ n-alkyl, such as a C$_{1-6}$ n-alkyl, C$_{3-10}$ branched alkyl, such as a C$_{3-6}$ branched alkyl having one or more pendant groups which can be, for example, alkyl groups, such as methyl or ethyl groups; a C$_{6-8}$ cycloalkyl group; a C$_{6-14}$ alkylcycloalkyl, such as a C$_{6-10}$ alkylcycloalkyl; and a C$_{8-10}$ alkylaryl;
each X can independently be selected from O and S;
p can be an integer from 1 to 5;
q can be an integer from 1 to 5; and
n can be an integer from 1 to 60, such as from 2 to 60, from 3 to 60, or from 25 to 35.

Compositions provided by the present disclosure may comprise one or more additional components suitable for use in aerospace sealants and the selection can depend at least in part on the desired performance characteristics of the cured sealant under conditions of use. Compositions such as sealants provided by the present disclosure may further comprise one or more additives such as a plasticizer, a reactive diluent, a pigment, a solvent, or a combination of any of the foregoing.

Other than sulfur-containing prepolymers, organic filler, inorganic filler, curing agent, adhesion promoters, plasticizer, and catalyst, compositions and sealants provided by the present disclosure may not include any additional materials, or any additional materials are independently present in an amount, for example, less than 5 wt %, less than 4 wt %, less than 3 wt %, less than 2 wt %, or less than 1 wt %, where wt % is based on the total weight of the composition or sealant. The additional materials can include, for example, colorants, pigments, rheological control agents, fire retardants, reactive diluents, photochromic agents useful for monitoring the extent of cure, stabilizer, and combinations of any of the foregoing.

Compositions provided by the present disclosure can be prepared by first combining and thoroughly mixing a filler or combination of filler with a chain-extended sulfur-containing prepolymer. The mixed filler and chain-extended sulfur-containing prepolymer can then be combined and thoroughly mixed with one or more additional prepolymers, additional filler, and/or other additives.

Sealant compositions provided by the present disclosure can comprise a chain-extended sulfur-containing prepolymer such as a thiol-terminated chain-extended sulfur-containing prepolymer provided by the present disclosure and a curing agent. In addition, sealant compositions can comprise filler, adhesion promoters, reactive diluents, solvents, rheology modifiers, catalysts and other additives such as pigment.

Compositions provided by the present disclosure can comprise, for example, from 35 wt % to 75 wt % of a thiol-terminated chain-extended sulfur-containing prepolymer or a combination of thiol-terminated chain-extended sulfur-containing prepolymers, from 40 wt % to 70 wt %, from 45 wt % to 65 wt %, or from 50 wt % to 60 wt %, where wt % is based on the total weight of the composition.

Compositions provided by the present disclosure can comprise, for example, from 3 wt % to 13 wt % of a curing agent such as a polyepoxide or combination of curing agents such as a combination of polyepoxides, from 4 wt % to 12 wt %, from 5 wt % to 11 wt %, from 6 wt % to 10 wt % or from 7 wt % to 9 wt %, where wt % is based on the total weight of the composition. A curing agent, such as a polyepoxide curing agent can include a combination of difunctional polyepoxides, trifunctional polyepoxides, small molecule polyepoxides, and epoxy-terminated prepolymers.

Compositions provided by the present disclosure can comprise, for example, from 5 wt % to 75 wt % of a filler or combination of filler, from 10 wt % to 70 wt %, from 15 wt % to 65 wt %, from 20 wt % to 60 wt %, from 25 wt % to 55 wt %, from 30 wt % to 50 wt %, or from 35 wt % to 45 wt %, where wt % is based on the total weight of the composition. A filler can include a combination of organic and inorganic filler.

Compositions provided by the present disclosure can comprise, for example, from 0.1 wt % to 3 wt % of an adhesion promoter or combination of adhesion promoters, from 0.2 wt % to 2.7 wt %, from 0.5 wt % to 2.5 wt %, or from 1 wt % to 2 wt %, where wt % is based on the total weight of the composition. An adhesion promoter can comprise a combination of baked phenolic resins, amino-functional alkoxysilane, and phenolic resin adhesion promoters.

Compositions provided by the present disclosure can comprise, for example, from 35 wt % to 75 wt % of a thiol-terminated chain-extended sulfur-containing prepolymer or a combination of thiol-terminated chain-extended sulfur-containing prepolymers, from 3 wt % to 13 wt % of a polyepoxide or combination of polyepoxides, and from 5 wt % to 75 wt % of a filler or combination of filler, where wt % is based on the total weight of the composition.

Compositions provided by the present disclosure can comprise, for example, from 40 wt % to 70 wt % of a thiol-terminated chain-extended sulfur-containing prepolymer or a combination of thiol-terminated chain-extended sulfur-containing prepolymers from 4 wt % to 12 wt % of a curing agent such as a polyepoxide or combination of curing agents such as a combination of polyepoxides, and from 10 wt % to 70 wt % of a filler or combination of filler, where wt % is based on the total weight of the composition.

Compositions provided by the present disclosure can comprise, for example, from 45 wt % to 65 wt % of a thiol-terminated chain-extended sulfur-containing prepolymer or a combination of thiol-terminated chain-extended sulfur-containing prepolymers, from 5 wt % to 11 wt % of a curing agent such as a polyepoxide or combination of curing agents such as a combination of polyepoxides, and from 15 wt % to 65 wt % of a filler or combination of filler, where wt % is based on the total weight of the composition.

Compositions provided by the present disclosure can comprise, for example, from 50 wt % to 60 wt % of a thiol-terminated chain-extended sulfur-containing prepolymer or a combination of thiol-terminated chain-extended sulfur-containing prepolymers, from 6 wt % to 10 wt % of a curing agent such as a polyepoxide or combination of curing agents such as a combination of polyepoxides, and from 20 wt % to 60 wt % of a filler or combination of filler, where wt % is based on the total weight of the composition.

Compositions provided by the present disclosure can comprise from 35 wt % to 75 wt % of a chain-extended sulfur-containing prepolymer, from 40 wt % to 70 wt %, from 45 wt % to 65 wt %, or from 50 wt % to 60 wt % of a chain-extended sulfur-containing prepolymer, where wt % is based on the total weight of the composition. Compositions provided by the present disclosure can comprise greater than 35 wt % of a chain-extended sulfur-containing prepolymer, greater than 45 wt %, greater than 55 wt %, or greater than 65 wt % of a chain-extended sulfur-containing prepolymer, such as a chain-extended polythioether prepolymer, where wt % is based on the total weight of the composition.

Compositions provided by the present disclosure can comprise from 15 wt % to 55 wt % of a filler, from 20 wt % to 50 wt %, from 25 wt % to 45 wt %, or from 30 wt % to 40 wt % of a filler, where wt % is based on the total weight of the composition. Compositions provided by the present disclosure can comprise greater than 15 wt % of a filler, greater than 25 wt %, greater than 35 wt %, or greater than 45 wt % of a filler, where wt % is based on the total weight of the composition.

Compositions provided by the present disclosure can comprise from 5 wt % to 45 wt % of an organic filler, from 10 wt % to 40 wt %, from 15 wt % to 35 wt %, or from 20 wt % to 30 wt % of an organic filler, where wt % is based on the total weight of the composition. Compositions provided by the present disclosure can comprise greater than 5 wt % of an organic filler, greater than 15 wt %, greater than 25 wt %, or greater than 35 wt % of an organic filler, where wt % is based on the total weight of the composition.

Compositions provided by the present disclosure can comprise from 1 wt % to 30 wt % of an inorganic filler, from 5 wt % to 25 wt %, or from 10 wt % to 20 wt % of an inorganic filler, where wt % is based on the total weight of the composition. Compositions provided by the present disclosure can comprise greater than 1 wt % of an inorganic filler, greater than 5 wt %, greater than 10 wt %, greater than 15 wt %, greater than 20 wt %, or greater than 25 wt % of an inorganic filler, where wt % is based on the total weight of the composition.

Compositions provided by the present disclosure can comprises from 0.5 wt % to 4 wt % of an adhesion promoter, from 1 wt % to 3.5 wt %, from 1 wt % to 3 wt %, or from 1 wt % to 2 wt % of an adhesion promoter, where wt % is based on the total weight of the composition. Compositions provided by the present disclosure can comprise greater than 0.1 wt % of an adhesion promoter, greater than 0.5 wt %, greater than 1 wt %, greater than 1.5 wt %, greater than 2 wt %, or greater than 3 wt % of an adhesion promoter, where wt % is based on the total weight of the composition.

Compositions provided by the present disclosure can comprise from 2 wt % to 14 wt % of a polyepoxide, from 4 wt % to 12 wt %, or from 6 wt % to 10 wt % of a polyepoxide, where wt % is based on the total weight of the composition. Compositions provided by the present disclosure can comprise greater than 2 wt %, greater than 4 wt %, greater than 6 wt %, greater than 8 wt %, greater than 10 wt %, or greater than 12 wt % of a polyepoxide, where wt % is based on the total weight of the composition.

Compositions provided by the present disclosure can comprise from 35 wt % to 75 wt % of a chain-extended sulfur-containing prepolymer, from 15 wt % to 55 wt % of a filler, from 0.5 wt % to 4 wt % of an adhesion promoter, and from 2 wt % to 14 wt % of a polyepoxide, where wt % is based on the total weight of the composition.

Compositions provided by the present disclosure can comprise from 35 wt % to 75 wt % of a chain-extended sulfur-containing prepolymer, from 5 wt % to 45 wt % of an organic filler, from 1 wt % to 30 wt % of an inorganic filler, from 0.5 wt % to 4 wt % of an adhesion promoter, and from 2 wt % to 14 wt % of a polyepoxide, where wt % is based on the total weight of the composition.

Compositions provided by the present disclosure can comprise from 50 wt % to 60 wt % of a chain-extended sulfur-containing prepolymer, from 30 wt % to 40 wt % of a filler, from 1 wt % to 2 wt % of an adhesion promoter, and from 2 wt % to 14 wt % of a polyepoxide, where wt % is based on the total weight of the composition.

Compositions provided by the present disclosure can comprise from 50 wt % to 60 wt % of a chain-extended sulfur-containing prepolymer, from 20 wt % to 30 wt % of an organic filler, from 10 wt % to 20 wt % of an inorganic filler, from 1 wt % to 2 wt % of an adhesion promoter, and from 2 wt % to 14 wt % of a polyepoxide, where wt % is based on the total weight of the composition.

Uncured compositions provided by the present disclosure can be provided as a two-part system comprising a first part and a second part which can be prepared and stored separately, and combined, and mixed at the time of use.

Curable systems of the present disclosure can be provided as two-part sealant compositions. The two-parts can be maintained separately and can be combined prior to use. A first part can comprise, for example, thiol-terminated chain-extended sulfur-containing prepolymers, organic filler, inorganic filler, adhesion promoter, catalyst, and other optional additives. A second part can comprise, for example, a polyepoxide curing agent, inorganic filler, adhesion promoter, plasticizer, and other optional additives. The optional additives can include plasticizers, pigments, solvents, reactive diluents, surfactants, thixotropic agents, fire retardants, and a combination of any of the foregoing.

Compositions, such as sealants, may be provided as multi-part compositions, such as two-part compositions, wherein one part comprises one or more thiol-terminated chain-extended sulfur-containing prepolymers and a second part comprises one or more curing agents such as one or more polyepoxide curing agents. Additives and/or other materials may be added to either part as desired or necessary. The two parts may be combined and mixed prior to use.

The first part and the second part can be formulated to be rendered compatible when combined such that the constituents of the base and accelerator components can intermix and be homogeneously dispersed to provide a sealant or coating composition for application to a substrate. Factors affecting the compatibility of the first and second parts include, for example, viscosity, pH, density, and temperature.

A first part can comprise, for example, from 40 wt % to 80 wt % of a thiol-terminated chain-extended sulfur-containing prepolymer, from 50 wt % to 70 wt %, or from 55 wt % to 65 wt %, of a thiol-terminated chain-extended sulfur-containing prepolymer, where wt % is based on the total weight of the first part.

A first part can comprise from 10 wt % to 40 wt % of an organic filler, from 15 wt % to 35 wt %, from 20 wt % to 30 wt %, or from 22 wt % to 28 wt %, of an organic filler, where wt % is based on the total weight of the first part.

A first part can comprise from 5 wt % to 20 wt % of an inorganic filler, from 7 wt % to 18 wt %, or from 9 wt % to 16 wt % of an inorganic filler, where wt % is based on the total weight of the first part.

A first part can comprise, for example, from 40 wt % to 80 wt % of a thiol-terminated chain-extended sulfur-containing prepolymer, from 10 wt % to 40 wt % of an organic filler, and from 5 wt % to 20 wt % of an inorganic filler, where wt % is based on the total weight of the first part.

A first part can comprise, for example, from 50 wt % to 70 wt % of a thiol-terminated chain-extended sulfur-containing prepolymer, from 15 wt % to 35 wt % of an organic filler, and from 7 wt % to 18 wt % of an inorganic filler, where wt % is based on the total weight of the first part.

A first part can comprise, for example, from 55 wt % to 65 wt %, of a thiol-terminated chain-extended sulfur-containing prepolymer, from 20 wt % to 30 wt % of an organic filler, and from 9 wt % to 16 wt % of an inorganic filler, where wt % is based on the total weight of the first part.

A second part can comprise, for example, from 30 wt % to 80 wt % of a curing agent such as a polyepoxide, from 35 wt % to 80 wt %, or from 40 wt % to 80 wt %, where wt % is based on the total weight of the second part.

A second part can comprise, for example, from 5 wt % to 50 wt % of an inorganic filler, from 10 wt % to 50 wt %, or from 10 wt % to 45 wt % of an inorganic filler, where wt % is based on the total weight of the second part.

A second part can comprise, for example, from 1 wt % to 20 wt % of a plasticizer, from 5 wt % to 15 wt %, or from 7 wt % to 13 wt % of a plasticizer, where wt % is based on the total weight of the second part A second part can comprise, for example, from 30 wt % to 80 wt % of a curing agent such as a polyepoxide, and from 5 wt % to 50 wt % of an inorganic filler, where wt % is based on the total weight of the second part.

A second part can comprise, for example, from 35 wt % to 80 wt % of a curing agent such as a polyepoxide, and from 10 wt % to 50 wt % of an inorganic filler, where wt % is based on the total weight of the second part.

A second part can comprise, for example, from 40 wt % to 80 wt % of a curing agent such as a polyepoxide, and from 15 wt % to 45 wt % of an inorganic filler, where wt % is based on the total weight of the second part.

The first part and second part can be combined in a wt % ratio within a range, for example, from 100:10 to 100:25, within a range from 100:12 to 100:23, or within a range from 100:14 to 100:21.

Cured sealant compositions provided by the present disclosure meet certain hardness, water adsorption, swell, peel strength, and lap shear, following immersion in Skydrol® LD-4 at temperatures from 23° C. to 70° C. for times from 500 hours to 10 hours, depending on the exposure temperature.

It is desirable that properties such as hardness, water adsorption, swell during Skydrol® immersion, peel strength, and lap shear strength do not continuously change with time.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquids and gases. A coating can comprise a covering that is applied to the surface of a substrate to, for example, improve the properties of the substrate such as the appearance, adhesion, wettability, corrosion resistance, wear resistance, fuel resistance, and/or abrasion resistance. A sealant can be used to seal surfaces, smooth surfaces, fill gaps, seal joints, seal apertures, seal fasteners, and other parts and features. A potting composition can comprise a material useful in an electronic assembly to provide resistance to shock and vibration and to exclude moisture and corrosive agents. Sealant compositions provided by the present disclosure are useful, e.g., to seal parts on aerospace vehicles that can come into contact with phosphate ester hydraulic fluids such as Skydrol®.

Compositions and sealants provided by the present disclosure can be used with any suitable curing chemistry useful in aerospace coating and sealants. Compositions provided by the present disclosure include thiol-terminated chain-extended sulfur-containing prepolymers cured, for example, with polyepoxides. These compositions comprise a high content of Skydrol®- and fuel-resistant organic filler in combination with inorganic filler. The incorporation of Skydrol®- and fuel-resistant organic filler into an aerospace coating or sealant is expected to impart improved Skydrol®- and fuel-resistance to the cured coating or sealant, regardless of the curing chemistry. For example, Skydrol®- and fuel-resistant organic filler can be used with Mn-cured polysulfides, and Michael acceptor cured thiol-terminated sulfur-containing prepolymers, and moisture-curable sulfur-containing prepolymers. Sulfur-containing prepolymers can be terminal-modified to include other reactive groups such as, for example, amine groups, hydroxyl groups, isocyanate groups, or polyalkoxysilyl groups. These terminal-modified sulfur-containing prepolymers can be used with polyurea, polyurethane, or moisture-curable chemistries in combination with Skydrol®- and fuel-resistant organic filler to provide Skydrol®- and fuel-resistant coatings and sealants.

Curable compositions provided by the present disclosure can be used as aerospace sealants or coatings, and in particular, as sealants or coatings where resistance to hydraulic fluid is desired. A sealant refers to a curable composition that has the ability when cured to resist atmospheric conditions such as moisture and temperature and at least partially block the transmission of materials such as water, water vapor, fuel, solvents, chemicals, and/or liquids and gases.

Compositions provided by the present disclosure may be applied directly onto the surface of a substrate or over an underlayer such as a primer by any suitable coating process. Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Furthermore, methods are provided for sealing an aperture utilizing a composition provided by the present disclosure. These methods comprise, for example, applying the curable composition to at least one surface of a part; and curing the applied composition to provide a sealed part. Sealant compositions provided by the present disclosure may be formulated as Class A, Class B, or Class C sealants. A Class A sealant refers to a brushable sealant having a viscosity of 1 poise to 500 poise (0.1 Pa-sec to 50 Pa-sec and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used to form fillets and sealing on vertical surfaces or edges where low slump/slag is required. A Class C sealant has a viscosity from 500 poise to 4,500 poise (50 pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

Furthermore, methods are provided for sealing an aperture utilizing a composition provided by the present disclosure. These methods comprise, for example, providing the curable composition of the present disclosure; applying the curable composition to at least one surface of a part; and curing the applied composition to provide a sealed part.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 23° C. The methods may be used to seal apertures on aerospace vehicles including aircraft and aerospace vehicles.

Apertures, surfaces, joints, fillets, fay surfaces including apertures, surfaces, fillets, joints, and fay surfaces of aerospace vehicles, sealed with compositions provided by the present disclosure are also disclosed. The compositions and sealants can also be used to seat fasteners.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed within 7 days following mixing and application of a curable composition to a surface.

A cured composition can have a thickness, for example, from 5 mils to 25 mils (127 m to 635 m) such as from 10 mils to 20 mils (254 m to 508 m).

Prior to environmental exposure a cured sealant provided by the present disclosure exhibits a density less than 1.2 g/cm$^3$ (specific gravity less than 1.2) as determined according to ISO 2781, a tensile strength greater than 1 MPa determined according to ISO 37, a tensile elongation greater than 150% determined according to ISO 37, and a hardness greater than 40 Shore A determined according to ISO 868, where the tests are performed at a temperature of 23° C., and a humidity of 55% RH.

Following exposure to aviation fuel (JRF Type 1) according to ISO 1817 for 168 hours at 60° C., a cured sealant provided by the present disclosure exhibits a tensile strength greater than 1.4 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH.

Following exposure to 3% aqueous NaCl for 168 hours at 60° C., a cured sealant provided by the present disclosure exhibits a tensile strength greater than 1.4 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH.

Following exposure to de-icing fluid according to ISO 11075 Type 1 for 168 hours at 60° C., a cured sealant provided by the present disclosure exhibits a tensile strength greater than 1 MPa determined according to ISO 37, and a tensile elongation greater than 150% determined according to ISO 37, where the tests are performed at a temperature of 23° C., and a humidity of 55% RH.

Following exposure to phosphate ester hydraulic fluid (Skydrol® LD-4) for 1,000 hours at 70° C., a cured sealant provided by the present disclosure exhibits a tensile strength greater than 1 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH.

Apertures, surfaces, joints, fillets, fay surfaces including apertures, surfaces, fillets, joints, and fay surfaces of aerospace vehicles, sealed with compositions provided by the present disclosure are also disclosed. A composition provided by the present disclosure can be used to seal a part. A part can include multiple surfaces and joints. A part can include a portion of a larger part, assembly, or apparatus. A portion of a part can be sealed with a composition provided by the present disclosure or the entire part can be sealed.

Compositions provided by the present disclosure can be used to seal parts exposed or potentially exposed to fluids such as chemicals, hydraulic fluids, and/or fuel.

Compositions provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets, and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F (produced by McDonnell Douglas/Boeing and Northrop); in the Boeing 787 Dreamliner, 737, 747, 717 passenger jet aircraft, an related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35

Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Compositions provided by the present disclosure can be used to seal parts and surfaces of vehicles such as fuel tank surfaces and other surfaces exposed to or potentially exposed to aerospace chemicals, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

Compositions provided by the present disclosure can comprise a thiol-terminated chain-extended sulfur-containing prepolymer, an organic filler, an inorganic filler, a curing agent such as a polyepoxide curing agent, and optionally an adhesion promoter. A composition can be formulated as a sealant, such as an aerospace sealant, and in particular a Skydrol® resistant and fuel resistant aerospace sealant.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and depend at least in part on the desired performance characteristics of the cured sealant under conditions of use.

Compositions provided by the present disclosure can comprise, for example, from 35 wt % to 65 wt % of a thiol-terminated chain-extended sulfur-containing prepolymer; from 10 wt % to 35 wt % of an organic filler; from 5 wt % to 25 wt % of an inorganic filler; and from 3 wt % to 20 wt % of a polyepoxide, where wt % is based on the total weight of the composition. Compositions can also comprise a from 0.5 wt % to 4 wt % of an adhesion promoter, where wt % is based on the total weight of the composition.

Compositions provided by the present disclosure can comprise, for example, from 35 wt % to 65 wt % of a thiol-terminated chain-extended sulfur-containing prepolymer; from 15 wt % to 35 wt % of an organic filler; from 10 wt % to 30 wt % of an inorganic filler; and from 3 wt % to 16 wt % of a such as a polyepoxide, where wt % is based on the total weight of the composition. Compositions can also comprise a from 0.5 wt % to 4 wt % of an adhesion promoter, where wt % is based on the total weight of the composition.

Compositions provided by the present disclosure can comprise, for example, from 45 wt % to 55 wt % of a thiol-terminated chain-extended sulfur-containing prepolymer; from 15 wt % to 30 wt % of an organic filler; from 10 wt % to 25 wt % of an inorganic filler; and from 5 wt % to 14 wt % of a curing agent such as a polyepoxide, where wt % is based on the total weight of the composition. Compositions can also comprise from 1.0 wt % to 3.0 wt % of an adhesion promoter, where wt % is based on the total weight of the composition.

Compositions provided by the present disclosure can comprise, for example, from 40 wt % to 60 wt % of a thiol-terminated chain-extended sulfur-containing prepolymer; from 10 wt % to 30 wt % of an organic filler; from 5 wt % to 25 wt % of an inorganic filler; and from 5 wt % to 20 wt % of a curing agent such as a polyepoxide, where wt % is based on the total weight of the composition. Compositions can also comprise from 1 wt % to 4 wt % of an adhesion promoter, where wt % is based on the total weight of the composition.

Compositions provided by the present disclosure can comprise, for example, from 45 wt % to 60 wt % of a thiol-terminated chain-extended sulfur-containing prepolymer, from 10 wt % to 30 wt % of an organic filler, from 5 wt % to 25 wt % of an inorganic filler, from 1 wt % to 4 wt % of an adhesion promoter, from 4 wt % to 15 wt % of a curing agent such as a polyepoxide, and from 0 wt % to 4 wt % of a plasticizer, where wt % is based on the total weight of the composition.

Compositions and curable sealants provided by the present disclosure can have a density equal to or less than 1.0 $g/cm^3$, equal to or less than 1.2 $g/cm^3$, equal to or less than 1.4 $g/cm^3$, or equal to or less than 1.65 $g/cm^3$, where density is determined according to ISO 2781.

Uncured sealants provided by the present disclosure can be provided as a two-part system comprising a first part and a second part which can be prepared and stored separately, combined, and mixed at the time of use.

Apertures, surfaces, joints, fillets, fay surfaces including apertures, surfaces, fillets, joints, and fay surfaces of aerospace vehicles, sealed with compositions provided by the present disclosure are also disclosed. A composition provided by the present disclosure can be used to seal a part. A part can include multiple surfaces and joints. A part can include a portion of a larger part, assembly, or apparatus. A portion of a part can be sealed with a composition provided by the present disclosure or the entire part can be sealed.

Compositions provided by the present disclosure can be used to seal parts exposed or potentially exposed to fluids such as chemicals, hydraulic fluids, and/or fuel.

Compositions can be as coatings or sealants, and in particular sprayable coatings and sealants having a high filler content such as, for example, a filler content from 1 wt % to 90 wt % and/or a filler content from 1 vol % to 80 vol %. The coatings and sealants can be applied to any suitable surface including for example, surfaces of vehicles, architectural surfaces, consumer products, electronic products, marine equipment, and industrial equipment.

Aspects of the Invention

The invention is further defined by the following aspects.

Aspect 1. A composition, comprising: (a) a chain-extended sulfur-containing prepolymer, wherein: the chain-extended sulfur-containing prepolymer has a number average molecular weight from 2,000 Da to 15,000 Da; and the chain-extended sulfur-containing prepolymer comprises the reaction product of reactants comprising a sulfur-containing prepolymer and a chain-extender; (b) a curing agent; and (c) a filler.

Aspect 2. The composition of aspect 1, wherein the chain-extended sulfur-containing prepolymer comprises a chain-extended polythioether prepolymer, a chain-extended polysulfide prepolymer, a chain-extended sulfur-containing polyformal prepolymer, a chain-extended monosulfide prepolymer, or a combination of any of the foregoing.

Aspect 3. The composition of any one of aspects 1 to 2, wherein the chain-extended sulfur-containing prepolymer comprises two or more terminal functional groups, wherein each of the two or more functional groups independently comprises a thiol group, an epoxy group, an alkenyl group, a Michael acceptor group, a Michael donor group, a hydroxyl group, an amine group, an isocyanate group, or combinations of any of the foregoing.

Aspect 4. The composition of aspect 3, wherein each of the two or more functional groups are thiol groups.

Aspect 5. The composition of any one of aspects 1 to 4, wherein the chain-extended sulfur-containing prepolymer comprises a thiol-terminated chain-extended polythioether prepolymer.

Aspect 6. The composition of any one of aspects 1 to 5, wherein the chain-extended sulfur-containing prepolymer comprises a moiety having the structure of Formula (3):

$$D[-R^{4a}-S-E(-S-)_{w-1}]_t \qquad (3)$$

wherein,
w is an integer from 2 to 20;
t is an integer from 2 to 6;
each D is a core of a chain-extender $D(-R^4)_t$, where each R is independently a group reactive with a thiol group;
each $R^{4a}$ is derived from a reaction of a thiol-reactive group $R^4$ with a thiol group; and
each E is a core of sulfur-containing prepolymer $E(-SH)_w$.

Aspect 7. The composition of aspect 6, wherein each $R^4$ is independently selected from an alkenyl group, an alkyne group, an epoxy group, a Michael acceptor group, or an isocyanate group.

Aspect 8. The composition of aspect 6, wherein, each $R^{4a}$ is derived from the reaction of an epoxy group with a thiol group and has the structure $-CH_2-CH(-OH)-$; each $R^a$ is derived from the reaction of an alkenyl group with a thiol group and has the structure $-CH_2-CH_2-$; each $R^{4a}$ is derived from the reaction of a vinyl sulfone group with a thiol group and has the structure $-S(O)_2-CH_2-CH_2-$; each $R^{4a}$ is derived from the reaction of an alkynyl group with a thiol group and has the structure $-CH=CH-$; or each $R^{4a}$ is derived from the reaction of an isocyanate group with a thiol group and has the structure $-C(O)-N-$.

Aspect 9. The composition of any one of aspects 1 to 8, wherein the chain-extended sulfur-containing prepolymer has an average equivalent weight from 500 to 2,000.

Aspect 10. The composition of any one of aspects 1 to 9, wherein the chain-extended sulfur-containing prepolymer has an average reactive functionality from 2 to 6.

Aspect 11. The composition of any one of aspects 1 to 10, wherein the chain-extended sulfur-containing prepolymer comprises a first chain-extended sulfur-containing prepolymer and a second chain-extended sulfur-containing prepolymer.

Aspect 12. The composition of aspect 11, wherein the first chain-extended sulfur-containing prepolymer and the second chain-extended sulfur-containing prepolymer have different sulfur-containing backbones.

Aspect 13. The composition of any one of aspects 11 to 12, wherein the first chain-extended sulfur-containing prepolymer and the second chain-extended sulfur-containing prepolymer have different number average molecular weights.

Aspect 14. The composition of aspect 11, wherein the first chain-extended sulfur-containing prepolymer and the second chain-extended sulfur containing prepolymer have a different reactive functionality.

Aspect 15. The composition of any one of aspects 1 to 14, wherein the composition comprises: (a) from 35 wt % to 75 wt % of a chain-extended sulfur-containing prepolymer; (b) from 4 wt % to 12 wt % of the curing agent; and (c) from 15 wt % to 55 wt % of the filler, wherein wt % is based on the total weight of the composition.

Aspect 16. The composition of any one of aspects 1 to 15, wherein the chain-extended sulfur-containing prepolymer comprises a thiol-terminated sulfur-containing prepolymer having the structure of Formula (3a):

$$D[-R^{4a}-S-E(-SH)_{w-1}]_t \qquad (3a)$$

wherein,
w is an integer from 2 to 20;
t is an integer from 2 to 6;
each $R^{4a}$ is derived from the reaction of a thiol-reactive group $R^4$ with a thiol group;
each E is a core of a thiol-terminated sulfur-containing prepolymer $E(-SH)_w$; and
D is the core of the chain extender having the structure of Formula (4):

$$D\{-R^4\}_t \qquad (4)$$

each $R^4$ is independently a thiol-reactive group reactive.

Aspect 17. The composition of any one of aspects 1 to 16, wherein the sulfur-containing prepolymer comprises a polythioether prepolymer, a polysulfide prepolymer, a sulfur-containing polyformal prepolymer, a monosulfide prepolymer, or a combination of any of the foregoing.

Aspect 18. The composition of any one of aspects 1 to 17, wherein the sulfur-containing prepolymer has a number average molecular weight from 1,000 Da to 4,500 Da.

Aspect 19. The composition of any one of aspects 1 to 17, wherein the sulfur-containing prepolymer has a number average equivalents weight from 300 to 1,500.

Aspect 20. The composition of any one of aspects 1 to 19, wherein the sulfur-containing prepolymer has an average reactive functionality from 2 to 6.

Aspect 21. The composition of any one of aspects 1 to 20, wherein, the sulfur-containing prepolymer comprises two or more terminal functional groups; and each the two or more functional groups comprises thiol groups, epoxy groups, alkenyl groups, Michael acceptor groups, Michael donor groups, hydroxyl groups, amine groups, isocyanate groups, or combinations of any of the foregoing.

Aspect 22. The composition of any one of aspects 1 to 21, wherein the sulfur-containing prepolymer comprises a thiol-terminated sulfur-containing prepolymer.

Aspect 23. The composition of any one of aspects 1 to 22, wherein the thiol-terminated sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

Aspect 24. The composition of aspect 22 or aspect 23, wherein the thiol-terminated sulfur-containing prepolymer has the structure of Formula (2):

$$E(-SH)_w \qquad (2)$$

wherein,
w is an integer from 2 to 20; and
E is a core of the sulfur-containing prepolymer.

Aspect 25. The composition of any one of aspects 22 to 24, wherein the thiol-terminated sulfur-containing prepolymer comprises a thiol-terminated polythioether prepolymer.

Aspect 26. The composition of aspect 25, wherein the thiol-terminated polythioether prepolymer comprises a moiety having the structure of Formula (5):

$$—S—R^1—[S-A-S—R^1—]_n—S— \quad (5)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, where,
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (6) and a polyalkenyl polyfunctionalizing agent of Formula (7):

$$CH_2=CH—O—(R^2—O)_m—CH=CH_2 \quad (6)$$

$$B(—R^8—CH=CH_2)_z \quad (7)$$

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;
B represents a core of a z-valent, polyalkenyl polyfunctionalizing agent $B(—R^8—CH=CH_2)_z$ wherein,
z is an integer from 3 to 6; and
each $R^8$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 27. The composition of aspect 26, wherein each A is independently selected from a moiety of Formula (6a) and a moiety of Formula (7a):

$$—(CH_2)_2—O—(R^2—O)_m—(CH_2)_2— \quad (6a)$$

$$B\{—R^8—(CH_2)_2—\}_2\{—R^8—(CH_2)_2—S—[—R^1—S-A-S—]_{n1}—R^1—S—\}_{z-2} \quad (7a)$$

wherein m, z, n1, $R^1$, $R^2$, and $R^8$ are as defined for Formula (8), (9), and (10).

Aspect 28. The composition of any one of aspects 22 to 27, wherein the thiol-terminated sulfur-containing prepolymer comprises a thiol-terminated polysulfide prepolymer.

Aspect 29. The composition of aspect 28, wherein the thiol-terminated polysulfide prepolymer comprises a polysulfide prepolymer of Formula (9a), a polysulfide prepolymer of Formula (10a), or a combination thereof:

$$HS—(—R—S—S—)_n—R—SH \quad (9a)$$

$$HS—(—R—S—S—)_aCH_2—CH\{—CH_2—(—S—S—R—)_b—SH\}\{—(—S—S—R—)_c—SH\} \quad (10a)$$

wherein each R is $—(CH_2)_2—O—CH_2—O—(CH_2)_2—$, and n=a+b+c, where the value for n may be from 7 to 38.

Aspect 30. The composition of aspect 28, wherein the thiol-terminated polysulfide prepolymer comprises a polysulfide prepolymer of Formula (11a):

$$HS—[(CH_2)_2—O—CH_2—O—(CH_2)_2—S—S—]_n—(CH_2)_2—SH \quad (11a)$$

wherein n is an integer from 8 to 80.

Aspect 31. The composition of aspect 28, wherein the thiol-terminated polysulfide prepolymer comprises a polysulfide prepolymer of Formula (12a):

$$HS—R—(S_y—R)_t—SH \quad (12a)$$

wherein,
t is an integer from 1 to 60;
y has an average value within a range from 1.0 to 1.5; and
each R can independently be selected from branched alkanediyl, branched arenediyl, and a moiety having the structure $—(CH_2)_p—O—(CH_2)_q—O—(CH_2)_r—$.

Aspect 32. The composition of aspect 28, wherein the thiol-terminated polysulfide prepolymer comprises a polysulfide prepolymer of Formula (13a):

$$HS—(R—O—CH_2—O—R—S_m—)_{n-1}—R—O—CH_2—O—R—SH \quad (13a)$$

wherein,
R is $C_{2-4}$ alkanediyl;
m is an integer from 2 to 8; and
n is an integer from 2 to 370.

Aspect 33. The composition of any one of aspects 22 to 32, wherein the thiol-terminated sulfur-containing prepolymer comprises a thiol-terminated sulfur-containing polyformal prepolymer.

Aspect 34. The composition of aspect 33, wherein the thiol-terminated sulfur-containing polyformal prepolymer comprises a thiol-terminated sulfur-containing polyformal prepolymer of Formula (14a), thiol-terminated sulfur-containing polyformal prepolymer of Formula (14b), or a combination thereof:

$$R^3—O—R^1—(S)_p—R^1—[O—C(R^2)_2—O—R^1—(S)_p—R^1—]_n—O—R^3 \quad (14a)$$

$$\{R^3—O—R^1—(S)_p—R^1—[O—C(R^2)_2—O—R^1—(S)_p—R^1—]_n—O—C(R^2)_2—O-\}_mZ \quad (14b)$$

wherein,
n is an integer selected from 1 to 50;
m is an integer selected from 3 to 6;
each p is independently selected from 1 and 2;
each $R^1$ comprises $C_{2-6}$ alkanediyl;
each $R^2$ independently comprises hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, or substituted $C_{6-12}$ aryl;
each $R^3$ comprises a thiol-terminated group; and
Z represents the core of an m-valent parent polyol $Z(—OH)_m$.

Aspect 35. The composition of any one of aspects 22 to 34, wherein the thiol-terminated sulfur-containing prepolymer comprises a thiol-terminated monosulfide prepolymer.

Aspect 36. The composition of aspect 35, wherein the thiol-terminated monosulfide prepolymer comprises a monosulfide prepolymer of Formula (18a), a monosulfide prepolymer of Formula (18b), a monosulfide prepolymer of Formula (18c), or a combination of any of the foregoing:

$$HS—R^2—[—S—(R—X)_p—(R^1—X)_q—R^2—]_n—SH \quad (18a)$$

$$\{HS—R^2—[—S—(R—X)_p—(R^1—X)_q—R^2—]_n—S—R^{10a}-\}_zB \quad (18b)$$

$$\{R^4—S—R^2—[—S—(R—X)_p—(R^1—X)_q—R^2—]_n—S—R^{10a}-\}_zB \quad (18c)$$

wherein,
each R can independently be selected from $C_{2-10}$ alkanediyl, $C_{2-10}$ branched alkanediyl, and a $C_{3-6}$ branched alkanediyl having one or more pendant groups, $C_{6-8}$ cycloalkanediyl, $C_{6-14}$ alkylcycloalkyanediyl, and $C_{8-10}$ alkylarenediyl;
each $R^1$ can independently be selected from $C_{1-10}$ n-alkanediyl, $C_{2-10}$ branched alkanediyl, $C_{6-8}$ cycloalkanediyl, $C_{6-14}$ alkylcycloalkanediyl, and $C_{8-10}$ alkylarenediyl;
each $R^2$ can independently be selected from $C_{1-10}$ n-alkanediyl, $C_{2-10}$ branched alkanediyl, $C_{6-8}$ cycloalkanediyl group, $C_{6-14}$ alkylcycloalkanediyl, and $C_{8-10}$ alkylarenediyl;
each X can independently be selected from O and S;
p is an integer from 1 to 5;
q is an integer from 0 to 5; and
n is an integer from 1 to 60, such as from 2 to 60, from 3 to 60, or from 25 to 35 and
B represents a core of a z-valent polyfunctionalizing agent $B(-R^{10})_z$ wherein:
z is an integer from 3 to 6; and
each $R^{10}$ is a moiety comprising a terminal group reactive with a thiol group;
each $-R^{10a}-$ is derived from the reaction of $-R^{10}$ with a thiol; and
each $R^4$ is independently selected from hydrogen and a bond to a polyfunctionalizing agent $B(-R^{10})_z$ through a moiety of Formula (19):

$$-R^2-[-S-(R-X)_p-(R^1-X)_q-R^2-]_n- \qquad (19).$$

Aspect 37. The composition of aspect 35, wherein the thiol-terminated monosulfide prepolymer comprises a monosulfide prepolymer of Formula (19a), a monosulfide prepolymer of Formula (19b), a monosulfide prepolymer of Formula (19c), or a combination of any of the foregoing:

$$H-[-S-(R-X)_p-C(R^1)_2-(X-R)_q-]_n-SH \qquad (19a)$$

$$\{H-[-S-(RX)_pC(R^1)_2-(X-R)_q-]_nS-R^{10a}-\}_zB \qquad (19b)$$

$$\{R^4-[-S-(R-X)_p-C(R^1)_2-(X-R)_q-]_nS-R^{10a}-\}_zB \qquad (19c)$$

wherein,
each R can independently be selected from $C_{2-10}$ alkanediyl, a $C_{3-10}$ branched alkanediyl, a $C_{6-8}$ cycloalkanediyl, a $C_{6-14}$ alkylcycloalkyanediyl, and a $C_{8-10}$ alkylarenediyl;
each $R^1$ can independently be selected from hydrogen, $C_{1-10}$ n-alkanediyl, $C_{3-10}$ branched alkanediyl, a $C_{6-8}$ cycloalkanediyl group, a $C_{6-14}$ alkylcycloalkanediyl, and a $C_{8-10}$ alkylarenediyl;
each X can independently be selected from O and S;
p is an integer from 1 to 5;
q is an integer from 1 to 5;
n is an integer from 1 to 60, such as from 2 to 60, from 3 to 60, or from 25 to 35;
B represents a core of a z-valent polyfunctionalizing agent $B(-R^{10})_z$ wherein:
z is an integer from 3 to 6; and
each $R^{10}$ is a moiety comprising a terminal group reactive with a thiol group;
each $-R^{10a}-$ is derived from the reaction of $-R^{10}$ with a thiol; and
each $R^4$ is independently selected from hydrogen and a bond to a polyfunctionalizing agent $B(-R^{10})_z$ through a moiety of Formula (19):

$$-[-S-(R-X)_p-C(R^1)_2-(X-R)_q-]_n-S- \qquad (19)$$

Aspect 38. The composition of any one of aspects 22 to 37, wherein the thiol-terminated sulfur-containing prepolymer has an average thiol functionality from 2.1 to 6.

Aspect 39. The composition of any one of aspects 22 to 38, wherein the thiol-terminated sulfur-containing prepolymer has a number average molecular weight from 1,000 Daltons to 5,000 Daltons.

Aspect 40. The composition of any one of aspects 22 to 38, wherein the thiol-terminated sulfur-containing prepolymer has a thiol equivalent weight from 500 to 2,000.

Aspect 41. The composition of any one of aspects 1 to 40, wherein the chain extender has a reactive functionality from 2 to 6, wherein the reactive functionality is reactive with terminal reactive groups of the sulfur-containing prepolymer.

Aspect 42. The composition of any one of aspects 1 to 41, wherein the chain extender comprises a polyepoxide, a polyalkenyl, a polyalkynyl, a polyfunctional Michael acceptor, a polyisocyanate, or a combination of any of the foregoing.

Aspect 43. The composition of any one of aspects 1 to 42, wherein the chain extender comprises a polyepoxide.

Aspect 44. The composition of any one of aspects 1 to 43, wherein the chain-extender has a molecular weight from 100 Da to 1,000 Da.

Aspect 45. The composition of any one of aspects 1 to 44, wherein the chain extender comprises a chain extender having the structure of Formula (4):

$$D(-R^4)_t \qquad (4)$$

wherein,
t is an integer from 2 to 6;
each $R^4$ is independently a thiol-reactive group reactive; and
D is the core of the chain extender.

Aspect 46. The composition of aspect 45, wherein each $R^4$ is independently selected from a thiol group, an epoxy group, an alkenyl group, an alkynyl group, a Michael acceptor group, a hydroxyl group, an amine group, and an isocyanate group.

Aspect 47. The composition of any one of aspects 45 to 46, wherein each $R^4$ is independently selected from a group reactive with a thiol group.

Aspect 48. The composition of any one of aspects 45 to 47, wherein each $R^4$ is independently selected from an epoxy group, an alkenyl group, an alkynyl group, a Michael acceptor group, and an isocyanate group.

Aspect 49. The composition of aspect 45, wherein each $R^4$ is an epoxy group.

Aspect 50. The composition of aspect 45, wherein each $R^4$ is a vinylsulfonyl group.

Aspect 51. The composition of aspect 45, wherein the chain extender comprises a combination of chain extenders of Formula (3), wherein the combination has an average $R^4$ functionality from 2.1 to 5.9.

Aspect 52. The composition of any one of aspects 45 to 51, wherein D is selected from $C_{1-6}$ alkane-n-yl, $C_{5-6}$ cycloalkane-n-yl, $C_{6-20}$ alkanecycloalkane-n-yl, $C_6$ arene-n-yl, $C_{7-20}$ alkanearene-n-yl, $C_{1-6}$ heteroalkane-n-yl, $C_{5-6}$ heterocycloalkane-n-yl, $C_{6-20}$ heteroalkanecycloalkane-n-yl, $C_6$ heteroarene-n-yl, $C_{7-20}$ heteroalkanearene-n-yl, substituted $C_{1-6}$ alkane-n-yl, substituted $C_{5-6}$ cycloalkane-n-yl, substituted $C_{6-20}$ alkanecycloalkane-n-yl, substituted $C_6$ arene-n-yl, substituted $C_{7-20}$ alkanearene-n-yl, $C_{1-6}$ heteroalkane-n-yl, substituted $C_{5-6}$ heterocycloalkane-n-yl, substituted $C_{6-20}$ heteroalkanecycloalkane-n-yl, substituted $C_6$ heteroarene-n-yl, and substituted $C_{7-20}$ heteroalkanearene-n-yl, where n can be an integer from 2 to 6.

Aspect 53. The composition of any one of aspects 45 to 52, wherein the chain extender comprises a combination of chain extenders of Formula (4), wherein the combination has an average $R^4$ functionality from 2.1 to 2.9.

Aspect 54. The composition of any one of aspects 1 to 53, wherein the chain extender comprises a polyepoxide having an average epoxy functionality from 2.1 to 3.

Aspect 55. The composition of aspect 54, wherein the polyepoxide has the structure of Formula (21):

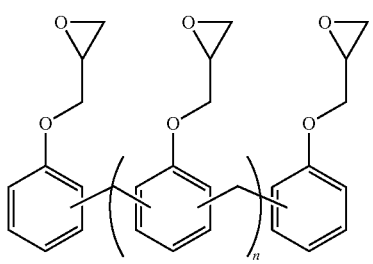

wherein n has an average value from 0.2 to 2.

Aspect 56. The composition of any one of aspects 1 to 55, wherein, the sulfur-containing prepolymer comprises a thiol-terminated polythioether prepolymer; and the chain extender comprises at least two groups reactive with thiol groups.

Aspect 57. The composition of any one of aspects 1 to 55, wherein the thiol-terminated polythioether prepolymer has a number average molecular weight from 2,000 Da to 4,000 Da, and a thiol functionality from 2.1 to 2.5.

Aspect 58. The composition of any one of aspects 1 to 57, wherein the chain extender comprises a polyepoxide.

Aspect 59. The composition of any one of aspects 1 to 58, wherein the equivalents ratio of the thiol-terminated sulfur-containing prepolymer to the chain extender is from 1.5:1 to 10:1.

Aspect 60. The composition of any one of aspects 1 to 58, wherein the equivalents ratio of the thiol-terminated sulfur-containing prepolymer to the chain extender is from 4:1 to 5:1.

Aspect 61. The composition of any one of aspects 1 to 60, wherein the curing agent comprises a small molecule curing agent, a prepolymer curing agent, or a combination thereof.

Aspect 62. The composition of aspect 61, wherein the prepolymer curing agent comprises a sulfur-containing prepolymer curing agent.

Aspect 63. The composition of aspect 62, wherein the sulfur-containing prepolymer curing agent comprises a polythioether prepolymer, a polysulfide prepolymer, a sulfur-containing polyformal prepolymer, a monosulfide prepolymer, or a combination of any of the foregoing.

Aspect 64. The composition of aspect 62, wherein the prepolymer curing agent comprises a polythioether prepolymer.

Aspect 65. The composition of aspect 62, wherein the prepolymer curing agent comprises a polythioether prepolymer comprising terminal groups reactive with thiol groups.

Aspect 66. The composition of any one of aspects 61 to 65, wherein the prepolymer curing agent comprises an epoxy-terminated polythioether prepolymer, an alkenyl-terminated polythioether prepolymer, an alkynyl-terminated polythioether prepolymer, a Michael acceptor-terminated polythioether prepolymer or a combination of any of the foregoing.

Aspect 67. The composition of any one of aspects 61 to 66, wherein the curing agent comprises an average reactive functionally from 2 to 6.

Aspect 68. The composition of any one of aspects 61 to 67, wherein the small molecule curing agent has an equivalent weight from 50 to 500.

Aspect 69. The composition of any one of aspects 61 to 69, wherein the small molecule curing agent has a molecular weight from 200 Da to 800 Da.

Aspect 70. The composition of any one of aspects 61 to 69, wherein the prepolymer curing agent has an equivalent weight from 500 Da to 1,500 Da.

Aspect 71. The composition of any one of aspects 61 to 69, wherein the prepolymer curing agent has a molecular weight from 1,000 Da to 4,000 Da.

Aspect 72. The composition of any one of aspects 61 to 71, wherein the curing agent comprises a small molecule polyepoxide, an epoxy-terminated sulfur-containing prepolymer, or a combination thereof.

Aspect 73. The composition of aspect 72, wherein the small molecule polyepoxide comprises an epichlorohydrin/bisphenol A polyepoxide, an epoxy novolac resin, or a combination thereof.

Aspect 74. The composition of aspect 72 or aspect 73, wherein the epoxy-terminated sulfur-containing prepolymer comprises an epoxy-terminated polythioether prepolymer.

Aspect 75. The composition of aspect 61, wherein the curing agent comprises a small molecule polyalkenyl, an alkenyl-terminated sulfur-containing prepolymer, or a combination thereof.

Aspect 76. The composition of aspect 61, wherein the curing agent comprises a small molecule Michael acceptor, a Michael acceptor-terminated polythioether prepolymer, or a combination thereof.

Aspect 77. The composition of aspect 76, wherein the small molecule Michael acceptor comprises divinyl sulfone, and the Michael acceptor-terminated polythioether prepolymer comprises a divinyl sulfone-terminated polythioether prepolymer.

Aspect 78. The composition of any one of aspects 1 to 77, wherein the composition further comprises a sulfur-containing prepolymer that is not a chain-extended sulfur-containing prepolymer.

Aspect 79. The composition of claim 78, wherein the sulfur-containing prepolymer has a number average molecular weight that is different than the number average molecular weight of the chain-extended sulfur-containing prepolymer.

Aspect 80. The composition of any one of aspects 78 to 79, wherein the sulfur-containing prepolymer has a number average molecular weight from 1,000 Da to 5,000 Da.

Aspect 81. The composition of any one of aspects 78 to 80, wherein the sulfur-containing prepolymer comprises a polythioether, a polysulfide, a sulfur-containing polyformal, a monosulfide, or a combination of any of the foregoing.

Aspect 82. The composition of any one of aspects 78 to 81, wherein the sulfur-containing prepolymer has a reactive functionality from 2 to 6.

Aspect 83. The composition of any one of aspects 78 to 82, wherein the sulfur-containing prepolymer comprises groups reactive with the curing agent.

Aspect 84. The composition of any one of aspects 78 to 83, wherein the sulfur-containing prepolymer comprises reactive functional groups that are the same as the reactive functional groups of the chain-extended sulfur-containing prepolymer.

Aspect 85. The composition of any one of aspects 78 to 84, wherein the sulfur-containing prepolymer comprises a thiol-terminated polythioether.

Aspect 86. The composition of any one of aspects 1 to 85, wherein the composition comprises from 1 wt % to 90 wt % of a filler, wherein wt % is based on the total weight of the composition.

Aspect 87. The composition of any one of aspects 1 to 86, wherein the composition comprises greater than 1 wt % of a filler, wherein wt % is based on the total weight of the composition.

Aspect 88. The composition of any one of aspects 1 to 87, wherein the composition comprises from 1 vol % to 90 vol % of the filler, wherein vol % is based on the total volume of the composition.

Aspect 89. The composition of any one of aspects 1 to 88, wherein the composition comprises greater than 1 vol % of a filler, where vol % is based on the total weight of the composition.

Aspect 90. The composition of any one of aspects 1 to 89, wherein the filler comprises an organic filler, an inorganic filler, a low-density filler, an electrically conductive filler, or a combination of any of the foregoing.

Aspect 91. The composition of any one of aspects 1 to 89, wherein the filler comprises an organic filler and an inorganic filler.

Aspect 92. The composition of aspect 91, wherein the filler comprises: from 50 wt % to 90 wt % of the organic filler; and from 10 wt % to 50 wt % of the inorganic filler; wherein wt % is based on the total weight of the filler.

Aspect 93. The composition of any one of aspects 91 to 92, wherein, the organic filler comprises polyethylene beads, polyamide beads or a combination thereof; and the inorganic filler comprises calcium carbonate, fumed silica, or a combination thereof.

Aspect 94. The composition of any one of aspects 91 to 93, wherein the filler comprises: from 10 wt % to 40 wt % of the organic filler; and from 1 wt % to 21 wt % of the inorganic filler; wherein wt % is based on the total weight of the composition.

Aspect 95. The composition of any one of aspects 1 to 89, wherein the filler comprises an organic filler.

Aspect 96. The composition of aspect 95, wherein the organic filler comprises polyamide beads.

Aspect 97. The composition of aspect 96, wherein the polyamide beads have a number average diameter from 2 m to 10 m.

Aspect 98. The composition of any one of aspects 95 to 97, wherein the composition comprises from 10 wt % to 40 wt % of the organic filler, wherein wt % is based on the total weight of the composition.

Aspect 99. The composition of any one of aspects 95 to 98, wherein the composition comprises from 10 vol % to 40 vol % of the organic filler, wherein vol % is based on the total volume of the composition.

Aspect 100. The composition of any one of aspects 1 to 99, wherein the composition further comprises an adhesion promoter.

Aspect 101. The composition of aspect 100, wherein the composition comprises from 0.1 wt % to 4 wt % of the adhesion promoter, where wt % is based on the total weight of the composition.

Aspect 102. The composition of any one of aspects 100 to 101, wherein the adhesion promoter comprises an amino-functional alkoxysilane, a phenolic resin, or a combination thereof.

Aspect 103. The composition of aspect 102, wherein the adhesion promoter comprises: from 10 wt % to 40 wt % of the amino-functional alkoxysilane; and from 60 wt % to 90 wt % of the phenolic resin;
wherein wt % is based on the total weight of the adhesion promoter.

Aspect 104. The composition of any one of aspects 102 to 103, wherein the amino-functional alkoxysilane comprises a primary amino functional alkoxysilane.

Aspect 105. The composition of any one of aspects 102 to 104, wherein the phenolic resin comprises a cooked phenolic resin.

Aspect 106. The composition of aspect 1, wherein,
(a) the chain-extended sulfur-containing prepolymer comprises a thiol-terminated chain-extended polythioether prepolymer of Formula (3a):

$$D[-R^{4a}-S-E(-SH)_{w-1}]_t \quad (3a)$$

wherein,
each t is independently an integer from 2 to 6;
each w is independently an integer from 2 to 6;
each $R^{4a}$ is derived from the reaction of a thiol-reactive group $R^4$ with a thiol group;
each E is a core of a thiol-terminated sulfur-containing prepolymer $E(-SH)_w$; and
D is the core of the chain extender having the structure of Formula (4):

$$D(-R^4)_t \quad (4);\text{and}$$

(b) the curing agent comprises a small molecule polyepoxide and an epoxy-terminated polythioether prepolymer.

Aspect 107. The composition of any of aspects 1 to 106, wherein,
(a) the chain-extended sulfur-containing prepolymer comprises a thiol-terminated chain-extended polythioether prepolymer, wherein the thiol-terminated chain-extended polythioether prepolymer comprises the reaction products of reactants comprising:
  (i) a thiol-terminated polythioether prepolymer, wherein the thiol-terminated polythioether prepolymer comprises the reaction product of reactants comprising:
    (a) a dithiol;
    (b) a divinyl ether; and
    (c) an alkenyl-terminated polyfunctionalizing agent; and
  (ii) a chain extender, wherein the chain extender comprises a polyepoxide;
(b) the curing agent comprises a polyepoxide, wherein the polyepoxide comprises a small molecule polyepoxide and an epoxy-terminated polythioether prepolymer; and
(c) the filler comprises:
  (i) from 50 wt % to 90 wt % of an organic filler, wherein the organic filler comprises polyethylene beads and polyamide beads; and
  (ii) from 10 wt % to 50 wt % of an inorganic filler, wherein the inorganic filler comprises calcium carbonate and silica;
wherein wt % is based on the total weight of the filler.

Aspect 108. The composition of aspect 107, wherein the composition further comprises: (d) from 0.5 wt % to 4 wt % of an adhesion promoter, wherein wt % is based on the total weight of the composition; and the adhesion promoter.

Aspect 109. A cured sealant prepared from the composition of any one of aspects 1 to 108.

Aspect 110. A cured sealant of aspect 109, wherein the cured sealant exhibits an asymptotic decrease in the Shore A hardness during immersion in a mixture containing about 58.2% tributyl phosphate, from 20% to 30% dibutyl phenyl phosphate, from 5% to 10% butyl diphenyl phosphate, less than 10% 2-ethylhexyl 7-oxabicyclo[4.1.0] heptane-3-carboxylate, and from 1% to 5% 2,6-di-tert-butyl-p-cresol (available as Skydrol® LD-4) at temperatures from 40° C. to 70° C. for at least 500 hours and the hardness is greater than Shore 30A.

Aspect 111. A part comprising the cured sealant of any one of aspects 109 to 110.

Aspect 112. A vehicle comprising the cured sealant of any one of aspects 109 to 110.

Aspect 113. The vehicle of aspect 112, wherein the vehicle comprises an aerospace vehicle.

Aspect 114. A method of using the composition of any one of aspects 1 to 107, comprising: applying the composition of any one of aspects 1 to 107 to a surface; and curing the applied composition.

Aspect 115. A system for preparing the composition of any one of aspects 1 to 107, wherein the system comprises:
(a) a first part, wherein the first part comprises:
a chain-extended sulfur-containing prepolymer; and
an organic filler; and
(b) a second part, wherein the second part comprises a curing agent reactive with the chain-extended sulfur-containing prepolymer.

Aspect 116. The coating system of aspect 115, wherein the curing agent comprises a polyepoxide.

EXAMPLES

Embodiments provided by the present disclosure are further illustrated by reference to the following examples, which describe the prepolymers, compositions, and uses provided by the present disclosure. It will be apparent to those skilled in the art that many modifications, both to materials, and methods, may be practiced without departing from the scope of the disclosure.

Example 1

Synthesis of Thiol-Terminated Polyepoxy-Extended Copolymer

A thiol-terminated polythioether polymer, Permapol® P3.1E, (384.32 g, available from PPG Aerospace, mercaptan equivalent weight 1650) and an epoxy DEN® 431, (8.45 g, available from the Dow Chemical) were combined in a plastic cup. The mixture was mixed using a mixer (Hauschild Speed Mixer, 2,300 rpm, 45 seconds). An amine, Dabco® 33-LV, (5.38 g, available from Air Products & Chemicals) was added to the mixture and combined using a high-speed mixer (Hauschild Speed Mixer, 30 seconds at 2,300 rpm and 5 minutes at 800 rpm). The thiol-terminated polyepoxy-extended polythioether prepolymer was left at 23° C. for 24 hrs before preparing a sealant formulation. The thiol-terminated polyepoxy-extended polythioether prepolymer had a number average molecular weight of 4,716 Da, and a thiol equivalent weight of 2,069.

Example 2

Preparation of Sealant Base

A composition comprising the thiol-terminated polyepoxy-extended polythioether prepolymer of Example 1 was prepared. The components shown in Table 1 were combined and mixed to form the Base (Part B) composition.

TABLE 1

Base (Part B) composition.

| Component | Material | Amount (wt %) |
|---|---|---|
| Thiol-terminated chain-extended prepolymer | Thiol-terminated polyepoxy-extended polythioether prepolymer of Example 1 | 61.62 |
| Organic filler | Micronized polyolefin, Acumist ® A-6[1] | 6.08 |
| Organic filler | Ganzpearl[2] | 24.65 |
| Inorganic filler | Calcium carbonate, Socal ® 31[3] | 2.50 |
| Inorganic filler | Fumed silica, Aerosil ® R202[4] | 3.08 |
| Adhesion promoter | Baked Phenolic, T-3920[5] | 0.42 |
| Adhesion promoter | Baked Phenolic, T-3921[5] | 0.33 |
| Adhesion promoter | Silquest ® A-1110 Silane[6] | 0.5 |
| Adhesion promoter | Phenolic resin, Methylon ® 75108[7] | 0.83 |

[1]Commercially available from Honeywell, Morris Plains, NJ.
[2]Commercially available from Sakai Trading, New York, NY.
[3]Commercially available from Solvay.
[4]Commercially available from Cabot Corp.
[5]Commercially available from PPG Aerospace, Sylmar, CA.
[6]Commercially available from PPG Aerospace, Sylmar, CA.
[7]Commercially available Durez Corp.

Example 3

Preparation of Sealant Accelerator

A composition comprising a polyepoxide curing agent was prepared. The components of the Accelerator composition (Part A) are shown in Table 2.

TABLE 2

Accelerator (Part A) composition.

| Component | Material | Amount (wt %) |
|---|---|---|
| Polyepoxide | DER ® 331[1] | 21.42 |
| Polyepoxide | EPU-73B[2] | 7.14 |
| Polyepoxide | Epoxy-terminated polythioether[3] | 21.91 |
| Polyepoxide | Epoxy novolac DEN ® 431[4] | 9.09 |
| Inorganic filler | Calcium carbonate, WINNOFIL ® SPM[5] | 40.37 |
| Pigment | SUNFAST ® BLUE dye[6] | 0.07 |

[1]Commercially available from the Dow Chemical.
[2]Polyurethane polyepoxide; epoxy eq. wt. 245; commercially available from Adeka Corporation, Tokyo, Japan.
[3]Difunctional epoxy-terminated polythioether; epoxy eq. wt. 584; commercially available from PPG Aerospace, Sylmar, CA.
[4]Commercially available from the Dow Chemical.
[5]Commercially available from Solvay.
[6]Commercially available from Sun Chemical Corp.

Example 4

Thiol-Terminated Chain-Extended Polythioether-Based Sealant

A sealant composition was prepared by mixing 100 parts of the Base composition (Part B; Example 2) with 15.3 parts of the Accelerator composition (Part A; Example 3). Various samples were prepared according to SAE AS5127 and were allowed to cure at 25° C. for 2 days, followed by 60° C. for one day. The cured samples were then immersed in Skydrol® LD-4 at temperatures from 23° C. to 70° C. for up to 1,000 hours. Hardness values were determined according to ASTM D2240. Peel strength samples were prepared on substrates coated with an epoxy primer and the peel strength was measured according to SAE AS5127. Hardness values (Shore A) at various Skydrol® LD-4 exposure conditions are shown in Table 3.

TABLE 3

Hardness (Shore A) at various exposure temperatures.

| | Exposure Temperature | | |
|---|---|---|---|
| Duration (h) | 23° C. | 40° C. | 50° C. |
| 0 | 64 | 64 | 64 |
| 100 | 49 | 44 | 39 |
| 250 | 41 | 35 | 33 |
| 500 | 35 | 33 | 31 |
| 1000 | 34 | 32 | 30 |

As shown in Table 3, the hardness values were at least Shore 30A, even after 1000 h exposure at 50° C. A hardness value of Shore 30A is generally considered a minimum value for aerospace applications.

The peel strength for the test samples following Skydrol® LD-4 immersion is summarized in Table 4.

TABLE 4

Peel strength (lbs/inch, % cohesive failure) at various exposure temperatures.

| | Exposure Temperature | | |
|---|---|---|---|
| Duration (h) | 23° C. | 40° C. | 50° C. |
| 0 | 34, 100% CF | 34, 100% CF | 34, 100% CF |
| 100 | 24, 100% CF | 22, 100% CF | 17, 100% CF |
| 250 | 23, 100% CF | 16, 100% CF | 7, 100% CF |
| 500 | 20, 100% CF | 9, 100CF | 7, 100% CF |

Comparative Example 5

Composition with Non-Extended Thiol-Terminated Polythioether Prepolymer

A Base (Part B) composition was made using a non-extended thiol-terminated polythioether prepolymer having a high molecular weight. The components shown in Table 5 were combined and mixed to form the Base (Part B) composition.

TABLE 5

Base (Part B) composition. Add column component

| Component | Material | Amount (wt %) |
|---|---|---|
| Thiol-terminated chain-extended prepolymer | Thiol-terminated polythioether prepolymer[1] | 61.54 |
| Low-density filler | Coated particles[2] | 0.25 |
| Organic filler | Ganzpearl® GPA-550[3] | 24.62 |
| Inorganic filler | Calcium carbonate, Socal® 31[4] | 8.32 |
| Inorganic filler | CAB-O-SIL® TS-720[5] | 2.49 |
| Adhesion promoter | Baked Phenolic, T-3920[6] | 0.42 |

TABLE 5-continued

Base (Part B) composition. Add column component

| Component | Material | Amount (wt %) |
|---|---|---|
| Adhesion promoter | Baked Phenolic, T-3921[6] | 0.33 |
| Adhesion promoter | Silquest® A-1110 Silane[7] | 0.50 |
| Adhesion promoter | Phenolic resin, Methylon® 75108[8] | 0.83 |
| Catalyst | Dabco® 33-LV[9] | 0.70 |

[1]Thiol-terminated polythioether prepolymer with mercaptan equivalent weight of 2,007; average thiol functionality 2.21.
[2]Low-density filler, melamine-coated microcapsules; commercially available from PPG Aerospace, Sylmar, CA.
[3]Commercially available from Sakai Trading New York, NY.
[4]Commercially available from Solvay, Houston, TX.
[5]Commercially available from Cabot Corp., Boston, MA.
[6]Commercially available from PPG Aerospace, Sylmar, CA.
[7]Commercially available Momentive, Waterford, NY.
[8]Commercially available from Durez Corporation.
[9]Commercially available from Air Products & Chemicals.

Comparative Example 6

Accelerator (Part A) Composition

A composition comprising a polyepoxide curing agent was prepared. The components of the Accelerator composition (Part A) are shown in Table 6.

TABLE 6

Accelerator (Part A) composition.

| Component | Material | Amount (wt %) |
|---|---|---|
| Polyepoxide | Epoxy, Epon® Resin 828[1] | 22.98 |
| Polyepoxide | Epoxy, Epon® Resin 1001-B-80[2] | 31.91 |
| Polyepoxide | Epoxy, KD-9011[3] | 2.56 |
| Polyepoxide | Epoxy novolac DEN® 431[4] | 21.28 |
| Inorganic filler | Calcium carbonate, Socal® N2R[5] | 10.64 |
| Inorganic filler | Fumed silica, Aerosil® R202[6] | 2.13 |
| Adhesion promoter | Phenolic resin, Methylon® 75108 | 2.13 |
| Accelerator | Epoxy Accelerator Intermediate[7] | 5.32 |
| Colorant | SUNFAST® BLUE dye[8] | 1.06 |

[1]Commercially available from Hexion, Columbus, OH.
[2]Commercially available from Hexion, Columbus, OH.
[3]Commercially available from Kukdo Chemical Co., Ltd., Seoul, Korea.
[4]Commercially available from Dow Chemical.
[5]Commercially available from Solvay, Houston, TX.
[6]Commercially available from Evonik, Piscataway, NJ.
[7]Commercially available from PPG Aerospace, Sylmar, CA.
[8]Commercially available from Sun Chemical Corporation, Cincinnati, OH.

Comparative Example 7

Non-Extended Thiol-Terminated Polythioether-Based Sealant

A sealant composition was prepared by mixing 100 parts of the Base composition (Part B; Example 5) with 11.49 parts of the Accelerator composition (Part A; Example 6). The sealant composition was allowed to cure at 25° C. for 2 days, followed by 60° C. for one day. The cured samples were then immersed in Skydrol® LD-4 at 70° C. for 100 hours. Hardness values (Shore A) were determined according to ASTM D2240 and the results are shown in Table 7.

TABLE 7

Hardness of Comparative Example 7.

| | Hardness (Shore A) | |
|---|---|---|
| Exposure Conditions | Before exposure | 70° C./100 h in Skydrol ® LD-4 |
| Comparative Example 7 | 52 | Soft mass, unmeasurable |
| Example 4 | 64 | 38 |

Comparative Example 8

Composition with Non-Extended Thiol-Terminated Polythioether Prepolymer

A Base (Part B) composition was made using a non-extended as shown in Table 8. The components shown in Table 8 were combined and mixed to form the Base (Part B) composition.

TABLE 8

Base (Part B) composition.

| Component | Material | Amount (wt %) |
|---|---|---|
| Thiol-terminated chain-extended prepolymer | Thiol-terminated polythioether prepolymer[1] | 61.09 |
| Organic filler | Micronized polyolefin, Acumist ® A-6[2] | 6.02 |
| Organic filler | Ganzpearl ® GPA-550[3] | 24.44 |
| Inorganic filler | Calcium carbonate, Winnofil ® SPM[4] | 2.47 |
| Inorganic filler | Fumed silica, Aerosil ® R202[5] | 3.05 |
| Adhesion promoter | Baked Phenolic, T-3920[6] | 0.42 |
| Adhesion promoter | Baked Phenolic, T-3921[6] | 0.33 |
| Adhesion promoter | Silquest ® A-1110 Silane[7] | 0.49 |
| Adhesion promoter | Phenolic resin, Methylon ® 75108[8] | 0.82 |
| Catalyst | Dabco ® 33-LV[9] | 0.86 |

[1]Mercaptan equivalent weight 1,650; average thiol functionality 2.2; commercially available from PPG Aerospace, Sylmar, CA.
[2]Commercially available from Honeywell, Morris Plains, NJ.
[3]Commercially available from Sakai Trading, New York, NY.
[4]Commercially available from Solvay, Houston, TX.
[5]Commercially available from Evonik, Piscataway, NJ.
[6]Commercially available from PPG Aerospace, Sylmar, CA.
[7]Commercially available Momentive, Waterford, NY.
[8]Commercially available from Durez Corporation.
[9]Commercially available from Air Products & Chemicals.

Comparative Example 9

Accelerator (Part A) Composition

A composition comprising a polyepoxide curing agent was prepared. The components of the Accelerator composition (Part A) are shown in Table 9.

TABLE 9

Accelerator (Part A) composition.

| Component | Material | Amount (wt %) |
|---|---|---|
| Polyepoxide | Epoxy DER ® 331 | 38.90 |
| Polyepoxide | Epoxy EPU-73B | 9.73 |
| Polyepoxide | Epoxy novolac DEN ® 431 | 12.37 |

TABLE 9-continued

Accelerator (Part A) composition.

| Component | Material | Amount (wt %) |
|---|---|---|
| Inorganic filler | Calcium carbonate, Socal ® N2R[5] | 38.90 |
| Colorant | Sunfast ® Blue dye | 0.097 |

Comparative Example 10

Non-Extended Thiol-Terminated Polythioether-Based Sealant

A sealant composition was prepared by mixing 100 parts of the Base composition (Part B; Example 8) with 14.16 parts of the Accelerator composition (Part A; Example 9). The sealant composition was allowed to cure at 25° C. for 4 days, followed by 60° C. for one day. The hardness (Shore A) was measured after Skydrol® LD-4 at 70° C. for 100 hours exposure and the results are shown in Table 10.

TABLE 10

Hardness of Comparative Example 10.

| | Hardness (Shore A) | |
|---|---|---|
| | Before Exposure | After Skydrol ® LD-4 Exposure |
| Comparative Example 10 | 66 | 32 |
| Example 4 | 64 | 38 |

Example 11

Synthesis of Vinyl Sulfone-Terminated Polythioether Prepolymer 159.8 g of thiol-terminated polythioether polymer, Permapol® 3.1E, which is commercially available from PRC-Desoto International, Inc, Sylmar, Calif., and 12.18 g of 1,3-bis(vinylsulfonyl)-propanol divinyl sulfone (from Sigma Aldrich) were charged into a 200-mL plastic container. The two materials were hand-mixed for 1 minute and then mixed in a high-speed mixer for 60 seconds. 0.82 g of an amine catalyst (Dabco® 33-LV) was charged into the mixture. The mixture was again hand-mixed, then mixed in a high-speed mixer for 60 second. The material was sealed overnight. The resulting material was a difunctional vinyl sulfone-terminated chain-extended polythioether prepolymer having an equivalent weight of 1,633 to 1650.

Example 12

Sealant Formulation

The sealant consisted of two parts, Part B (Base) and Part A (Accelerator).

A Base (Part B) composition was made as shown in Table 11. The components shown in Table 8 were combined and mixed to form the Base (Part B) composition.

TABLE 11

Base (Part B) composition.

| Component | Material | Amount (g) |
|---|---|---|
| Thiol-terminated polythioether | Thiol-terminated polythioether prepolymer, Permapol ® 3.1E | 100.00 |
| Organic filler | Micronized polyolefin, Acumist ® A-6 | 9.86 |
| Organic filler | Spherical Powder NP-U[1] | 40.00 |
| Inorganic filler | Calcium carbonate, Socal ® 31 | 4.05 |
| Inorganic filler | Fumed silica, Aerosil ® R202 | 5.00 |
| Adhesion promoter | Baked Phenolic, T-3920 | 0.68 |
| Adhesion promoter | Baked Phenolic, T-3921 | 0.54 |
| Adhesion promoter | Silquest ® A-1110 Silane | 0.81 |
| Adhesion promoter | Phenolic resin, Methylon ® 75108 | 1.35 |
| Catalyst | Dabco ® 33-LV | 1.50 |

[1]Commercially available from Sumitomo Seika.

A composition comprising a polyepoxide curing agent was prepared. The components of the Accelerator composition (Part A) are shown in Table 12.

TABLE 12

Accelerator (Part A) composition.

| Component | Material | Amount (gm) |
|---|---|---|
| Michael acceptor-terminated polythioether | Vinyl sulfone-terminated polythioether prepolymer of Example 11 | 100.00 |
| Adhesion promoter | Phenolic resin T-1601[1] | 5.30 |
| Plasticizer | FAIRAID ® plasticizer[2] | 24.00 |
| Inorganic filler | Calcium carbonate, Socal ® 31 | 90.00 |
| Colorant | Sunfast ® Blue dye | 0.05 |

[1]Phenolic adhesion promoter, commercially available from PRC-Desoto Aerospace.
[2]A plasticizer, commercially available from PRC-Desoto Aerospace.

A sealant was prepared by mixing 100 g of part B and 96.96 g of part A in a high-speed mixer for 30 seconds at 2,300 rpm. The peel strength samples were prepared according to AS5127/1B Section 8 on an epoxy-coated substrate. An adhesion promoter (PR-187, commercially available from PRC-Desoto International, Inc.) was applied onto the substrate. The prepared samples were cured at 25° C. for 2 days and then in 60° C. oven for 24 h. The panels were then immersed in Skydrol® LD-4 at 70° C. for 100 h. After exposure to the Skydrol® LD-4, the samples were left at 25° C. for 2 h before peel strength test were performed according to AS5127/1B Section 8. The results are shown in Table 13.

TABLE 13

Performance after Skydrol ® LD-4 immersion.

| | Before Skydrol ® LD-4 Immersion | After Skydrol ® LD-4 Immersion |
|---|---|---|
| Peel strength, lbs/inch | 18.1 | 25.0 |
| Percent of Cohesive Failure | 100% | 100% |

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A composition, comprising:
   (a) a thiol-terminated chain-extended sulfur-containing prepolymer, wherein:
      the thiol-terminated chain-extended sulfur-containing prepolymer has a number average molecular weight from 2,000 Da to 15,000 Da; and
      the thiol-terminated chain-extended sulfur-containing prepolymer comprises the reaction product of reactants comprising a thiol-terminated sulfur-containing prepolymer and a chain-extender, wherein the chain extender comprises a polyepoxide having an average epoxy functionality greater than 2;
   (b) a curing agent; and
   (c) a filler.

2. The composition of claim 1, wherein the thiol-terminated chain-extended sulfur-containing prepolymer comprises a moiety having the structure of Formula (3):

$$D[R^{4a}\text{—S-E(-S—)}_{w-1}]_t \quad (3)$$

wherein,
      w is an integer from 2 to 20;
      t is an integer from 2 to 6;
      each D is a core of a polyepoxide chain-extender $D(\text{-R}^4)_t$, where each $R^4$ is an epoxy group;
      each $R^{4a}$ is derived from an epoxy group; and
      each E is a core of sulfur-containing prepolymer $E(\text{-SH})_w$.

3. The composition of claim 2, wherein,
   each $R^{4a}$ is derived from the reaction of an epoxy group with a thiol group and has the structure —$CH_2$—CH(—OH)—.

4. The composition of claim 1, wherein the thiol-terminated chain-extended sulfur-containing prepolymer comprises a first thiol-terminated chain-extended sulfur-containing prepolymer and a second thiol-terminated chain-extended sulfur-containing prepolymer, wherein the first thiol-terminated chain-extended sulfur-containing prepolymer and the second thiol-terminated chain-extended sulfur-containing prepolymer have different sulfur-containing backbones.

5. The composition of claim 1, wherein the composition comprises:
   (a) from 35 wt % to 75 wt % of the thiol-terminated a chain-extended sulfur-containing prepolymer;
   (b) from 4 wt % to 12 wt % of the curing agent; and
   (c) from 15 wt % to 55 wt % of the filler,
   wherein wt % is based on the total weight of the composition.

6. The composition of claim 1, wherein the chain-extended sulfur-containing prepolymer comprises a thiol-terminated sulfur-containing prepolymer having the structure of Formula (3a):

$$D[\text{-}R^{4a}\text{—S-E(-SH)}_{w-1}]_t \quad (3a)$$

wherein,
      w is an integer from 2 to 20;
      t is an integer from 2 to 6;
      each $R^{4a}$ is derived from the reaction of an epoxy group $R^4$ with a thiol group;
      each E is a core of a thiol-terminated sulfur-containing prepolymer $E(\text{-SH})_w$; and
      D is the core of the chain extender having the structure of Formula (4):

$$D\{\text{-}R^4\}_t \quad (4)$$

each $R^4$ is an epoxy group; and
   D is the core of the chain extender.

7. The composition of claim 1, wherein,
   the thiol-terminated sulfur-containing prepolymer comprises two or more terminal thiol functional groups.

8. The composition of claim 1, wherein the chain extender comprises a polyepoxide chain extender having the structure of Formula (4):

$$D(-R^4)_t \qquad (4)$$

wherein,
t is an integer from 2 to 6;
each $R^4$ is independently an epoxy group; and
D is the core of the polyepoxide chain extender.

9. The composition of claim 8, wherein D is selected from $C_{1-6}$ alkane-n-yl, $C_{5-6}$ cycloalkane-n-yl, $C_{6-20}$ alkanecycloalkane-n-yl, $C_6$ arene-n-yl, $C_{7-20}$ alkanearene-n-yl, $C_{1-6}$ heteroalkane-n-yl, $C_{5-6}$ heterocycloalkane-n-yl, $C_{6-20}$ heteroalkanecycloalkane-n-yl, $C_6$ heteroarene-n-yl, $C_{7-20}$ heteroalkanearene-n-yl, substituted $C_{1-6}$ alkane-n-yl, substituted $C_{5-6}$ cycloalkane-n-yl, substituted $C_{6-20}$ alkanecycloalkane-n-yl, substituted $C_6$ arene-n-yl, substituted $C_{7-20}$ alkanearene-n-yl, $C_{1-6}$ heteroalkane-n-yl, substituted $C_{5-6}$ heterocycloalkane-n-yl, substituted $C_{6-20}$ heteroalkanecycloalkane-n-yl, substituted $C_6$ heteroarene-n-yl, and substituted $C_{7-20}$ heteroalkanearene-n-yl, where n can be an integer from 2 to 6.

10. The composition of claim 1, wherein the curing agent comprises a small molecule curing agent, a prepolymer curing agent, or a combination thereof.

11. The composition of claim 10, wherein the curing agent comprises a small molecule polyepoxide, an epoxy-terminated sulfur-containing prepolymer, or a combination thereof.

12. The composition of claim 1, wherein the composition further comprises a thiol-terminated sulfur-containing prepolymer that is not a chain-extended thiol-terminated sulfur-containing prepolymer.

13. The composition of claim 1, wherein the composition comprises from 1 wt % to 90 wt % of the filler, wherein wt % is based on the total weight of the composition.

14. The composition of claim 1, wherein,
(a) the thiol-terminated chain-extended sulfur-containing prepolymer comprises a thiol-terminated chain-extended polythioether prepolymer of Formula (3a):

$$D[-R^{4a}-S-E(-SH)_{w-1}]_t \qquad (3a)$$

wherein,
each t is independently an integer from 2 to 6;
each w is independently an integer from 2 to 6;
each $R^{4a}$ is derived from the reaction of an epoxy group $R^4$ with a thiol group;
each E is a core of a thiol-terminated sulfur-containing prepolymer $E(-SH)_w$; and D is the core of the chain extender having the structure of Formula (4):

$$D(-R^4)_t \qquad (4); \text{ and}$$

(b) the curing agent comprises a small molecule polyepoxide and an epoxy-terminated polythioether prepolymer.

15. A composition comprising,
(a) a chain-extended sulfur-containing prepolymer comprising a thiol-terminated chain-extended polythioether prepolymer, wherein the thiol-terminated chain-extended polythioether prepolymer comprises the reaction products of reactants comprising:
(i) a thiol-terminated polythioether prepolymer, wherein the thiol-terminated polythioether prepolymer comprises the reaction product of reactants comprising:
(a) a dithiol;
(b) a divinyl ether; and
(c) an alkenyl-terminated polyfunctionalizing agent; and
(ii) a chain extender, wherein the chain extender comprises a polyepoxide;
(b) a curing agent comprising a polyepoxide, wherein the polyepoxide comprises a small molecule polyepoxide and an epoxy-terminated polythioether prepolymer.

16. A cured sealant prepared from the composition of claim 1.

17. A part comprising the cured sealant of claim 16.

18. A vehicle comprising the cured sealant of claim 16.

19. The vehicle of claim 18, wherein the vehicle comprises an aerospace vehicle.

20. A method of using the composition of claim 1, comprising:
applying the composition of claim 1 to a surface; and
curing the applied composition.

21. A system for preparing the composition of claim 1, wherein the system comprises:
a first part, wherein the first part comprises:
the thiol-terminated chain-extended sulfur-containing prepolymer; and
the filler; and
a second part, wherein the second part comprises the curing agent.

22. The composition of claim 1, wherein, the filler comprises:
(i) from 50 wt % to 90 wt % of an organic filler, wherein the organic filler comprises polyethylene beads and polyamide beads; and
(ii) from 10 wt % to 50 wt % of an inorganic filler, wherein the inorganic filler comprises calcium carbonate and silica;
wherein wt % is based on the total weight of the filler.

* * * * *